(12) United States Patent
Miyazaki et al.

(10) Patent No.: US 8,243,170 B2
(45) Date of Patent: Aug. 14, 2012

(54) ZOOM LENS SYSTEM, INTERCHANGEABLE LENS APPARATUS AND CAMERA SYSTEM

(75) Inventors: Kyoichi Miyazaki, Osaka (JP); Katsu Yamada, Osaka (JP); Takuya Imaoka, Kanagawa (JP); Masaki Sampei, Hyogo (JP)

(73) Assignee: Panasonic Corporation, Osaka (JP)

( * ) Notice: Subject to any disclaimer, the term of this patent is extended or adjusted under 35 U.S.C. 154(b) by 551 days.

(21) Appl. No.: 12/416,385

(22) Filed: Apr. 1, 2009

(65) Prior Publication Data

US 2010/0091171 A1  Apr. 15, 2010

(30) Foreign Application Priority Data

Apr. 2, 2008 (JP) ................................. 2008-096382

(51) Int. Cl.
- *H04N 5/262* (2006.01)
- *H04N 5/232* (2006.01)
- *G03B 13/00* (2006.01)
- *G03B 17/00* (2006.01)
- *G02B 15/14* (2006.01)

(52) U.S. Cl. ........ 348/240.3; 348/345; 396/82; 396/529; 359/676; 359/690; 359/695

(58) Field of Classification Search .................. 348/345, 348/240.99, 240.3; 396/79, 82, 85, 89, 529; 359/676, 683, 687, 689, 690, 695

See application file for complete search history.

(56) References Cited

U.S. PATENT DOCUMENTS

| | | | | | |
|---|---|---|---|---|---|
| 4,896,950 | A | * | 1/1990 | Endo et al. | 359/683 |
| 5,696,632 | A | * | 12/1997 | Ohtake | 359/684 |
| 6,882,369 | B1 | | 4/2005 | Ito | |
| 2004/0125462 | A1 | * | 7/2004 | Misaka | 359/684 |
| 2005/0219708 | A1 | | 10/2005 | Shibayama et al. | |
| 2005/0275949 | A1 | | 12/2005 | Fujimoto et al. | |
| 2006/0215279 | A1 | | 9/2006 | Shibayama et al. | |
| 2007/0297067 | A1 | | 12/2007 | Muramatsu et al. | |

FOREIGN PATENT DOCUMENTS

| | | |
|---|---|---|
| JP | 2000-111789 A | 4/2000 |
| JP | 2000-333064 A | 11/2000 |
| JP | 2005-284097 A | 10/2005 |
| JP | 2005-316396 A | 11/2005 |
| JP | 2005-352057 A | 12/2005 |
| JP | 2006-221092 A | 8/2006 |
| JP | 2006-267425 A | 10/2006 |
| JP | 2007-219315 A | 8/2007 |
| JP | 2008-003195 A | 1/2008 |
| JP | 2008-015251 A | 1/2008 |

\* cited by examiner

*Primary Examiner* — Rochelle-Ann J Blackman
(74) *Attorney, Agent, or Firm* — Pearne & Gordon LLP

(57) ABSTRACT

A zoom lens system is provided that includes a compactly constructed focusing lens unit and that has a suppressed change in the image magnification at the time of movement of a focusing lens unit. The zoom lens system according to the present invention, in order from an object side to an image side, comprises: a first lens unit having positive optical power; a second lens unit having negative optical power; a third lens unit having positive optical power; and an aperture diaphragm. At the time of zooming, the zoom lens system moves the first to third lens units so that intervals between these lens units vary. At the time of focusing from an infinity in-focus condition to a close-point object in-focus condition, the zoom lens system moves the third lens unit to the object side.

8 Claims, 39 Drawing Sheets

ZOOM LENS SYSTEM, INTERCHANGEABLE LENS APPARATUS AND CAMERA SYSTEM

BACKGROUND OF THE INVENTION

1. Field of the Invention

The present invention relates to a zoom lens system and, in particular, to a zoom lens system suitable for an imaging lens system employed in an interchangeable lens apparatus in a so-called interchangeable-lens type digital camera system (simply referred to as a "camera system", in some cases hereinafter). Further, the present invention relates to an interchangeable lens apparatus and a camera system that employ this zoom lens system.

2. Description of the Background Art

In recent years, interchangeable-lens type digital camera systems are spreading rapidly. Such an interchangeable-lens type digital camera system has: a camera body employing an image sensor composed of a CCD (Charge Coupled Device), a CMOS (Complementary Metal-Oxide Semiconductor) or the like; and an interchangeable lens apparatus employing an imaging lens system for forming an optical image on the light receiving plane of the image sensor. Zoom lens systems applicable to such a camera system are disclosed in Japanese Laid-Open Patent Publication Nos. 2005-284097, 2005-352057, 2006-221092, 2005-316396, 2006-267425, 2007-219315, 2008-3195 and 2008-15251.

On the other hand, camera systems are known that have the function (referred to as a "live view function", hereinafter) of displaying image data acquired by a shooting lens system and an image sensor onto a display apparatus such as a liquid crystal display in the camera body (e.g., Japanese Laid-Open Patent Publication Nos. 2000-111789 and 2000-333064).

In the camera systems described in Japanese Laid-Open Patent Publication Nos. 2000-111789 and 2000-333064, focusing operation is performed by a contrast AF method when the live view function is active. The contrast AF indicates focusing operation performed on the basis of a contrast value of image data outputted from the image sensor. The operation of contrast AF is described below.

First, a camera system oscillates a focusing lens unit in optical axis directions at a high speed (referred to as "wobbling", hereinafter) so as to detect the direction of deviation from an in-focus condition. After the wobbling, the camera system detects a signal component in a particular frequency band of the image region from the output signal of the image sensor, and then calculates the optimal position for the focusing lens unit that realizes an in-focus condition. After that, the camera system moves the focusing lens unit to the optimal position, so that the focusing operation is completed. When focusing operation is to be performed continuously in the case of shooting a video or the like, the camera system repeats this series of operation.

In general, for the purpose of avoiding uneasiness that could be caused by flicker and the like, displaying of a video is performed at a high speed approximately of 30 frames per second or the like. Thus, basically, video image taking in the interchangeable-lens type digital camera system need also be performed at 30 frames per second. Accordingly, the focusing lens unit need be driven at a high speed of 30 Hz at the time of wobbling.

Nevertheless, when the focusing lens unit is heavier, a motor or an actuator of larger size is necessary for moving the focusing lens unit at a high speed. This causes a problem that the lens barrel has an excessively large outer diameter. Then, in each of the zoom lens systems described in the above-mentioned patent documents, the focusing lens unit is hardly of light weight.

Further, it should be noted that in interchangeable-lens type digital camera systems, the size of the image corresponding to a photographic object varies in association with wobbling. The variation in the size of the image is caused mainly by the fact that the movement of the focusing lens unit in the optical axis directions generates a change in the focal length of the entire lens system. Then, when a large change in the image taking magnification is generated in association with wobbling, the person who takes an image feels uneasiness.

SUMMARY OF THE INVENTION

An object of the present invention is to provide: a zoom lens system that includes a compactly constructed focusing lens unit and that has a suppressed change in the image magnification at the time of movement of a focusing lens unit; and an interchangeable lens apparatus and a camera system that employ this zoom lens system.

The zoom lens system according to the present invention, in order from an object side to an image side, comprises: a first lens unit having positive optical power; a second lens unit having negative optical power; a third lens unit having positive optical power; and an aperture diaphragm. At the time of zooming, the first lens unit, the second lens unit and the third lens unit move so that intervals between these lens units vary. At the time of focusing from an infinity in-focus condition to a close-point object in-focus condition, the third lens unit moves to the image side.

The interchangeable lens apparatus according to the present invention comprises: a zoom lens system described above; and a camera mount section connected to a camera body provided with an image sensor for receiving an optical image formed by the zoom lens system and then converting the optical image into an electric image signal.

The camera system according to the present invention comprises: an interchangeable lens apparatus that includes the zoom lens system described above; and a camera body that is connected to the interchangeable lens apparatus via a camera mount section in an attachable and detachable manner and that includes an image sensor for receiving an optical image formed by the zoom lens system and then converting the optical image into an electric image signal.

According to the present invention, a zoom lens system that includes a compactly constructed focusing lens unit and that has a suppressed change in the image magnification at the time of movement of a focusing lens unit, an interchangeable lens apparatus and a camera system that employ this zoom lens system can be provided.

These and other objects, features, aspects and effects of the present invention will become clearer on the basis of the following detailed description with reference to the accompanying drawings.

DESCRIPTION OF THE PREFERRED EMBODIMENTS

Figure 1:
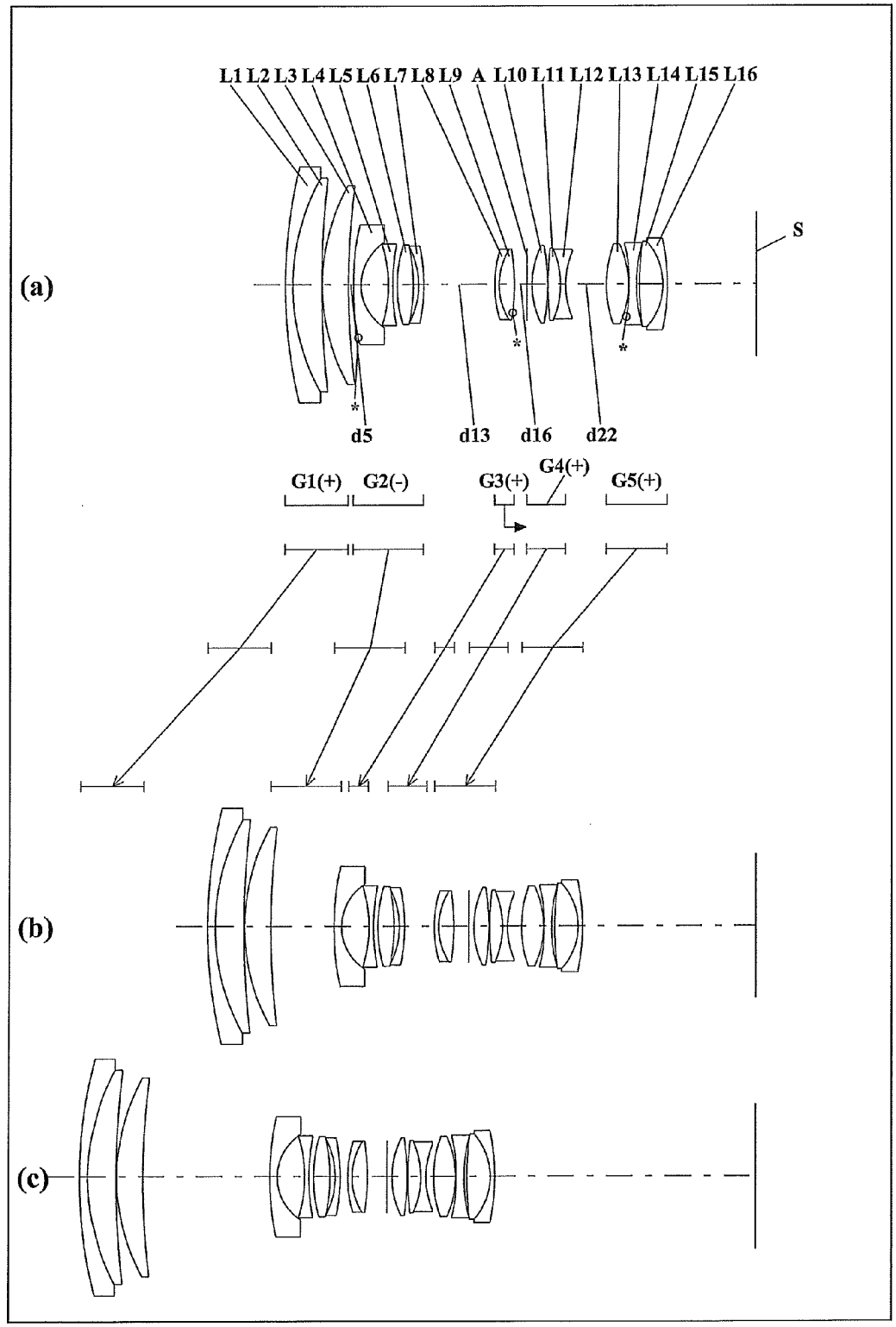
FIG. 1 is a lens arrangement diagram showing an infinity in-focus condition of a zoom lens system according to Embodiment 1 (Example 1)
Figure 2:
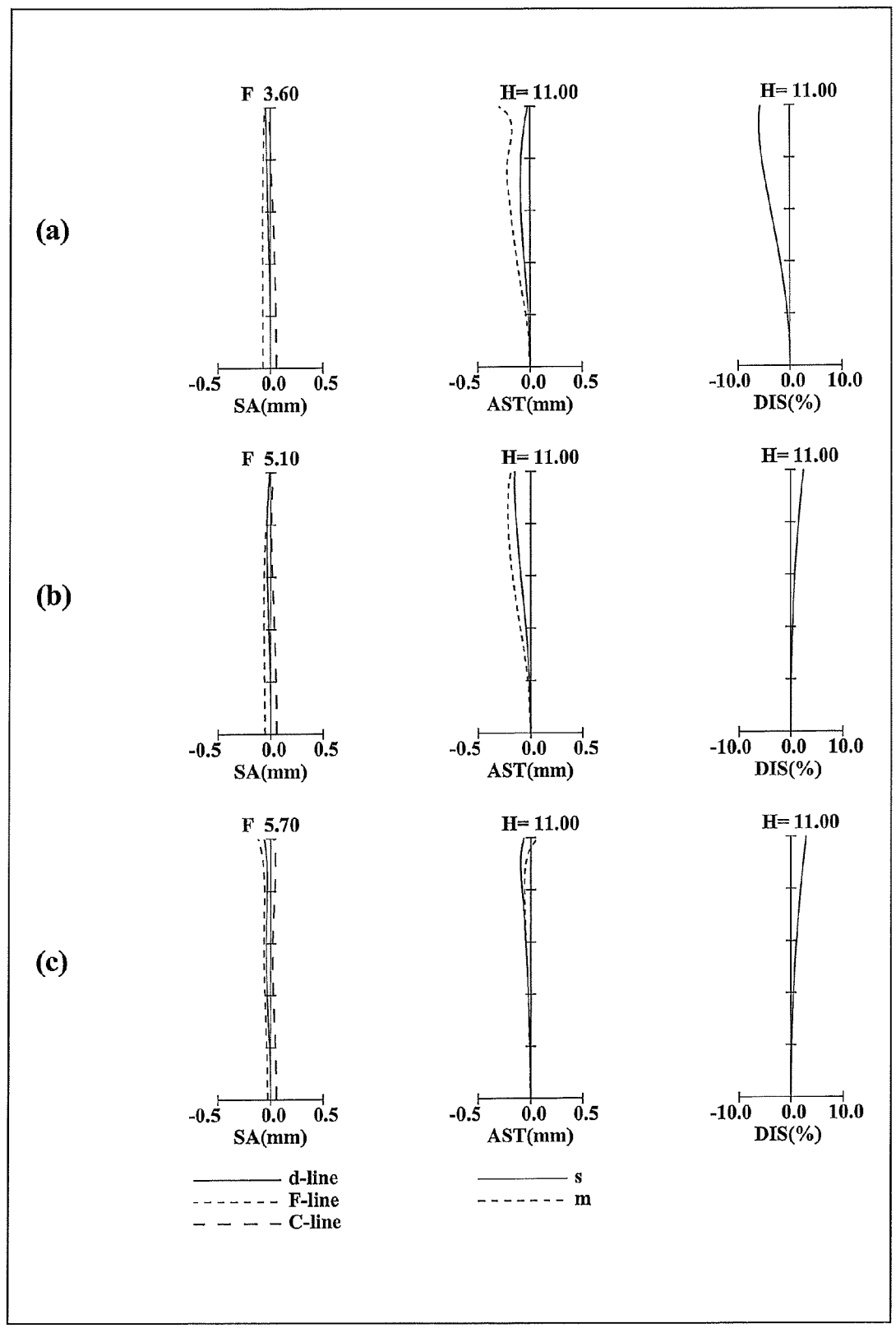
FIG. 2 is a longitudinal aberration diagram showing an infinity in-focus condition of a zoom lens system according to Example 1.
Figure 3:
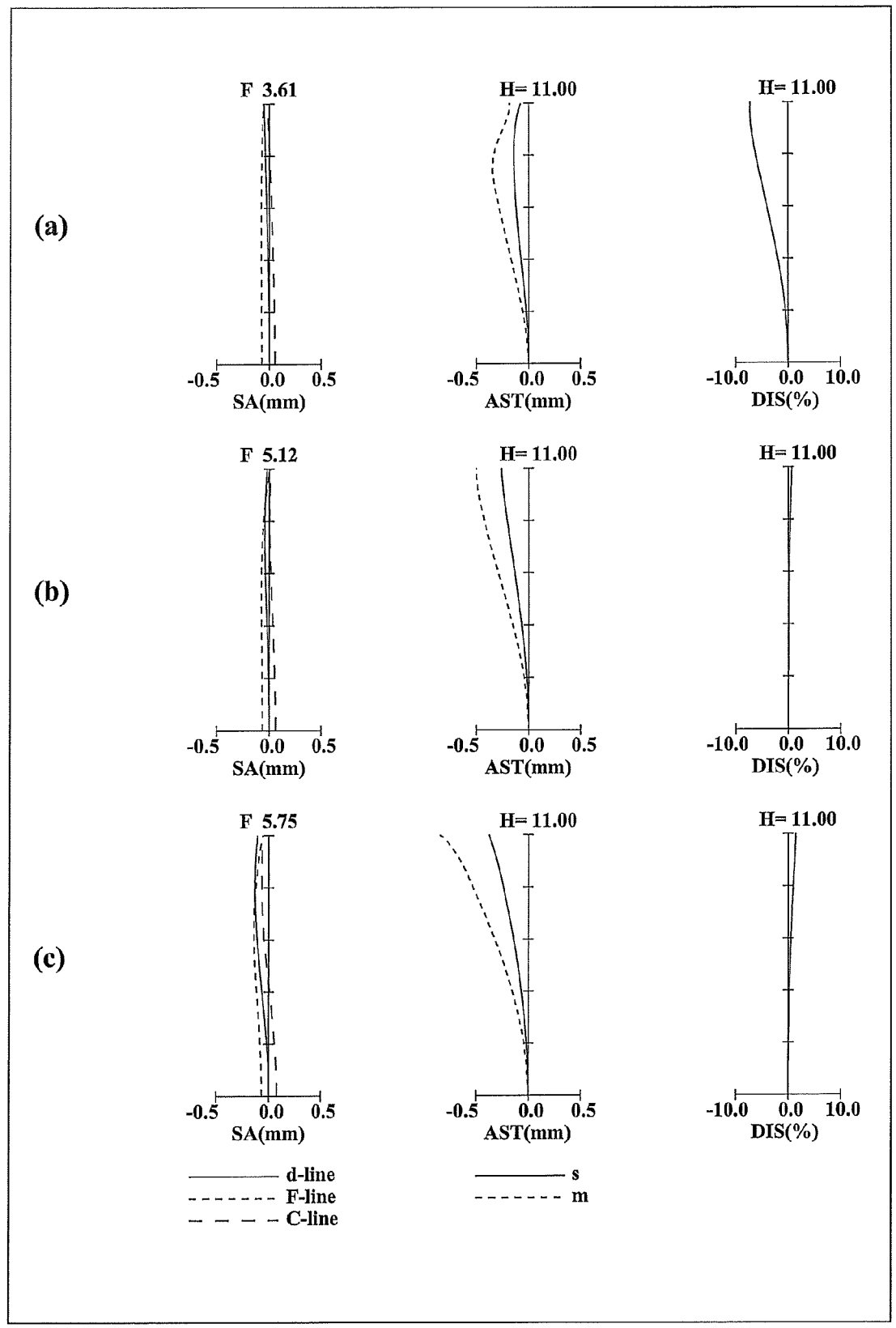
FIG. 3 is a longitudinal aberration diagram showing a close-point in-focus condition of a zoom lens system according to Example 1.
Figure 4:
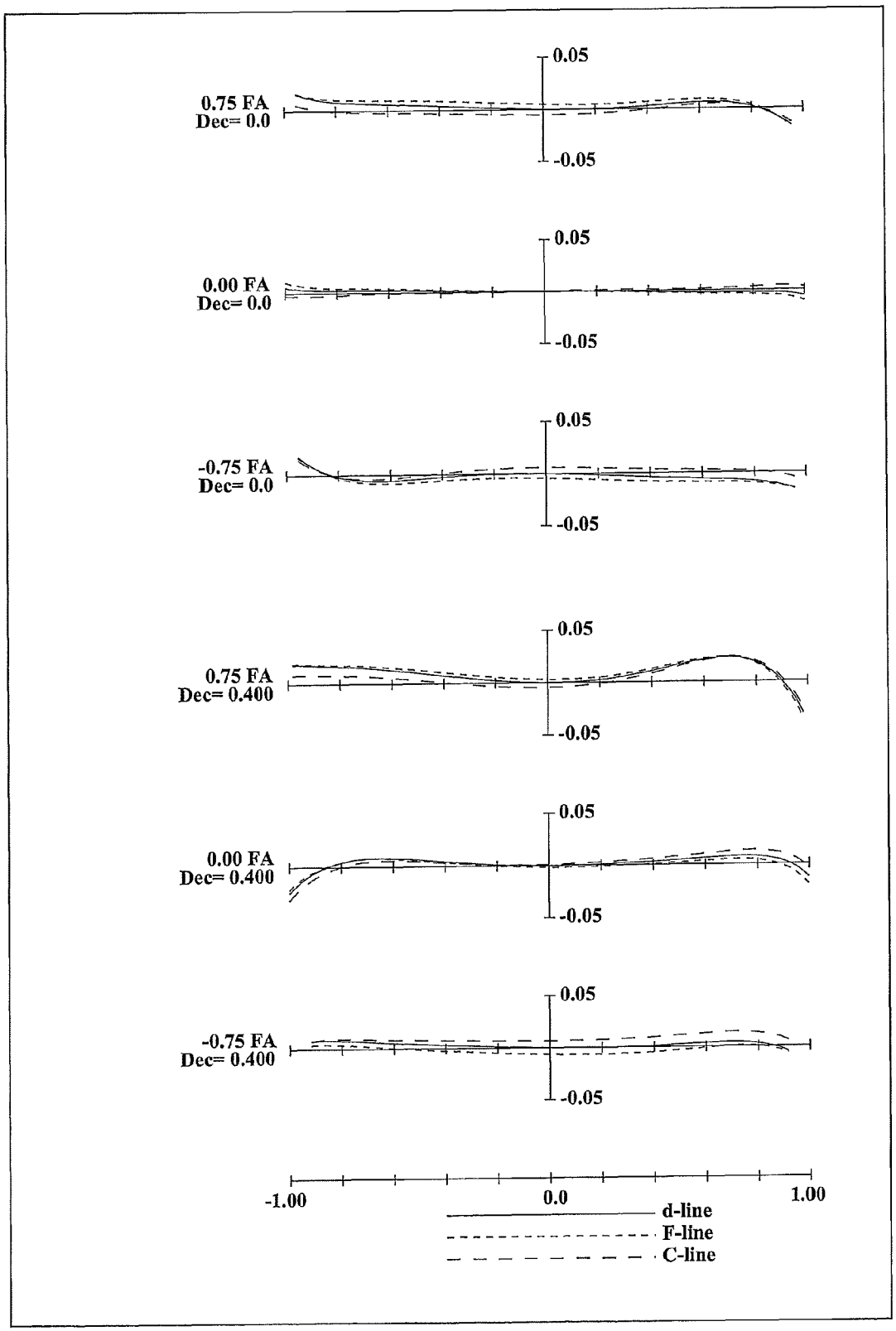
FIG. 4 is a lateral aberration diagram in a basic state where image blur compensation is not performed and in an image blur compensation state at a telephoto limit of a zoom lens system according to Example 1.

Each of FIGS. 1, 5, 9, 13, 17, 21, 24, 27, 30, 33 and 36 shows a zoom lens system in an infinity in-focus condition.

In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. In the part between the wide-angle limit and the middle position and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

Further, in FIGS. 1, 5, 9, 13, 17, 21, 24, 27, 30, 33 and 36, an asterisk "*" imparted to a particular surface indicates that the surface is aspheric. In each Fig., symbol (+) or (−) imparted to the symbol of each lens unit corresponds to the sign of the optical power of the lens unit. Further, in each Fig., the straight line located on the most right-hand side indicates the position of the image surface S.

Embodiment 1

The zoom lens system according to Embodiment 1, in order from the object side to the image side, comprises a first lens unit G1 having positive optical power, a second lens unit G2 having negative optical power, a third lens unit G3 having positive optical power, a fourth lens unit G4 having positive optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. The object side surface of the fourth lens element L4 is aspheric.

The third lens unit G3, in order from the object side to the image side, comprises: a negative meniscus eighth lens element L8 with the convex surface facing the object side; and a bi-convex ninth lens element L9. The eighth lens element L8 and the ninth lens element L9 are cemented with each other. The image side surface of the ninth lens element L9 is aspheric.

The fourth lens unit G4, in order from the object side to the image side, comprises a bi-convex tenth lens element L10, a bi-convex eleventh lens element L11, and a bi-concave twelfth lens element L12. The eleventh lens element L11 and the twelfth lens element L12 are cemented with each other.

The fifth lens unit G5, in order from the object side to the image side, comprises: a bi-convex thirteenth lens element L13; a bi-concave fourteenth lens element L14; a bi-convex fifteenth lens element L15; and a negative meniscus sixteenth lens element L16 with the convex surface facing the image side. The fifteenth lens element L15 and the sixteenth lens element L16 are cemented with each other. The object side surface of the fourteenth lens element L14 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Further, for the purpose of compensation of image blur caused by vibration applied to the entire system, the fourth lens unit G4 moves in a direction perpendicular to the optical axis.

Embodiment 2

The zoom lens system according to Embodiment 2, in order from the object side to the image side, comprises a first lens unit G1 having positive optical power, a second lens unit G2 having negative optical power, a third lens unit G3 having positive optical power, a lens unit G4A having negative optical power, a lens unit G4B having negative optical power, and a fifth lens unit G5 having positive optical power. The lens units G4A and G4B constitute a fourth lens unit G4.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The two surfaces of the eighth lens element L8 are aspheric.

The lens unit G4A, in order from the object side to the image side, comprises a bi-convex ninth lens element L9 and a bi-concave tenth lens element L10. The ninth lens element L9 and the tenth lens element L10 are cemented with each other with an adhesive layer in between.

The lens unit G4B is composed of a bi-concave eleventh lens element L11.

The fifth lens unit G5, in order from the object side to the image side, comprises: a bi-convex twelfth lens element L12; a positive meniscus thirteenth lens element L13 with the convex surface facing the image side; a negative meniscus fourteenth lens element L14 with the convex surface facing the image side; and a bi-convex fifteenth lens element L15. The thirteenth lens element L13 and the fourteenth lens element L14 are cemented with each other with an adhesive layer in between. The two surfaces of the twelfth lens element L12 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the lens unit G4A should increase, and the interval between the lens unit G4B and the fifth lens unit G5 should decrease. The aperture diaphragm A moves to the object side together with the lens unit G4A.

Further, at the time of focusing from an infinity in-focus condition to a close-point in-focus condition, the third lens unit G3 moves to the image side along the optical axis.

Further, for the purpose of compensation of image blur caused by vibration applied to the entire system, the lens unit G4B moves in a direction perpendicular to the optical axis.

Embodiment 3

The zoom lens system according to Embodiment 3, in order from the object side to the image side, comprises a first lens unit G1 having positive optical power, a second lens unit G2 having negative optical power, a third lens unit G3 having positive optical power, a lens unit G4A having negative optical power, a lens unit G4B having negative optical power, and a fifth lens unit G5 having positive optical power. The lens units G4A and G4B constitute a fourth lens unit G4.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The two surfaces of the eighth lens element L8 are aspheric.

The lens unit G4A, in order from the object side to the image side, comprises: a positive meniscus ninth lens element L9 with the convex surface facing the object side; and a negative meniscus tenth lens element L10 with the convex surface facing the object side. The ninth lens element L9 and the tenth lens element L10 are cemented with each other with an adhesive layer in between.

The lens unit G4B is composed of a planer-concave eleventh lens element L11 with the concave surface facing the object side.

The fifth lens unit G5, in order from the object side to the image side, comprises a bi-convex twelfth lens element L12, a bi-convex thirteenth lens element L13, a bi-concave fourteenth lens element L14 and a bi-convex fifteenth lens element L15. The thirteenth lens element L13 and the fourteenth lens element L14 are cemented with each other with an adhesive layer in between. The two surfaces of the twelfth lens element L12 are aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the lens unit G4A should increase, and the interval between the lens unit G4B and the fifth lens unit G5 should decrease. The aperture diaphragm A moves to the object side together with the lens unit G4A.

Further, at the time of focusing from an infinity in-focus condition to a close-point in-focus condition, the third lens unit G3 moves to the image side along the optical axis.

Further, for the purpose of compensation of image blur caused by vibration applied to the entire system, the lens unit G4B moves in a direction perpendicular to the optical axis.

Embodiment 4

The zoom lens system according to Embodiment 4, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The two surfaces of the eighth lens element L8 are aspheric.

The fourth lens unit G4, in order from the object side to the image side, comprises a bi-convex ninth lens element L9 and a bi-concave tenth lens element L10. The ninth lens element L9 and the tenth lens element L10 are cemented with each other with an adhesive layer in between.

The fifth lens unit G5, in order from the object side to the image side, comprises: a bi-convex eleventh lens element L11; a positive meniscus twelfth lens element L12 with the convex surface facing the image side; a bi-concave thirteenth lens element L13; and a bi-convex fourteenth lens element L14. The twelfth lens element L12 and the thirteenth lens element L13 are cemented with each other with an adhesive layer in between. The two surfaces of the eleventh lens element L11 are aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Further, for the purpose of compensation of image blur caused by vibration applied to the entire system, the fourth lens unit G4 moves in a direction perpendicular to the optical axis.

Embodiment 5

The zoom lens system according to Embodiment 5, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; a positive meniscus sixth lens element L6 with the convex surface facing the object side; and a positive meniscus seventh lens element L7 with the convex surface facing the object side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The two surfaces of the eighth lens element L8 are aspheric.

The fourth lens unit G4, in order from the object side to the image side, comprises a bi-convex ninth lens element L9 and a bi-concave tenth lens element L10. The ninth lens element L9 and the tenth lens element L10 are cemented with each other with an adhesive layer in between.

The fifth lens unit G5, in order from the object side to the image side, comprises: a bi-convex eleventh lens element L11; a positive meniscus twelfth lens element L12 with the convex surface facing the image side; a bi-concave thirteenth lens element L13; and a bi-convex fourteenth lens element L14. The twelfth lens element L12 and the thirteenth lens element L13 are cemented with each other with an adhesive layer in between. The two surfaces of the eleventh lens element L11 are aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Further, for the purpose of compensation of image blur caused by vibration applied to the entire system, the fourth lens unit G4 moves in a direction perpendicular to the optical axis.

Embodiment 6

The zoom lens system according to Embodiment 6, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side. The object side surface of the fifth lens element L5 is aspheric.

The third lens unit G3 is composed of a bi-convex seventh lens element L7. The two surfaces of the seventh lens element L7 are aspheric.

The fourth lens unit G4, in order from the object side to the image side, comprises: a positive meniscus eighth lens element L8 with the convex surface facing the object side; and a negative meniscus ninth lens element L9 with the convex surface facing the object side. The eighth lens element L8 and the ninth lens element L9 are cemented with each other.

The fifth lens unit G5, in order from the object side to the image side, comprises a bi-convex tenth lens element L10, a bi-concave eleventh lens element L11, and a bi-convex twelfth lens element L12. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase and then decrease, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 7

The zoom lens system according to Embodiment 7, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

The third lens unit G3 is composed of a bi-convex seventh lens element L7. The two surfaces of the seventh lens element L7 are aspheric.

The fourth lens unit G4, in order from the object side to the image side, comprises a bi-convex eighth lens element L8 and a bi-concave ninth lens element L9. The eighth lens element L8 and the ninth lens element L9 are cemented with each other. The object side surface of the eighth lens element L8 is aspheric.

The fifth lens unit G5, in order from the object side to the image side, comprises: a bi-convex tenth lens element L10; a bi-concave eleventh lens element L11; a bi-convex twelfth lens element L12; and a planer-concave thirteenth lens element L13 with the concave surface facing the object side. The twelfth lens element L12 and the thirteenth lens element L13 are cemented with each other. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 8

The zoom lens system according to Embodiment 8, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The image side surface of the eighth lens element L8 is aspheric.

The fourth lens unit G4, in order from the object side to the image side, comprises: a positive meniscus ninth lens element L9 with the convex surface facing the object side; and a negative meniscus tenth lens element L10 with the convex surface facing the object side. The ninth lens element L9 and the tenth lens element L10 are cemented with each other with an adhesive layer in between.

The fifth lens unit G5, in order from the object side to the image side, comprises: a bi-convex eleventh lens element L11; a negative meniscus twelfth lens element L12 with the convex surface facing the object side; a bi-convex thirteenth lens element L13; a negative meniscus fourteenth lens element L14 with the convex surface facing the image side; and a bi-convex fifteenth lens element L15. The thirteenth lens element L13 and the fourteenth lens element L14 are cemented with each other with an adhesive layer in between. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 9

The zoom lens system according to Embodiment 9, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side. The fifth lens element L5 and the sixth lens element L6 are cemented with each other with an adhesive layer in between. The object side surface of the seventh lens element L7 is aspheric.

The third lens unit G3 is composed of a bi-convex eighth lens element L8. The image side surface of the eighth lens element L8 is aspheric.

The fourth lens unit G4, in order from the object side to the image side, comprises: a positive meniscus ninth lens element L9 with the convex surface facing the object side; and a negative meniscus tenth lens element L10 with the convex surface facing the object side. The ninth lens element L9 and the tenth lens element L10 are cemented with each other with an adhesive layer in between.

The fifth lens unit G5, in order from the object side to the image side, comprises: a bi-convex eleventh lens element L11; a negative meniscus twelfth lens element L12 with the convex surface facing the object side; a bi-convex thirteenth lens element L13; a negative meniscus fourteenth lens element L14 with the convex surface facing the image side; and a bi-convex fifteenth lens element L15. The thirteenth lens element L13 and the fourteenth lens element L14 are cemented with each other with an adhesive layer in between. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should decrease and then increase, and the interval between the fourth lens unit G4 and the fifth lens unit G5 should decrease and then increase. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 10

The zoom lens system according to Embodiment 10, in order from the object side to the image side, comprises a first lens unit G1 having positive optical power, a second lens unit G2 having negative optical power, a third lens unit G3 having positive optical power, a fourth lens unit G4 having positive optical power, and a fifth lens unit G5 having positive optical power.

The first lens unit G1, in order from the object side to the image side, comprises: a negative meniscus first lens element L1 with the convex surface facing the object side; a bi-convex second lens element L2; and a positive meniscus third lens element L3 with the convex surface facing the object side. The first lens element L1 and the second lens element L2 are cemented with each other with an adhesive layer in between.

The second lens unit G2, in order from the object side to the image side, comprises: a negative meniscus fourth lens element L4 with the convex surface facing the object side; a bi-concave fifth lens element L5; a bi-convex sixth lens element L6; and a negative meniscus seventh lens element L7 with the convex surface facing the image side.

The third lens unit G3 is composed of a bi-convex eighth lens element L8. The two surfaces of the eighth lens element L8 are aspheric.

The fourth lens unit G4, in order from the object side to the image side, comprises: a negative meniscus ninth lens element L9 with the convex surface facing the object side; and a positive meniscus tenth lens element L10 with the convex surface facing the object side. The ninth lens element L9 and the tenth lens element L10 are cemented with each other with an adhesive layer in between.

The fifth lens unit G5, in order from the object side to the image side, comprises: a bi-convex eleventh lens element L11; a negative meniscus twelfth lens element L12 with the convex surface facing the object side; a bi-convex thirteenth lens element L13; a bi-concave fourteenth lens element L14; and a bi-convex fifteenth lens element L15. The twelfth lens element L12, the thirteenth lens element L13 and the fourteenth lens element L14 are cemented with each other, each with an adhesive layer in between. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

Embodiment 11

The zoom lens system according to Embodiment 11, in order from the object side to the image side, comprises a first lens unit G1 having positive optical power, a second lens unit G2 having negative optical power, a third lens unit G3 having positive optical power, a fourth lens unit G4 having negative optical power, and a fifth lens unit G5 having positive optical power.

The first lens unit G1, in order from the object side to the image side, comprises: a negative meniscus first lens element L1 with the convex surface facing the object side; a positive meniscus second lens element L2 with the convex surface facing the object side; and a positive meniscus third lens element L3 with the convex surface facing the object side. The first lens element L1 and the second lens element L2 are cemented with each other.

The second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side. The object side surface of the fifth lens element L5 is aspheric.

The third lens unit G3 is composed of a bi-convex seventh lens element L7. The two surfaces of the seventh lens element L7 are aspheric.

The fourth lens unit G4, in order from the object side to the image side, comprises a bi-convex eighth lens element L8 and a bi-concave ninth lens element L9. The eighth lens element L8 and the ninth lens element L9 are cemented with each other.

The fifth lens unit G5, in order from the object side to the image side, comprises a bi-convex tenth lens element L10, a bi-concave eleventh lens element L11, and a bi-convex twelfth lens element L12. The object side surface of the eleventh lens element L11 is aspheric.

In zooming from a wide-angle limit to a telephoto limit, the first lens unit G1 to the fifth lens unit G5 individually move to the object side. More specifically, in zooming from a wide-angle limit to a telephoto limit, the individual lens units move along the optical axis such that the interval between the first lens unit G1 and the second lens unit G2 should increase, the interval between the second lens unit G2 and the third lens unit G3 should decrease, the interval between the third lens unit G3 and the fourth lens unit G4 should increase and then decrease, and the interval between the fourth lens unit G4 and the fifth lens unit G5 should decrease. The aperture diaphragm A moves to the object side together with the fourth lens unit G4.

Further, at the time of focusing from an infinity in-focus condition to a close-point in-focus condition, the third lens unit G3 moves to the image side along the optical axis.

The zoom lens system according to each of the above-mentioned embodiments includes, in order from an object side to an image side: a first lens unit having positive optical power; a second lens unit having negative optical power; a third lens unit having positive optical power; and an aperture diaphragm. At the time of zooming, each zoom lens system moves the first to third lens units so that intervals between these lens units vary. Further, at the time of focusing from an infinity in-focus condition to a close-point object in-focus condition, each zoom lens system moves the third lens unit to the object side. This arrangement of the focusing lens unit reduces the image magnification change generated at the time of focusing.

The following description is given for conditions to be satisfied by the zoom lens system according to each embodiment. Here, in the zoom lens system according to each embodiment, a plurality of conditions to be satisfied are set forth. Thus, a configuration of a zoom lens system that satisfies as many applicable conditions as possible is most preferable. However, when an individual condition is satisfied, a zoom lens system having the corresponding effect can be obtained.

It is preferable that the zoom lens system according to each embodiment satisfies the following condition.

$$1.2<|f_F/f_W|<6.0 \quad (1)$$

(here, $f_T/f_W>3.0$)
where,
$f_F$ is a focal length of the focusing lens unit,
$f_T$ is a focal length of the entire system at a telephoto limit, and
$f_W$ is focal length of the entire system at a wide-angle limit.

The condition (1) sets forth the focal length of the focusing lens unit. When the value exceeds the upper limit of the condition (1), the focal length of the focusing lens unit becomes excessively great, and hence the amount of movement at the time of focusing increases. This prevents realization of a compact zoom lens system. In contrast, when the value goes below the lower limit of the condition (1), The focal length of the focusing lens unit becomes excessively small. Thus, aberration fluctuation at the time of focusing becomes excessively large. Accordingly, aberration cannot be compensated by other lens units.

It is preferable that the zoom lens system according to each embodiment satisfies the following condition.

$$0.10<|f_F/f_T|<1.8 \quad (2)$$

(here, $f_T/f_W>3.0$)
where,
$f_F$ is a focal length of the focusing lens unit,
$f_T$ is a focal length of the entire system at a telephoto limit, and
$f_W$ is focal length of the entire system at a wide-angle limit.

The condition (2) sets forth the focal length of the focusing lens unit. When the value exceeds the upper limit of the condition (2), the focal length of the focusing lens unit becomes excessively great, and hence the amount of movement at the time of focusing increases. This prevents realization of a compact zoom lens system. In contrast, when the value goes below the lower limit of the condition (2), the focal length of the focusing lens unit becomes excessively small. Thus, aberration fluctuation at the time of focusing becomes excessively large. Further, error sensitivity in the focusing lens unit becomes high. This causes difficulty in assembling and adjustment.

It is preferable that the zoom lens system according to each embodiment satisfies the following condition.

$$1.00<|f_F/f_{NW}|<5.00 \quad (3)$$

(here, $f_T/f_W>3.0$)
where,
$f_F$ is a focal length of the focusing lens unit,
$f_{NW}$ is a composite focal length of the focusing lens unit and the negative lens unit in an infinity in-focus condition at a wide-angle limit when the focusing lens unit has negative optical power, or the focal length of the negative lens unit when the focusing lens unit has positive optical power,
$f_T$ is a focal length of the entire system at a telephoto limit, and
$f_W$ is focal length of the entire system at a wide-angle limit.

The condition (3) sets forth the ratio between the focal length of the focusing lens unit and the focal length of the negative lens unit. When the value exceeds the upper limit of the condition (3), the focal length of the focusing lens unit becomes excessively great, and hence the amount of movement at the time of focusing increases. This prevents realization of a compact zoom lens system. In contrast, when the value goes below the lower limit of the condition (3), aberration fluctuation generated at the time of zooming cannot be compensated by the subsequent lens units. Further, the image magnification change generated in association with the movement of the focusing lens unit becomes excessively large. Thus, this situation is unpreferable.

Among the zoom lens systems according to the individual embodiments, when the negative lens unit is arranged on the image side relative to the lens unit having positive optical power with the interval in between that varies at the time of zooming, it is preferable that the zoom lens system satisfies the following condition.

$$1.20<\beta_{NT}/\beta_{NW}<4.50 \quad (4)$$

(here, $f_T/f_W>3.0$)
where,
$\beta_{NT}$ is a composite focal length of the focusing lens unit and the negative lens unit in an infinity in-focus condition at a telephoto limit when the focusing lens unit has negative optical power, or a lateral magnification of the negative lens unit at a telephoto limit in an infinity in-focus condition when the focusing lens unit has positive optical power, $β_{NW}$ is a composite focal length of the focusing lens unit and the negative lens unit in an infinity in-focus condition at a wide-angle limit when the focusing lens unit has negative optical power, or a lateral magnification of the negative lens unit at a wide-angle limit in an infinity in-focus condition when the focusing lens unit has positive optical power, $f_T$ is a focal length of the entire system at a telephoto limit, and $f_W$ is focal length of the entire system at a wide-angle limit.

The condition (4) sets forth the magnification change in the negative lens unit, and substantially indicates the fraction of contribution to zooming. When the value goes outside the range of the condition (4), this situation causes difficulty in zooming itself. Further, aberration fluctuation generated at the time of zooming becomes excessively large, and hence cannot be compensated by other lens units.

Among the zoom lens systems according to the individual embodiments, when the negative lens unit is arranged on the image side relative to the lens unit having positive optical power with the interval in between that varies at the time of zooming, it is preferable that the zoom lens system satisfies the following condition.

$$0.01 < D_F/\Sigma D < 0.10 \quad (5)$$

where, $D_F$ is an axial thickness of the focusing lens unit, and $\Sigma D$ is a total of axial thicknesses of the lens elements in the entire system.

The condition (5) sets forth the axial thickness of the focusing lens unit. When the value exceeds the upper limit of the condition (5), the focusing lens unit becomes excessively large. This causes difficulty in focusing such as wobbling suitable for video image taking. In contrast, when the value goes below the lower limit of the condition (5), this situation causes difficulty in ensuring a focal length required for focusing. That is, the amount of movement at the time of focusing becomes excessively large, and hence this situation is unpreferable.

Among the zoom lens systems according to the individual embodiments, when the negative lens unit is arranged on the image side relative to the lens unit having positive optical power with the interval in between that varies at the time of zooming, it is preferable that the zoom lens system satisfies the following condition.

$$3.20 < |f_1/f_{NW}| < 8.50 \quad (6)$$

(here, $f_T/f_W > 3.0$)

where, $f_1$ is a focal length of the positive lens unit arranged on the object side of the focusing lens unit, $f_{NW}$ is a composite focal length of the focusing lens unit and the negative lens unit in an infinity in-focus condition at a wide-angle limit when the focusing lens unit has negative optical power, or the focal length of the negative lens unit when the focusing lens unit has positive optical power, $f_T$ is a focal length of the entire system at a telephoto limit, and $f_W$ is focal length of the entire system at a wide-angle limit.

The condition (6) sets forth the focal length of the positive lens unit arranged on the object side of the focusing lens unit. When the value exceeds the upper limit of the condition (6), aberration fluctuation generated at the time of zooming becomes excessively large. Further, difficulty arises in compensating off-axial aberration, especially, distortion. Thus, this situation is unpreferable. In contrast, when the value goes below the lower limit of the condition (6), aberration fluctuation generated at the time of zooming becomes excessively large. Further, degradation is caused in the performance at the time of focusing on a close object, and hence this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$0.15 < D_{FWA}/f_W < 0.30 \quad (14)$$

(here, $f_T/f_W > 3.0$)

where, $D_{FWA}$ is an axial interval from the vertex of a surface on the most image side of the focusing lens unit to the aperture diaphragm, $f_T$ is a focal length of the entire system at a telephoto limit, and $f_W$ is focal length of the entire system at a wide-angle limit.

The condition (14) sets forth the axial interval from the focusing lens unit to the aperture diaphragm in a case that the focusing lens unit has negative optical power. When the value exceeds the upper limit of the condition (14), the axial interval between the focusing lens unit and the aperture diaphragm becomes excessively great, and hence the focal length of the focusing lens unit increases relatively. This causes difficulty in realizing a compact zoom lens system. Further, when the value exceeds the upper limit of the condition (14), difficulty arises in compensating aberration, especially, spherical aberration fluctuation, generated at the time of focusing. In contrast, when the value goes below the lower limit of the condition (14), the axial interval between the focusing lens unit and the aperture diaphragm becomes excessively small. This causes difficulty in compensating distortion especially at a wide-angle limit, and hence this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$0.50 < (D_F/f_W)*(f_T/f_W) < 1.50 \quad (15)$$

(here, $f_T/f_W > 3.0$)

where, $D_F$ is an axial thickness of the focusing lens unit, $f_T$ is a focal length of the entire system at a telephoto limit, and $f_W$ is focal length of the entire system at a wide-angle limit.

The condition (15) sets forth the axial thickness of the focusing lens unit. When the value exceeds the upper limit of the condition (15), the axial thickness of the focusing lens unit becomes excessively great, and hence the weight of the focusing lens unit increases. Thus, this situation is unpreferable. In contrast, when the value goes below the lower limit of the condition (15), the axial thickness of the focusing lens unit becomes excessively small. This causes difficulty in manufacturing.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$0.02 < |D_F/f_F| < 0.15 \qquad (16)$$

(here, $f_T/f_W > 3.0$)
where,
$D_F$ is an axial thickness of the focusing lens unit,
$f_F$ is a focal length of the focusing lens unit,
$f_T$ is a focal length of the entire system at a telephoto limit, and
$f_W$ is focal length of the entire system at a wide-angle limit.

The condition (16) relates to the focal length of the focusing lens unit. When the value exceeds the upper limit of the condition (16), the focal length of the focusing lens unit becomes excessively small. This causes difficulty in compensating aberration fluctuation at the time of focusing. In contrast, when the value goes below the lower limit of the condition (16), the focal length of the focusing lens unit becomes excessively great. Thus, the amount of movement at the time of focusing, especially at the time of wobbling, becomes excessively large. Hence, this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$3.00 < |f_1/f_2| < 8.00 \qquad (17)$$

where,
$f_1$ is a focal length of the positive lens unit, and
$f_2$ is a focal length of the negative lens unit.

The condition (17) sets forth the focal length ratio between the positive lens unit and the negative lens unit. When the value exceeds the upper limit of the condition (17), this indicates that the focal length of the positive lens unit is excessively great. This causes difficulty in compensating distortion. In contrast, when the value goes below the lower limit of the condition (17), this indicates that the focal length of the negative lens unit is excessively great. Thus, the amount of movement of the negative lens unit at the time of zooming becomes excessively large, and hence this situation is unpreferable.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$0.20 < |f_2/f_F| < 0.80 \qquad (18)$$

where,
$f_2$ is a focal length of the negative lens unit, and
$f_F$ is a focal length of the focusing lens unit.

The condition (18) sets forth the focal length ratio between the focusing lens unit and the negative lens unit. When the value exceeds the upper limit of the condition (18), this indicates that the focal length of the focusing lens unit is excessively small. Thus, the image magnification change at the time of focusing becomes excessively large, and hence this situation is unpreferable. In contrast, when the value goes below the lower limit of the condition (18), this indicates that the focal length of the negative lens unit is excessively small.

This causes an increase in aberration fluctuation at the time of zooming, and hence causes difficulty in compensation by other lens units.

Among the zoom lens systems according to the individual embodiments, in a case that the negative lens unit is arranged on the image side relative to the lens unit having positive optical power with the interval in between that varies at the time of zooming and that the focusing lens unit has positive optical power, it is preferable that the zoom lens system satisfies the following condition.

$$1.50 < |f_1/f_F| < 4.00 \qquad (19)$$

where,
$f_1$ is a focal length of the lens unit having positive optical power, and
$f_F$ is a focal length of the focusing lens unit.

The condition (19) sets forth the focal length ratio between the focusing lens unit and the positive lens unit. When the value exceeds the upper limit of the condition (19), this indicates that the focal length of the focusing lens unit is excessively small. Thus, the image magnification change at the time of focusing becomes excessively large, and hence this situation is unpreferable. In contrast, when the value goes below the lower limit of the condition (19), this indicates that the focal length of the positive lens unit is excessively small. This causes an increase in aberration fluctuation at the time of zooming, and hence causes difficulty in compensation by other lens units.

Here, the individual lens units constituting each embodiment are composed exclusively of refractive type lens elements that deflect incident light by refraction (that is, lens elements of a type in which deflection is achieved at the interface between media each having a distinct refractive index). However, the present invention is not limited to this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

Embodiment 12

Figure 39:
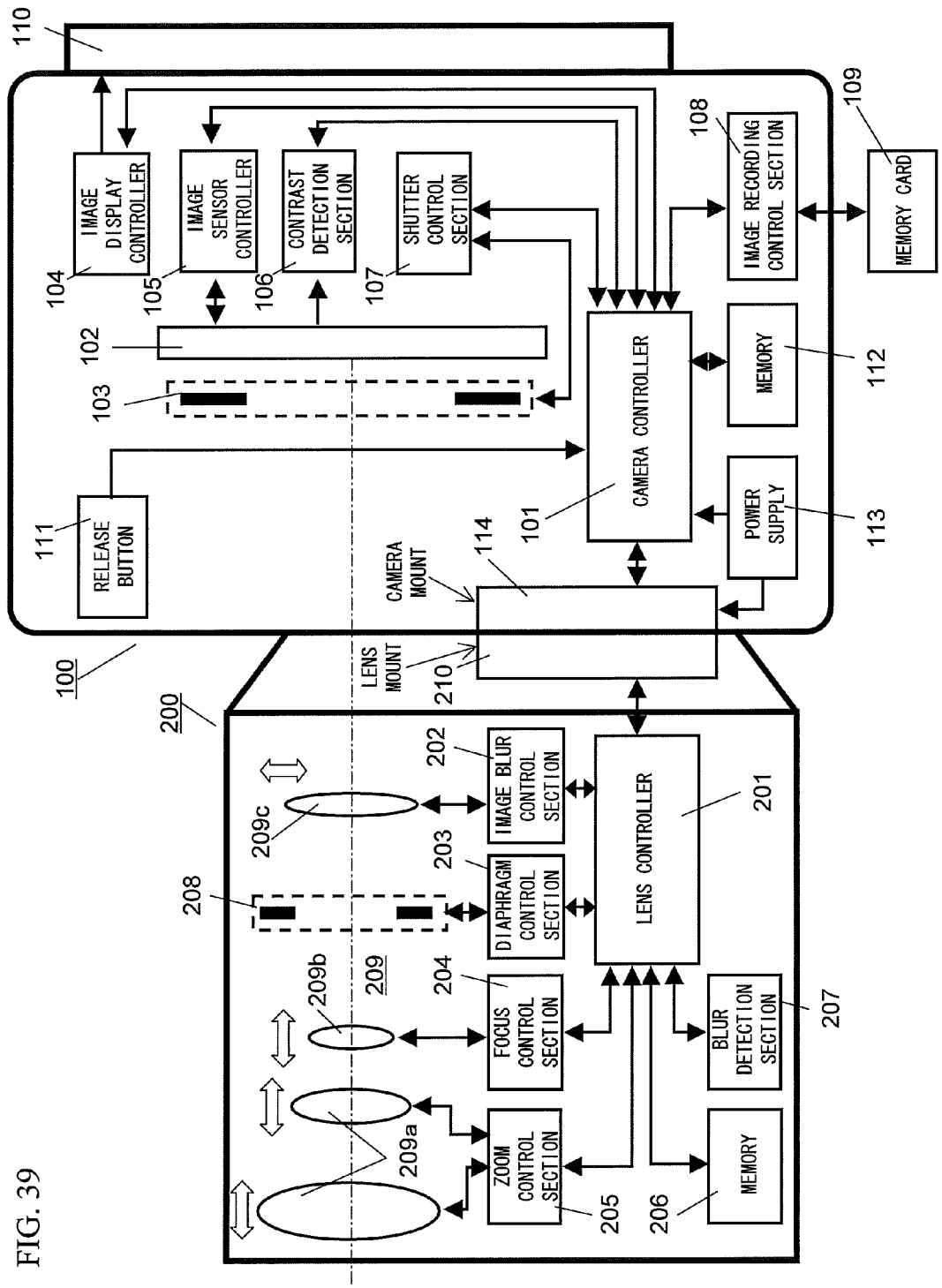
FIG. 39 is a block diagram of a camera system according to Embodiment 12.

FIG. 39 is a block diagram of a camera system according to Embodiment 12. The camera system according to Embodiment 12 includes a camera body 100 and an interchangeable lens apparatus 200.

The camera body 100 includes a camera controller 101, an image sensor 102, a shutter unit 103, an image display controller 104, an image sensor control section 105, a contrast detection section 106, a shutter control section 107, an image recording control section 108, a display 110, a release button 111, a memory 112, a power supply 113 and a camera mount 114.

The camera controller 101 is an arithmetic operation unit for controlling the entire camera system. The camera controller 101 is electrically connected to the image display controller 104, the image sensor control section 105, the contrast detection section 106, the shutter control section 107, the image recording control section 108, the memory 112 and the camera mount 114, and can exchange signals with these sections. Further, the camera controller 101 is electrically connected to the release button 111, and receives a signal generated at the time of operation of the release button 111. Moreover, the camera controller 101 is connected to the power supply 113.

The image sensor 102 is composed, for example, of a CMOS sensor. The image sensor 102 converts an optical image incident on the light receiving plane into image data, and then outputs the image data. The image sensor 102 is driven in accordance with a driving signal from the image sensor control section 105. In response to a control signal from the camera controller 101, the image sensor control section 105 outputs a driving signal for driving the image sensor 102, and then outputs to the camera controller 101 the image data outputted from the image sensor 102. In response to a control signal from the camera controller 101, the contrast detection section 106 calculates and detects the contrast of the image data outputted from the image sensor 102, and then outputs the result to the camera controller 101.

The shutter unit 103 includes a shutter plate for shutting off the optical path for the image light to be incident on the image sensor 102. The shutter unit 103 is driven in accordance with a driving signal from the shutter control section 107. In response to a control signal from the camera controller 101, the shutter control section 107 controls the opening or closing timing for the shutter plate of the shutter unit 103.

The display 110 is composed, for example, of a liquid crystal display unit. The display 110 is driven in accordance with a driving signal from the image display controller 104 so as to display an image on the display surface. In response to a control signal from the camera controller 101, the image display controller 104 outputs image data to be displayed on the display 110 and a driving signal for driving the display 110.

In response to a control signal from the camera controller 101, the image recording control section 108 outputs image data to a memory card 109 connected in an attachable and removable manner.

The camera mount 114 mechanically connects the camera body 100 to the interchangeable lens apparatus 200 described later. Further, the camera mount 114 serves also as an interface for electrically connecting the camera body 100 to the interchangeable lens apparatus 200 described later.

The interchangeable lens apparatus 200 includes a lens controller 201, an image blur control section 202, a diaphragm control section 203, a focus control section 204, a zoom control section 205, a memory 206, a blur detection section 207, a diaphragm unit 208, a zoom lens system 209 (a zoom lens unit 209a, a focusing lens unit 209b and an image blur compensation lens unit 209c), and a lens mount 210.

The lens controller 201 is an arithmetic operation unit for controlling the entirety of the interchangeable lens apparatus 200, and is connected through the lens mount 210 and the camera mount 114 to the camera controller 101 in the camera body described above. The lens controller 201 is electrically connected to the image blur control section 202, the diaphragm control section 203, the focus control section 204, the zoom control section 205, the memory 206 and the blur detection section 207, and can exchange signals with these sections.

The zoom lens system 209 is a zoom lens system according to Embodiment 1 described above. The zoom lens system 209 includes a zoom lens unit 209a, a focusing lens unit 209b, and an image blur compensation lens unit 209c. Here, the classification of the zoom lens unit 209a, the focusing lens unit 209b and the image blur compensation lens unit 209c is merely conceptual and adopted for simplicity of description. Thus, this classification does not exactly describe the actual construction of the actual zoom lens system. In the zoom lens system 209, zooming is achieved when the zoom lens unit 209a moves in a direction along the optical axis. In the zoom lens system 209, focusing is achieved when the focusing lens unit 209b moves in a direction along the optical axis. Further, in the zoom lens system 209, image blur compensation is achieved when the image blur compensation lens unit 209c moves in a direction perpendicular to the optical axis.

In response to a control signal from the lens controller 201, the image blur control section 202 detects and outputs the present position of the image blur compensation lens unit 209c. Further, the image blur control section 202 outputs a driving signal for driving the image blur compensation lens unit 209c, so as to drive the image blur compensation lens unit 209c in a direction perpendicular to the optical axis.

In response to a control signal from the lens controller 201, the diaphragm control section 203 detects and outputs the present position of the diaphragm unit 208. Further, the diaphragm control section 203 outputs a driving signal for driving the diaphragm blades provided in the diaphragm unit 208, and thereby opens or closes the diaphragm so as to change the F-number of the optical system.

In response to a control signal from the lens controller 201, the focus control section 204 detects and outputs the present position of the focusing lens unit 209b. Further, the focus control section 204 outputs a driving signal for driving focusing group 209b, so as to drive the focusing lens unit 209b in a direction along the optical axis.

In response to a control signal from the lens controller 201, the zoom control section 205 detects and outputs the present position of the zoom lens unit 209a. Further, the zoom control section 205 outputs a driving signal for driving the zoom lens unit 209a, so as to drive the zoom lens unit 209a in a direction along the optical axis.

In the above-mentioned configuration, when the release button 111 is pressed half, the camera controller 101 executes a routine of auto-focusing. First, the camera controller 101 communicates with the lens controller 201 via the camera mount 114 and the lens mount 210, so as to detect the state of the zoom lens unit 209a, the focusing lens unit 209b, the image blur compensation lens unit 209c and the diaphragm unit 208.

Then, the camera controller 101 communicates with the lens controller 201 via the camera mount 114 and the lens mount 210, so as to output to the lens controller 201a control signal for driving and wobbling the focusing lens unit 209b. In accordance with the control signal, the lens controller 201 controls the focus control section 204 so as to drive and wobble the focusing lens unit 209b. At the same time, the camera controller 101 communicates with the lens controller 201 via the camera mount 114 and the lens mount 210, so as to output a control signal for instructing the lens controller 201 to adjust the aperture value into a predetermined value. In accordance with the control signal, the lens controller 201 controls the diaphragm control section 203 so as to drive the diaphragm blades of the diaphragm unit 208 in correspondence to the predetermined F-number.

On the other hand, the camera controller 101 outputs a control signal to the image sensor control section 105 and the contrast detection section 106. The image sensor control section 105 and the contrast detection section 106 individually acquire an output from the image sensor 102 in a manner corresponding to the sampling frequency of the wobbling drive of the focusing lens unit 209b. In accordance with the control signal from the camera controller 101, the image sensor control section 105 transmits image data corresponding to the optical image to the camera controller 101. The camera controller 101 performs predetermined image processing onto the image data, and then transmits the result to the image display controller 104. The image display controller 104 displays the image data in the form of a visible image onto the display 110.

Further, the contrast detection section 106 calculates the contrast value of the image data in association with wobbling, and then transmits the result to the camera controller 101. On the basis of the detection result from the contrast detection section 106, the camera controller 101 determines the direction of focusing movement and the amount of movement for the focusing lens unit, and then transmits the information thereof to the lens controller 201. The lens controller 201 outputs a control signal to the focus control section 204 so as to move the focusing lens unit 209b. In accordance with the control signal from the lens controller 201, the focus control section 204 drives the focusing lens unit 209b.

When auto-focusing is to be performed in a live view state, the above-mentioned operation is repeated. When auto-focusing is to be performed in a live view state, wobbling of the focusing lens unit 209b is performed continuously. At that time, the zoom lens system according to each embodiment has merely a small image magnification change in association with wobbling, and has a light weight. Thus, an imaging lens system suitable for the above-mentioned system is obtained.

Embodiment 12 given above has been described for a case that the zoom lens system according to Embodiment 1 is employed. However, obviously, a zoom lens system according to another embodiment may be employed. Here, among the zoom lens systems according to the embodiments, when a zoom lens system that does not include the image blur compensation lens unit 209c is employed, the configuration of the image blur control section 202 and the like is omitted.

EXAMPLES

Numerical examples are described below in which the zoom lens systems according to Embodiments 1 to 11 are implemented. As described later, Numerical Examples 1 to 11 correspond to Embodiments 1 to 11, respectively. In the numerical examples, the units of the length in the tables are all "mm", while the units of the view angle are all "°". Moreover, in the numerical examples, r is the radius of curvature, d is the axial distance, nd is the refractive index to the d-line, and vd is the Abbe number to the d-line. In the numerical examples, the surfaces marked with * are aspheric surfaces, and the aspheric surface configuration is defined by the following expression.

$$Z = \frac{h^2/r}{1 + \sqrt{1 - (1+\kappa)(h/r)^2}} + \sum A_n h^n$$

Here, the symbols in the formula indicate the following quantities.

Z is the distance from a point on an aspheric surface at a height h relative to the optical axis to a tangential plane at the vertex of the aspheric surface, h is the height relative to the optical axis, r is the radius of curvature at the top, k is the conic constant, and An is the n-th order aspherical coefficient.

FIGS. 2, 6, 10, 14, 18, 22, 25, 28, 31, 34 and 37 are longitudinal aberration diagrams of an infinity in-focus condition of the zoom lens systems according to Numerical Examples 1, 2, 3, 4, 5, 6, 7, 8, 9, 10 and 11, respectively.

FIGS. 3, 7, 11, 15, 19, 23, 26, 29, 32, 35 and 38 are longitudinal aberration diagrams of a close-point in-focus condition of the zoom lens systems according to Numerical Examples 1, 2, 3, 4, 5, 6, 7, 8, 9, 10 and 11, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal image plane (in each Fig., indicated as "s") and the meridional image plane (in each Fig., indicated as "m"), respectively. In each distortion diagram, the vertical axis indicates the image height (in each Fig., indicated as H).

In each numerical example, as seen from the longitudinal aberration diagram of an infinity in-focus condition and the longitudinal aberration diagram of a close-point in-focus condition, also in a close-point in-focus condition, each zoom lens system achieves satisfactory aberration performance similar to that in an infinity in-focus condition.

FIGS. 4, 8, 12, 16 and 20 are lateral aberration diagrams in a basic state where image blur compensation is not performed and in an image blur compensation state of a zoom lens system according to Numerical Examples 1, 2, 3, 4 and 5, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entire second lens unit G2 moves by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional image plane is adopted as the plane containing the optical axis of the first lens unit G1.

Here, in the zoom lens system according to each numerical example, the amount ($Y_T$) of movement of the compensation lens unit in a direction perpendicular to the optical axis in an image blur compensation state at a telephoto limit is as follows.

TABLE 1

(amount of movement of compensation lens unit)

| Numerical Example | $Y_T$ |
|---|---|
| 1 | 0.400 |
| 2 | 0.500 |
| 3 | 0.500 |
| 4 | 0.200 |
| 5 | 0.050 |

As seen from the lateral aberration diagrams, in each zoom lens system, satisfactory symmetry is obtained in the lateral aberration at the axial image point. Further, when the lateral aberration at the +75% image point and the lateral aberration at the −75% image point are compared with each other in a basic state, all have a small degree of curvature and almost the same inclination in the aberration curve. Thus, decentering coma aberration and decentering astigmatism are small. This indicates that satisfactory imaging performance is obtained even in an image blur compensation state. Further, when the image blur compensation angle of a zoom lens system is the same, the amount of parallel translation required for image blur compensation decreases with decreasing focal length of the entire zoom lens system. Thus, at arbitrary zoom positions, satisfactory image blur compensation can be performed without degrading the imaging characteristics.

Numerical Example 1

The zoom lens system of Numerical Example 1 corresponds to Embodiment 1 shown in FIG. 1. Table 2 shows the surface data of the zoom lens system of Numerical Example 1. Table 3 shows the aspherical data. Table 4 shows various data. Table 5 shows the zoom lens unit data.

TABLE 2

(surface data)

| Surface number | r | d | nd | vd |
|---|---|---|---|---|
| Object surface | ∞ | | | |
| 1 | 80.00000 | 1.20000 | 1.84666 | 23.8 |
| 2 | 35.23940 | 4.60490 | 1.62299 | 58.1 |
| 3 | 146.60500 | 0.10000 | | |
| 4 | 32.99430 | 4.17360 | 1.80420 | 46.5 |
| 5 | 121.46300 | Variable | | |
| 6* | 56.16390 | 1.20000 | 1.85976 | 40.5 |
| 7 | 8.12330 | 4.35250 | | |
| 8 | −21.45650 | 0.70000 | 1.88300 | 40.8 |
| 9 | 34.64830 | 0.71300 | | |
| 10 | 22.59170 | 2.59950 | 1.92286 | 20.9 |
| 11 | −28.93770 | 0.83860 | | |
| 12 | −13.14350 | 0.80000 | 1.80420 | 46.5 |
| 13 | −30.75660 | Variable | | |
| 14 | 19.23570 | 0.70000 | 1.81183 | 28.8 |
| 15 | 10.73730 | 2.42280 | 1.64139 | 56.0 |
| 16* | −36.39360 | Variable | | |
| 17 (Aperture) | ∞ | 0.80000 | | |
| 18 | 14.06440 | 2.43070 | 1.63547 | 59.4 |
| 19 | −37.47820 | 0.10000 | | |
| 20 | 48.44800 | 2.04680 | 1.51782 | 55.4 |
| 21 | −14.08110 | 0.80000 | 1.80429 | 46.4 |
| 22 | 13.50040 | Variable | | |
| 23 | 18.77840 | 3.50520 | 1.48749 | 70.4 |
| 24 | −15.03170 | 0.09980 | | |
| 25* | −38.22710 | 1.20000 | 1.68400 | 31.3 |
| 26 | 24.64730 | 0.47430 | | |
| 27 | 48.87990 | 3.73520 | 1.56071 | 43.9 |
| 28 | −10.22970 | 0.70000 | 1.80420 | 46.5 |
| 29 | −35.25900 | BF | | |
| Image surface | ∞ | | | |

TABLE 3

(aspherical data)

| Surface No. | Parameters |
|---|---|
| 6 | K = 0.00000E+00, A4 = 3.77145E−05, A6 = −3.27660E−07, A8 = 4.20835E−09, A10 = −3.84294E−11, A12 = 1.53222E−13 |
| 16 | K = 0.00000E+00, A4 = 3.61692E−05, A6 = −6.05514E−08, A8 = −1.68025E−09, A10 = 0.00000E+00, A12 = 0.00000E+00 |
| 25 | K = 0.00000E+00, A4 = −9.27327E−05, A6 = −7.61534E−07, A8 = −1.95775E−09, A10 = 2.58420E−10, A12 = −3.50474E−12 |

TABLE 4

(various data)

| Zooming ratio | | 4.77508 | |
|---|---|---|---|
| | Wide | Middle | Telephoto |
| Focal length | 12.2510 | 26.7706 | 58.4997 |
| F-number | 3.60055 | 5.10050 | 5.70104 |
| View angle | 43.5988 | 21.8377 | 10.3518 |
| Image height | 11.0000 | 11.0000 | 11.0000 |
| Overall length of lens system | 75.1917 | 87.4143 | 107.7782 |
| BF | 14.23280 | 27.63772 | 41.54696 |
| d5 | 0.8000 | 10.1196 | 20.3594 |
| d13 | 11.2845 | 4.7436 | 1.2000 |
| d16 | 2.0562 | 2.3579 | 3.1478 |
| d22 | 6.5213 | 2.2586 | 1.2271 |

TABLE 5

(zoom lens unit data)

| Unit | Initial surface No. | Focal length |
|---|---|---|
| 1 | 1 | 55.88415 |
| 2 | 6 | −8.05102 |
| 3 | 14 | 23.12958 |
| 4 | 17 | 169.26047 |
| 5 | 23 | 41.63152 |

Numerical Example 2

Figure 5:
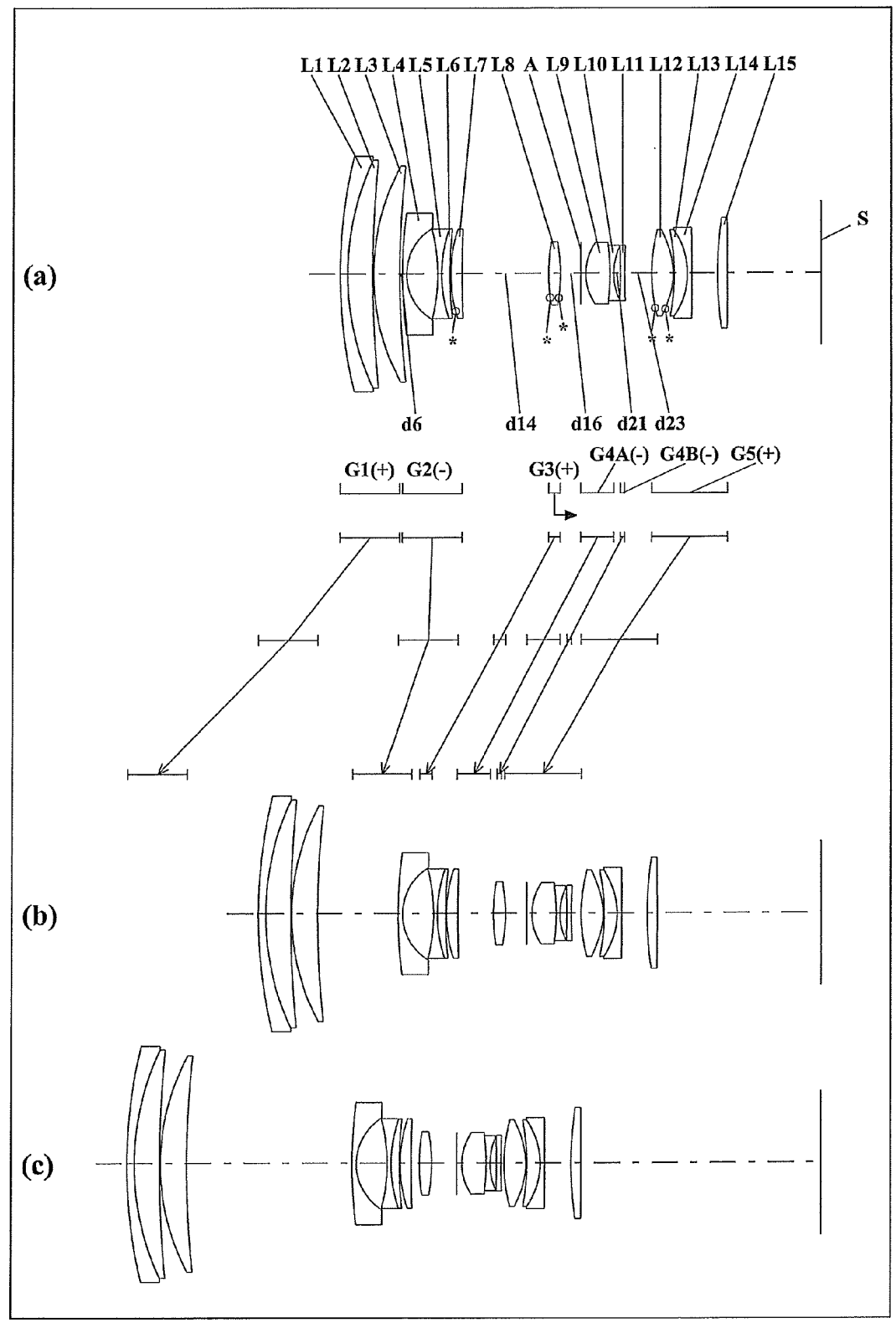
FIG. 5 is a lens arrangement diagram showing an infinity in-focus condition of a zoom lens system according to Embodiment 2 (Example 2)
Figure 6:
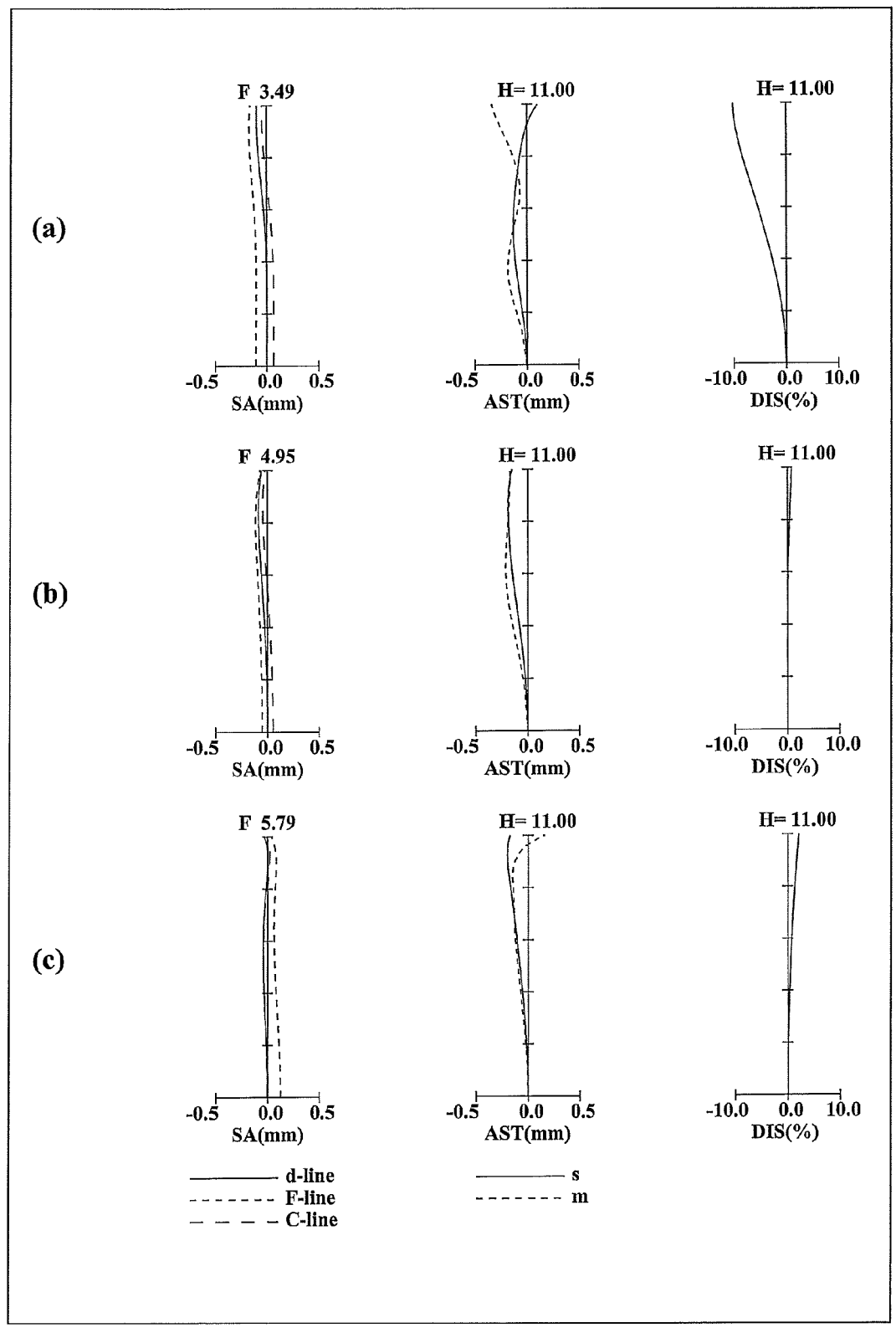
FIG. 6 is a longitudinal aberration diagram showing an infinity in-focus condition of a zoom lens system according to Example 2.
Figure 7:
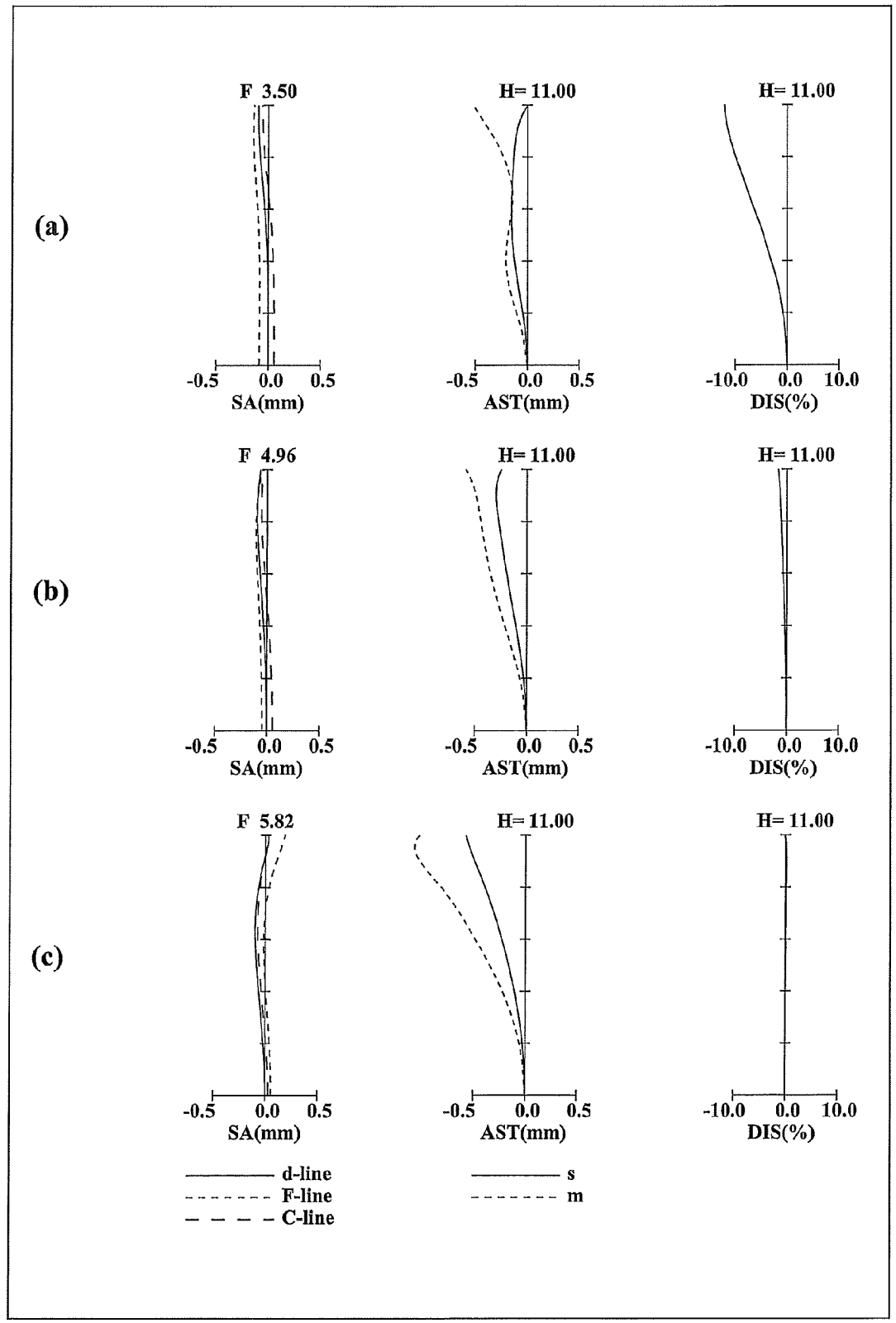
FIG. 7 is a longitudinal aberration diagram showing a close-point in-focus condition of a zoom lens system according to Example 2.
Figure 8:
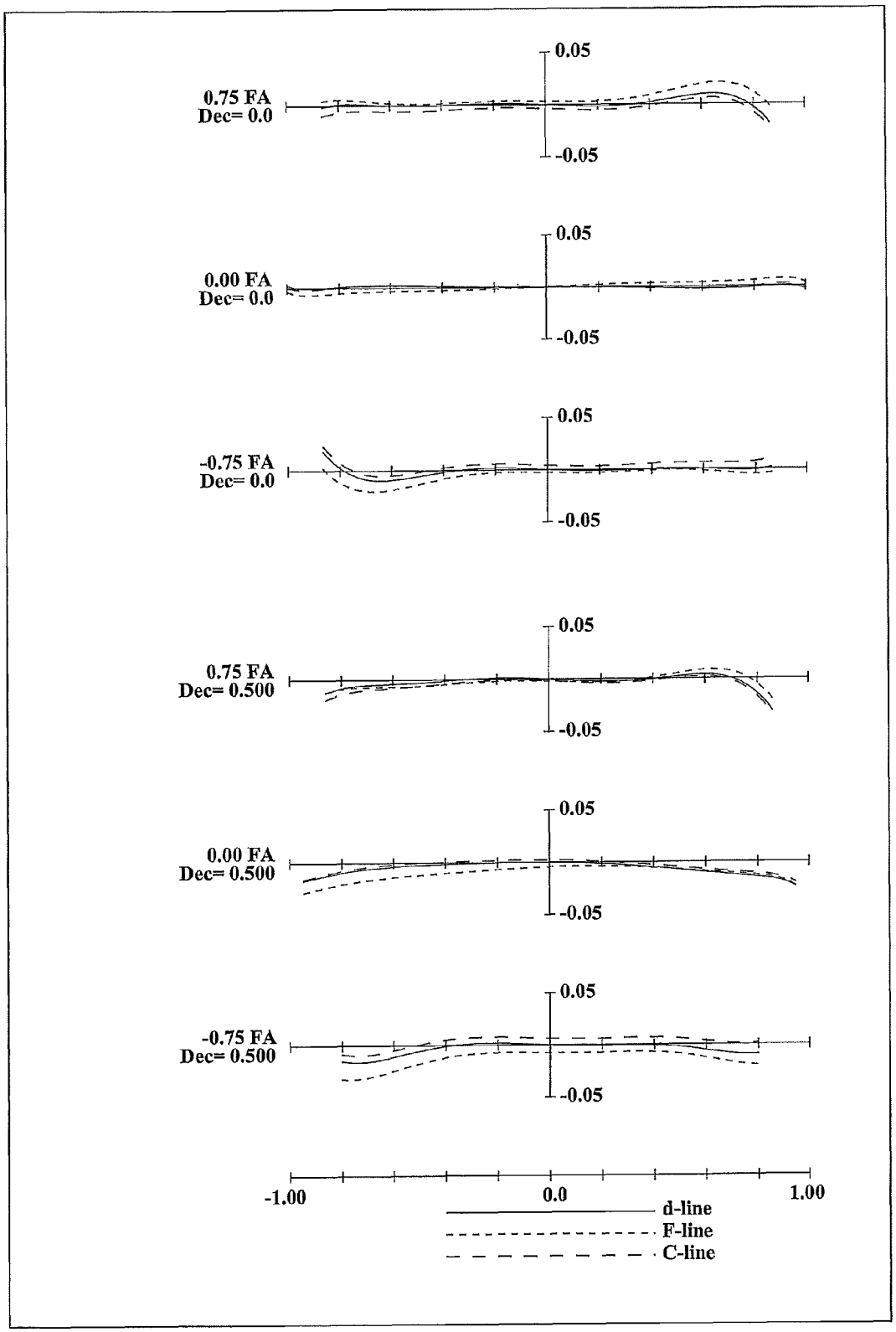
FIG. 8 is a lateral aberration diagram in a basic state where image blur compensation is not performed and in an image blur compensation state at a telephoto limit of a zoom lens system according to Example 2.

The zoom lens system of Numerical Example 2 corresponds to Embodiment 2 shown in FIG. 5. Table 6 shows the surface data of the zoom lens system of Numerical Example 2. Table 7 shows the aspherical data. Table 8 shows various data. Table 9 shows the zoom lens unit data.

TABLE 6

(surface data)

| Surface number | r | d | nd | vd |
|---|---|---|---|---|
| Object surface | ∞ | | | |
| 1 | 79.85740 | 1.20000 | 1.84666 | 23.8 |
| 2 | 42.90190 | 0.01000 | 1.56732 | 42.8 |
| 3 | 42.90190 | 4.02100 | 1.62299 | 58.1 |
| 4 | 178.47990 | 0.15000 | | |
| 5 | 36.47630 | 4.21400 | 1.58913 | 61.3 |
| 6 | 156.48860 | Variable | | |
| 7 | 75.42430 | 0.70000 | 1.88300 | 40.8 |
| 8 | 8.63110 | 4.99200 | | |
| 9 | −27.78580 | 0.60000 | 1.72916 | 54.7 |
| 10 | 22.16910 | 0.01000 | 1.56732 | 42.8 |

TABLE 6-continued (surface data)

| Surface number | r | d | nd | vd |
|---|---|---|---|---|
| 11 | 22.16910 | 1.32120 | 1.94595 | 18.0 |
| 12 | 64.47310 | 0.15000 | | |
| 13* | 25.20890 | 1.78380 | 1.68400 | 31.3 |
| 14 | 200.13630 | Variable | | |
| 15* | 31.56710 | 1.92050 | 1.68863 | 52.8 |
| 16* | −24.98200 | Variable | | |
| 17 (Aperture) | ∞ | 0.80000 | | |
| 18 | 8.86320 | 3.88860 | 1.51214 | 67.9 |
| 19 | −34.59720 | 0.01000 | 1.56732 | 42.8 |
| 20 | −34.59720 | 0.60000 | 1.83400 | 37.3 |
| 21 | 10.45970 | 1.02340 | | |
| 22 | −171.29230 | 0.70000 | 1.81427 | 37.6 |
| 23 | 85.40420 | Variable | | |
| 24* | 25.85530 | 3.50930 | 1.60820 | 57.8 |
| 25* | −12.17470 | 0.15160 | | |
| 26 | −37.41050 | 2.11200 | 1.48746 | 70.3 |
| 27 | −12.12240 | 0.01000 | 1.56732 | 42.8 |
| 28 | −12.12240 | 0.70000 | 1.82087 | 33.5 |
| 29 | −623.66470 | 4.14200 | | |
| 30 | 59.92360 | 1.62660 | 1.84679 | 23.9 |
| 31 | −573.64510 | BF | | |
| Image surface | ∞ | | | |

TABLE 7

(aspherical data)

| Surface No. | Parameters |
|---|---|
| 13 | K = 7.76662E−01, A4 = 3.17829E−05, A6 = −8.33555E−08, A8 = −1.21719E−09, A10 = 1.59898E−10, A12 = −2.09850E−12 |
| 15 | K = 0.00000E+00, A4 = −6.99200E−06, A6 = 1.81625E−06, A8 = −2.31634E−08, A10 = 1.64207E−09, A12 = 0.00000E+00 |
| 16 | K = 0.00000E+00, A4 = 2.92032E−05, A6 = 1.26564E−06, A8 = −1.15990E−08, A10 = 1.65715E−09, A12 = 0.00000E+00 |
| 24 | K = −7.69668E−01, A4 = −3.70313E−05, A6 = 8.27040E−07, A8 = −5.36566E−08, A10 = 1.55393E−09, A12 = −9.43912E−12 |
| 25 | K = 1.15274E+00, A4 = 1.22175E−04, A6 = 3.94692E−06, A8 = −9.69229E−08, A10 = 1.83580E−09, A12 = 0.00000E+00 |

TABLE 8

(various data)

| | Zooming ratio | 4.69384 | |
|---|---|---|---|
| | Wide | Middle | Telephoto |
| Focal length | 12.3601 | 26.7744 | 58.0164 |
| F-number | 3.49386 | 4.94748 | 5.78661 |
| View angle | 44.7403 | 22.1717 | 10.5263 |
| Image height | 11.0000 | 11.0000 | 11.0000 |
| Overall length of lens system | 77.2022 | 90.3080 | 111.1832 |
| BF | 15.01926 | 26.33363 | 38.54196 |
| d6 | 0.4209 | 12.9271 | 26.4526 |
| d14 | 13.7989 | 5.6781 | 1.3151 |
| d16 | 3.2098 | 3.4219 | 4.0175 |
| d23 | 4.4073 | 1.6013 | 0.5100 |

TABLE 9

(zoom lens unit data)

| Unit | Initial surface No. | Focal length |
|---|---|---|
| 1 | 1 | 69.86430 |
| 2 | 7 | −10.08322 |
| 3 | 15 | 20.53559 |
| 4 | 17 | −34.55578 |
| 5 | 24 | 21.26831 |

Numerical Example 3

Figure 9:
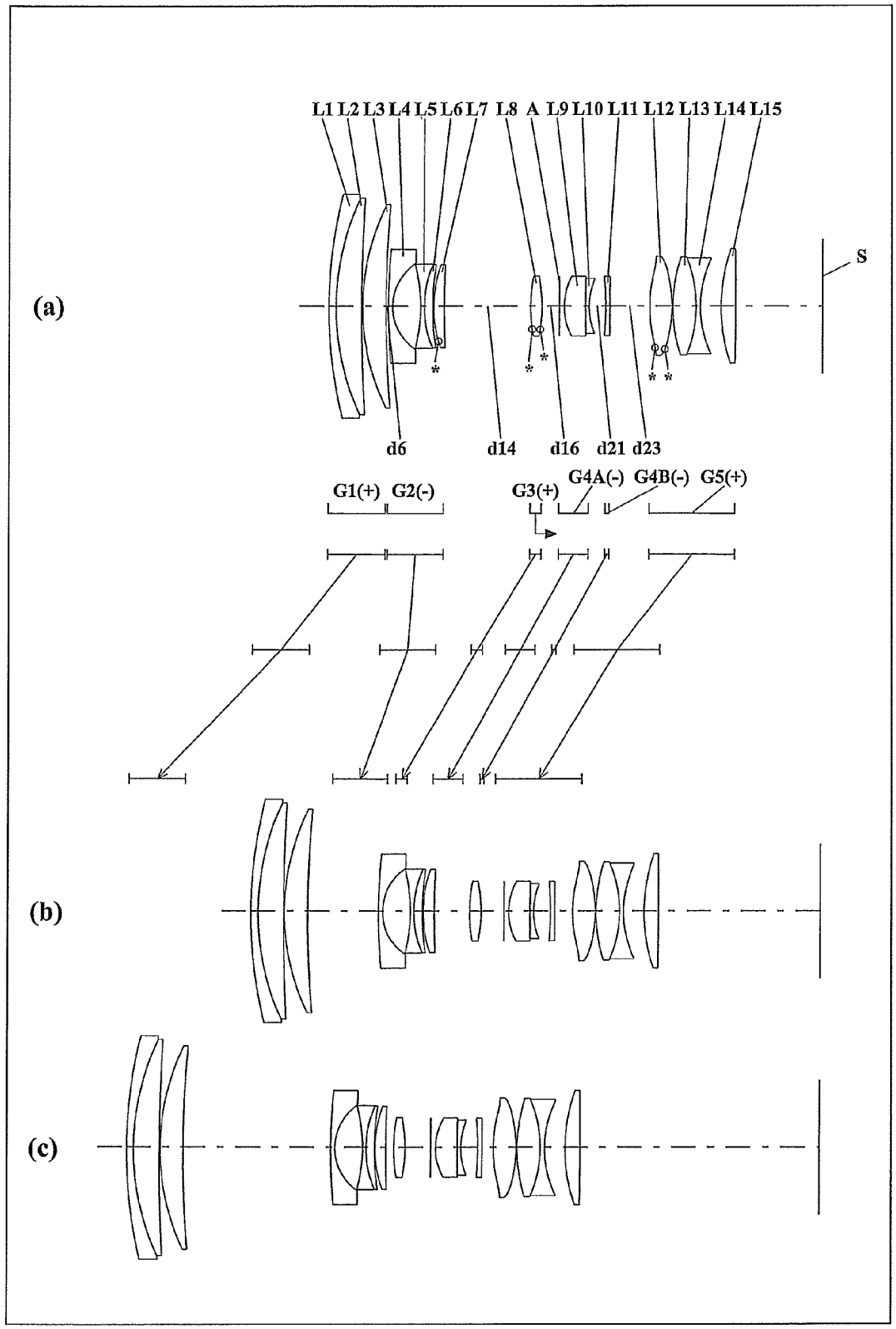
FIG. 9 is a lens arrangement diagram showing an infinity in-focus condition of a zoom lens system according to Embodiment 3 (Example 3)
Figure 10:
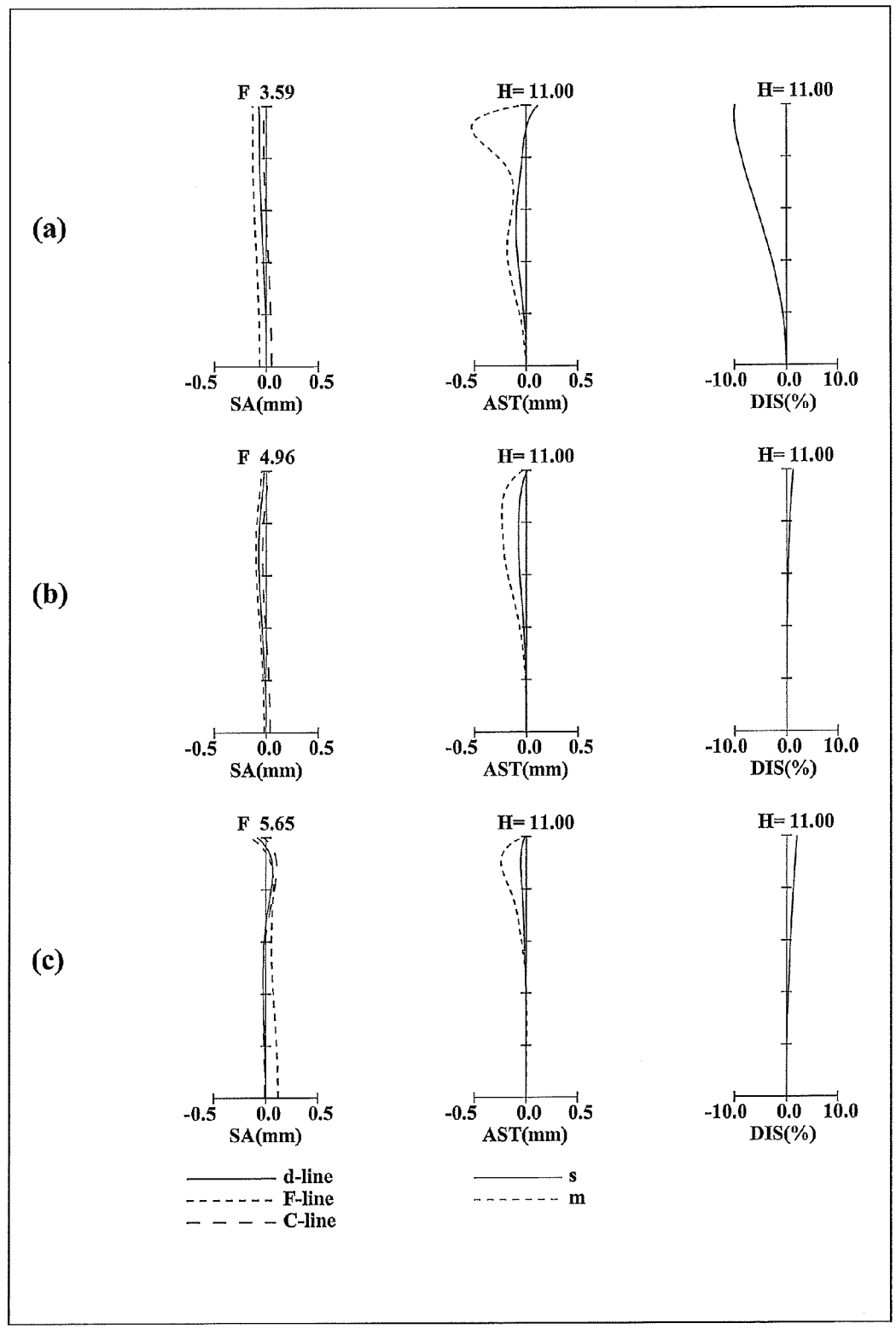
FIG. 10 is a longitudinal aberration diagram showing an infinity in-focus condition of a zoom lens system according to Example 3.
Figure 11:
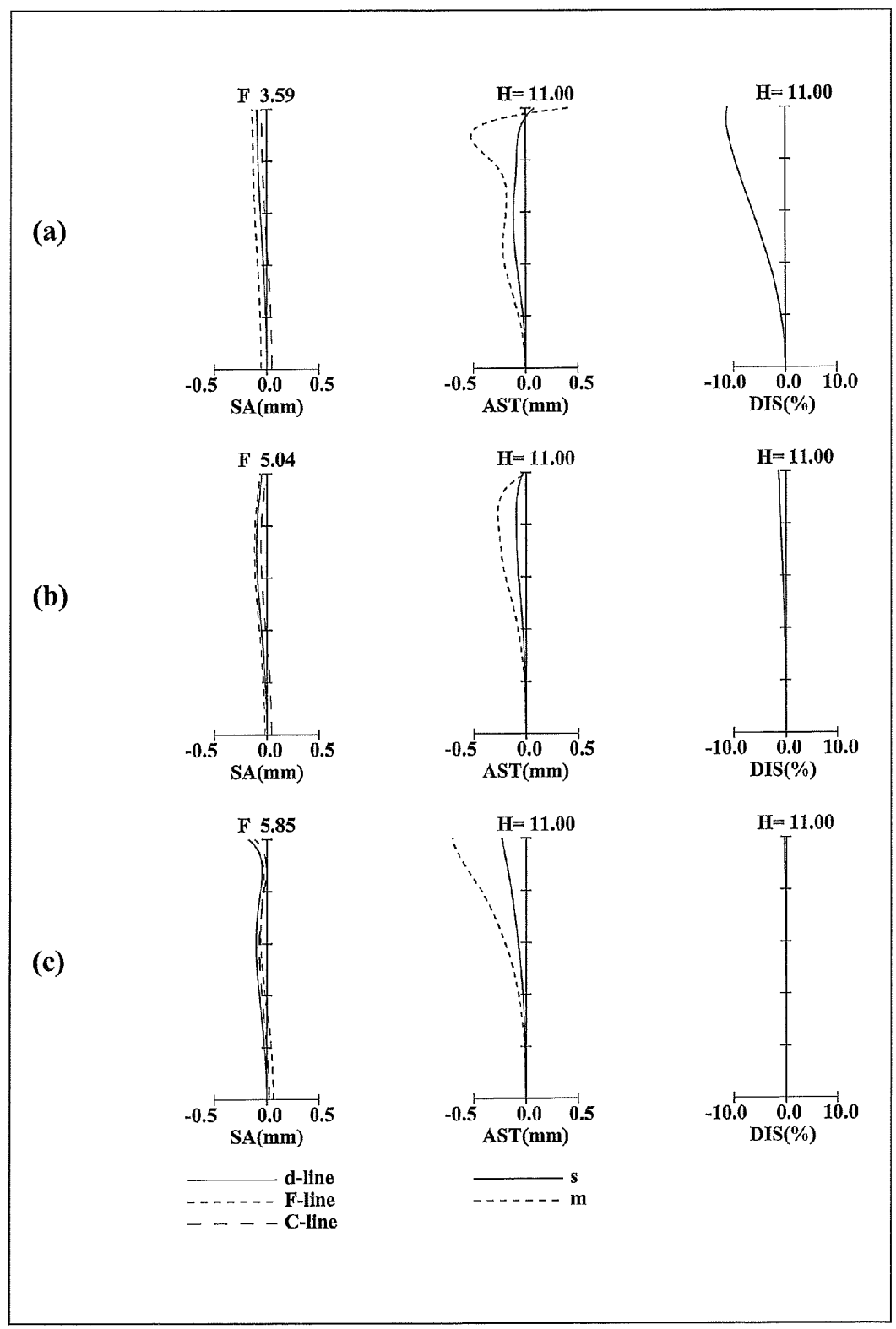
FIG. 11 is a longitudinal aberration diagram showing a close-point in-focus condition of a zoom lens system according to Example 3.
Figure 12:
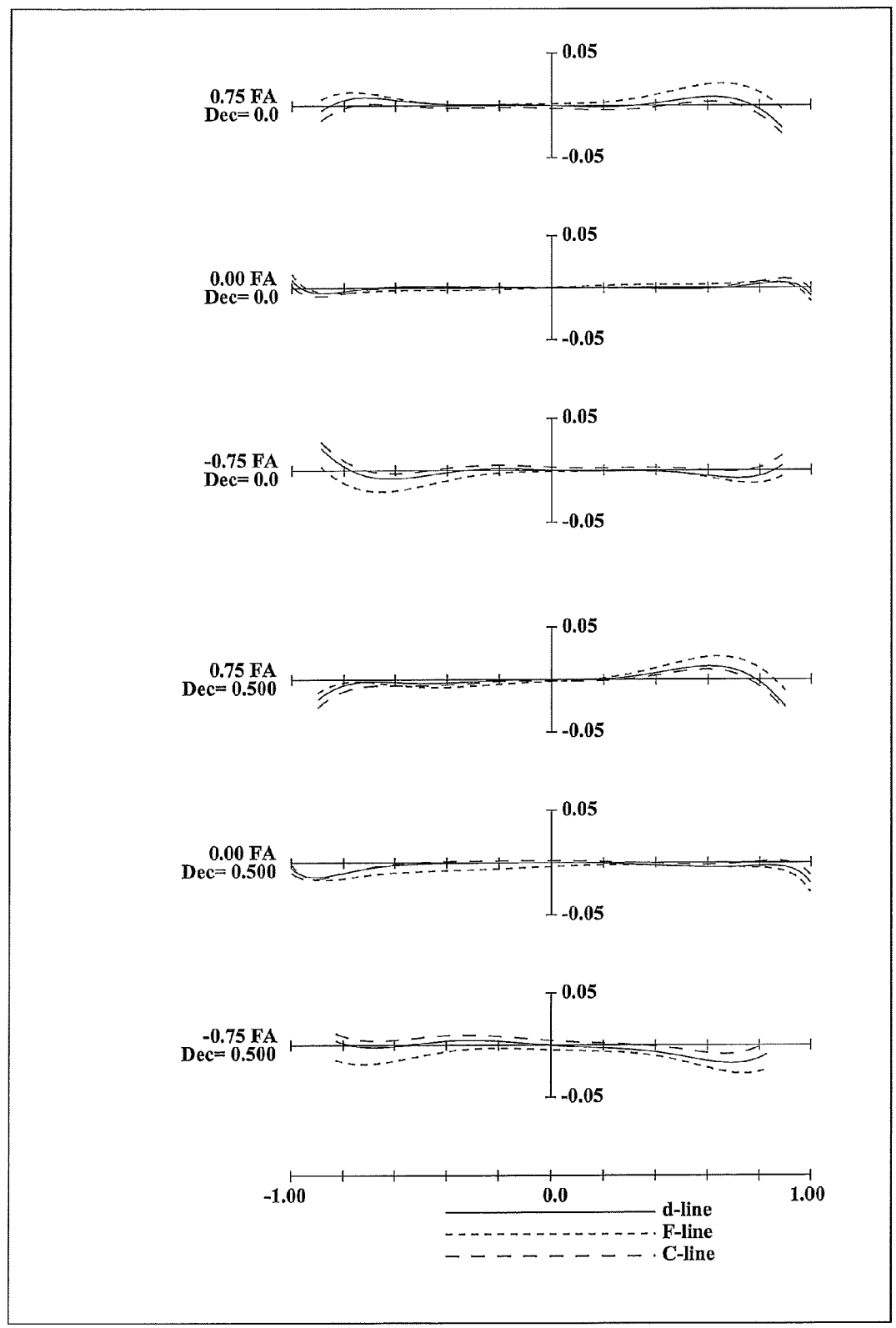
FIG. 12 is a lateral aberration diagram in a basic state where image blur compensation is not performed and in an image blur compensation state at a telephoto limit of a zoom lens system according to Example 3.

The zoom lens system of Numerical Example 3 corresponds to Embodiment 3 shown in FIG. 9. Table 10 shows the surface data of the zoom lens system of Numerical Example 3. Table 11 shows the aspherical data. Table 12 shows various data. Table 13 shows the zoom lens unit data.

TABLE 10

(surface data)

| Surface number | r | d | nd | vd |
|---|---|---|---|---|
| Object surface | ∞ | | | |
| 1 | 80.00000 | 1.20000 | 1.84666 | 23.8 |
| 2 | 43.67470 | 0.01000 | 1.56732 | 42.8 |
| 3 | 43.67470 | 4.41580 | 1.62299 | 58.1 |
| 4 | 314.96890 | 0.15000 | | |
| 5 | 39.85940 | 3.99980 | 1.58913 | 61.3 |
| 6 | 199.87000 | Variable | | |
| 7 | 107.66530 | 0.70000 | 1.88300 | 40.8 |
| 8 | 8.91870 | 4.77870 | | |
| 9 | −28.67460 | 0.60000 | 1.72916 | 54.7 |
| 10 | 18.55870 | 0.01000 | 1.56732 | 42.8 |
| 11 | 18.55870 | 1.38500 | 1.94595 | 18.0 |
| 12 | 44.73720 | 0.15000 | | |
| 13* | 22.50310 | 1.83090 | 1.68400 | 31.3 |
| 14 | 149.31330 | Variable | | |
| 15* | 31.63230 | 1.91490 | 1.60671 | 57.4 |
| 16* | −23.40760 | Variable | | |
| 17 (Aperture) | ∞ | 0.80000 | | |
| 18 | 10.42680 | 3.70590 | 1.49434 | 66.2 |
| 19 | 293.33330 | 0.01000 | 1.56732 | 42.8 |
| 20 | 293.33330 | 0.60000 | 1.82093 | 33.5 |
| 21 | 12.24480 | 2.86850 | | |
| 22 | −60.34770 | 0.70000 | 1.80420 | 46.5 |
| 23 | ∞ | Variable | | |
| 24* | 23.63400 | 3.89020 | 1.60600 | 57.5 |
| 25* | −22.45830 | 0.15000 | | |
| 26 | 27.72330 | 3.99190 | 1.48749 | 70.4 |
| 27 | −21.04610 | 0.01000 | 1.56732 | 42.8 |
| 28 | −21.04610 | 0.70000 | 1.82852 | 29.8 |
| 29 | 18.79900 | 3.53510 | | |
| 30 | 29.94510 | 2.53130 | 1.84666 | 23.8 |
| 31 | −705.16990 | BF | | |
| Image surface | ∞ | | | |

TABLE 11

(aspherical data)

| Surface No. | Parameters |
|---|---|
| 13 | K = 5.57201E+00, A4 = −3.56370E−05, A6 = −3.74234E−07, A8 = −1.39332E−08, A10 = 3.28664E−10, A12 = −4.83633E−12 |
| 15 | K = 0.00000E+00, A4 = 1.15577E−05, A6 = −5.20999E−07, A8 = 1.19760E−07, A10 = 1.70358E−10, A12 = 0.00000E+00 |
| 16 | K = 0.00000E+00, A4 = 4.94436E−05, A6 = −4.81411E−07, A8 = 1.04384E−07, A10 = 6.85884E−10, A12 = 0.00000E+00 |

TABLE 11-continued (aspherical data)

| Surface No. | Parameters |
|---|---|
| 24 | K = 0.00000E+00, A4 = 8.79077E−06, A6 = −1.74664E−06, A8 = 4.96314E−08, A10 = −8.19694E−10, A12 = 2.72586E−12 |
| 25 | K = 2.19312E+00, A4 = 6.16469E−05, A6 = −8.57834E−07, A8 = 2.53752E−08, A10 = −3.86943E−10, A12 = 0.00000E+00 |

TABLE 12

(various data)

Zooming ratio 4.70901

| | Wide | Middle | Telephoto |
|---|---|---|---|
| Focal length | 12.3606 | 26.8091 | 58.2061 |
| F-number | 3.59003 | 4.95559 | 5.65473 |
| View angle | 44.6462 | 22.0536 | 10.4938 |
| Image height | 11.0000 | 11.0000 | 11.0000 |
| Overall length of lens system | 84.7185 | 97.6260 | 118.6772 |
| BF | 14.96866 | 27.74422 | 41.07506 |
| d6 | 0.4179 | 12.1408 | 25.2691 |
| d14 | 14.8605 | 6.0603 | 1.3629 |
| d16 | 2.9824 | 3.9321 | 4.3321 |
| d23 | 6.8510 | 3.1106 | 2.0000 |

TABLE 13

(zoom lens unit data)

| Unit | Initial surface No. | Focal length |
|---|---|---|
| 1 | 1 | 65.51468 |
| 2 | 7 | −9.77604 |
| 3 | 15 | 22.46848 |
| 4 | 17 | −46.31576 |
| 5 | 24 | 23.77370 |

Numerical Example 4

Figure 13:
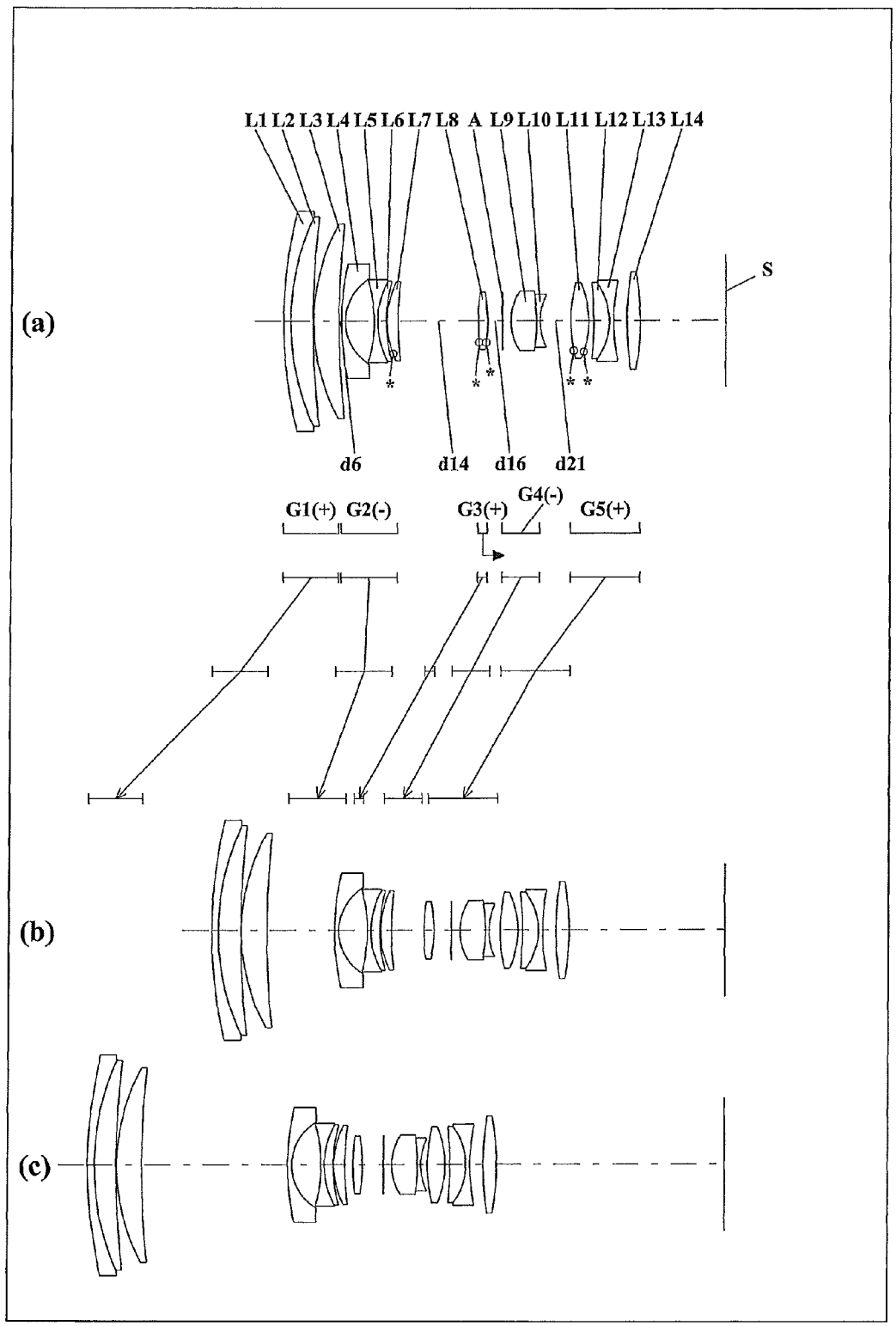
FIG. 13 is a lens arrangement diagram showing an infinity in-focus condition of a zoom lens system according to Embodiment 4 (Example 4)
Figure 14:
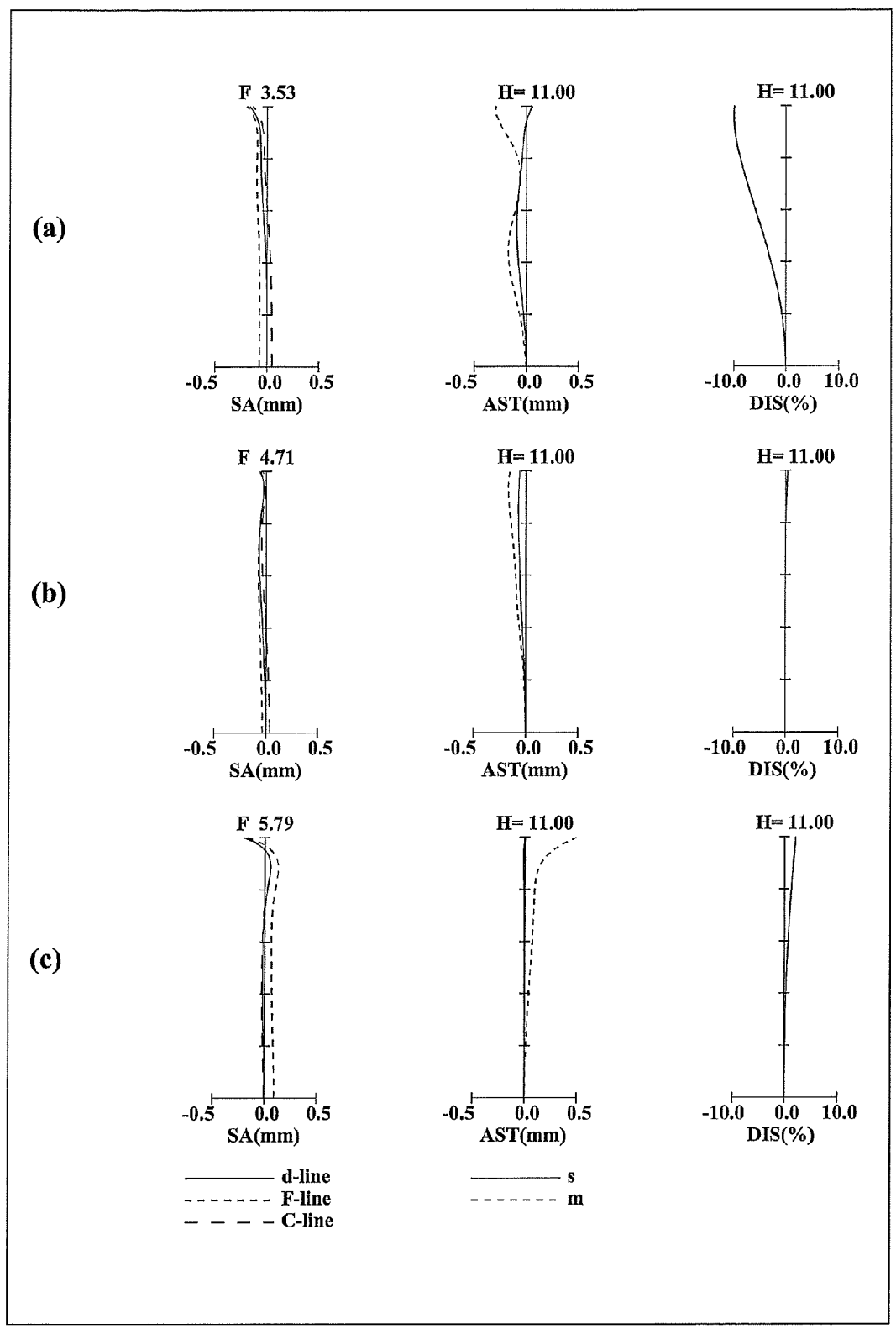
FIG. 14 is a longitudinal aberration diagram showing an infinity in-focus condition of a zoom lens system according to Example 4.
Figure 15:
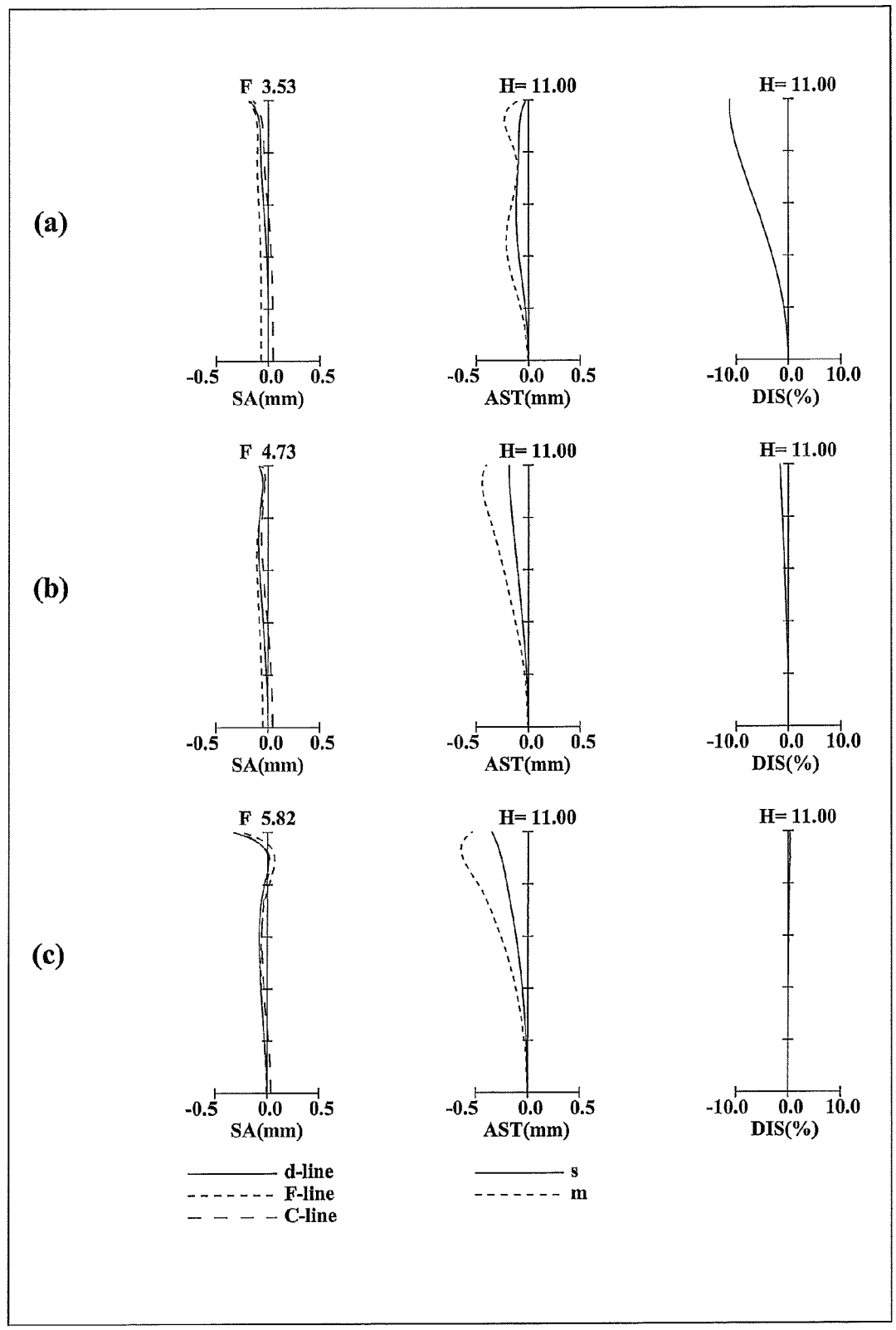
FIG. 15 is a longitudinal aberration diagram showing a close-point in-focus condition of a zoom lens system according to Example 4.
Figure 16:
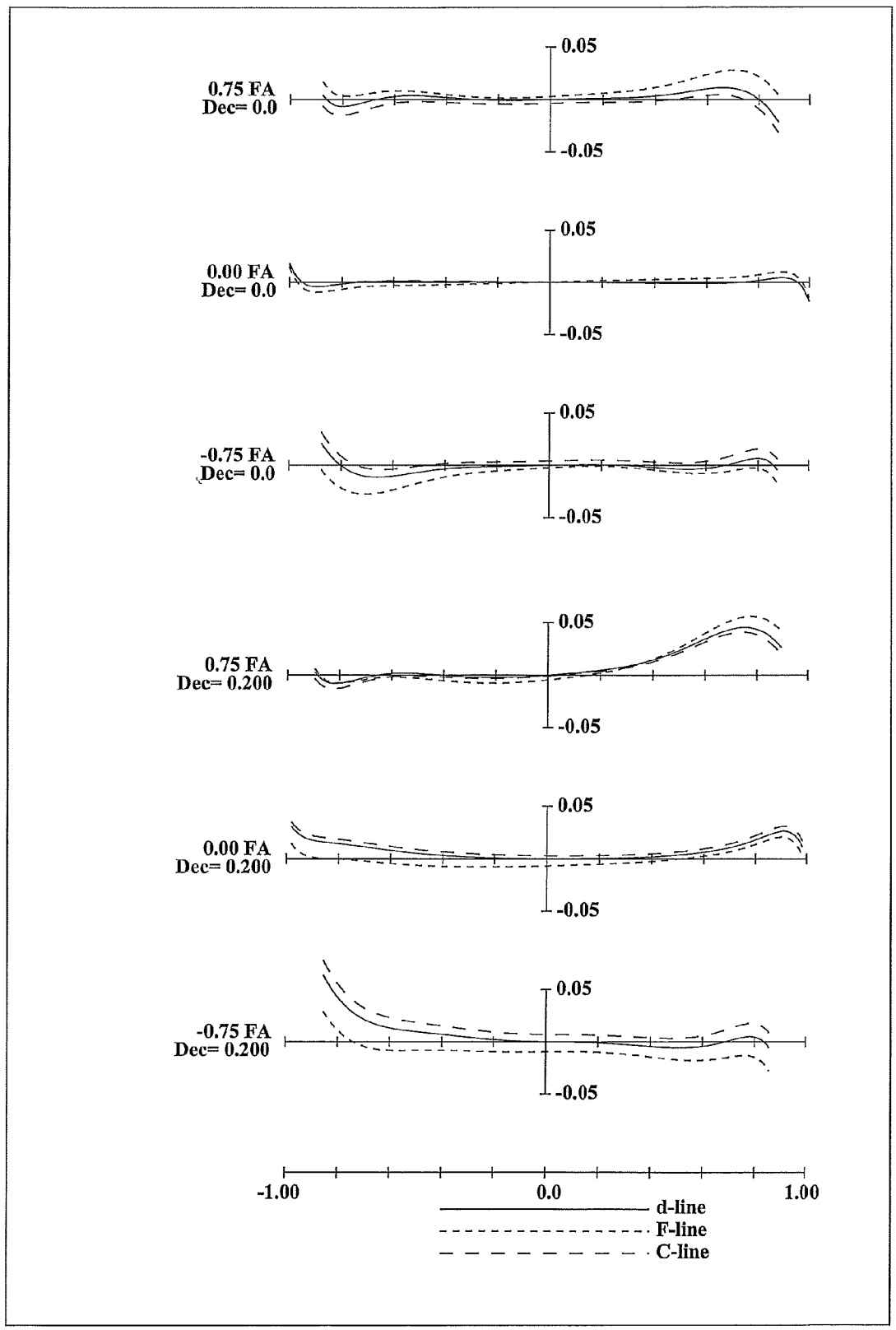
FIG. 16 is a lateral aberration diagram in a basic state where image blur compensation is not performed and in an image blur compensation state at a telephoto limit of a zoom lens system according to Example 4.

The zoom lens system of Numerical Example 4 corresponds to Embodiment 4 shown in FIG. 13. Table 14 shows the surface data of the zoom lens system of Numerical Example 4. Table 15 shows the aspherical data. Table 16 shows various data. Table 17 shows the zoom lens unit data.

TABLE 14

(surface data)

| Surface number | r | d | nd | vd |
|---|---|---|---|---|
| Object surface | ∞ | | | |
| 1 | 80.00000 | 1.20000 | 1.84666 | 23.8 |
| 2 | 43.69660 | 0.01000 | 1.56732 | 42.8 |
| 3 | 43.69660 | 3.88150 | 1.62299 | 58.1 |
| 4 | 157.89800 | 0.10000 | | |
| 5 | 35.15840 | 4.43540 | 1.58913 | 61.3 |
| 6 | 154.58910 | Variable | | |
| 7 | 44.74720 | 0.70000 | 1.88300 | 40.8 |
| 8 | 8.75050 | 5.05830 | | |
| 9 | −26.46620 | 0.60000 | 1.72916 | 54.7 |
| 10 | 14.41410 | 0.01000 | 1.56732 | 42.8 |
| 11 | 14.41410 | 1.55510 | 1.94595 | 18.0 |
| 12 | 25.71210 | 0.10000 | | |
| 13* | 14.48460 | 1.92570 | 1.68400 | 31.3 |

TABLE 14-continued (surface data)

| Surface number | r | d | nd | vd |
|---|---|---|---|---|
| 14 | 51.53140 | Variable | | |
| 15* | 51.43310 | 1.63020 | 1.68863 | 52.8 |
| 16* | −25.11770 | Variable | | |
| 17 (Aperture) | ∞ | 1.50000 | | |
| 18 | 9.83310 | 4.44230 | 1.60311 | 60.7 |
| 19 | −33.30170 | 0.01000 | 1.56732 | 42.8 |
| 20 | −33.30170 | 0.60000 | 1.80610 | 33.3 |
| 21 | 10.37750 | Variable | | |
| 22* | 26.68240 | 3.10680 | 1.60820 | 57.8 |
| 23* | −15.69060 | 0.80680 | | |
| 24 | −67.36380 | 2.76710 | 1.48749 | 70.4 |
| 25 | −11.15520 | 0.01000 | 1.56732 | 42.8 |
| 26 | −11.15520 | 0.70000 | 1.80610 | 33.3 |
| 27 | 34.70820 | 2.32680 | | |
| 28 | 53.61740 | 2.36440 | 1.84666 | 23.8 |
| 29 | −45.70260 | BF | | |
| Image surface | ∞ | | | |

TABLE 15

(aspherical data)

| Surface No. | Parameters |
|---|---|
| 13 | K = −1.08699E+00, A4 = 1.98621E−06, A6 = 6.17544E−07, A8 = −4.81601E−08, A10 = 1.15961E−09, A12 = −1.05549E−11 |
| 15 | K = 0.00000E+00, A4 = −1.41590E−05, A6 = 8.39493E−06, A8 = −2.60947E−07, A10 = 8.46868E−09, A12 = 0.00000E+00 |
| 16 | K = 0.00000E+00, A4 = 1.73948E−05, A6 = 7.29318E−06, A8 = −2.08987E−07, A10 = 7.67727E−09, A12 = 0.00000E+00 |
| 22 | K = −1.89956E+00, A4 = −2.26837E−05, A6 = 4.15838E−07, A8 = −2.91604E−08, A10 = 2.58289E−10, A12 = 7.19058E−12 |
| 23 | K = 6.66600E−01, A4 = 1.65507E−05, A6 = 2.46380E−06, A8 = −8.78790E−08, A10 = 1.26195E−09, A12 = 0.00000E+00 |

TABLE 16

(various data)

Zooming ratio 4.69353

| | Wide | Middle | Telephoto |
|---|---|---|---|
| Focal length | 12.3602 | 26.7801 | 58.0130 |
| F-number | 3.52521 | 4.71488 | 5.78858 |
| View angle | 44.6330 | 22.2493 | 10.5212 |
| Image height | 11.0000 | 11.0000 | 11.0000 |
| Overall length of lens system | 77.2191 | 89.5268 | 111.1808 |
| BF | 14.96922 | 27.09637 | 39.63498 |
| d6 | 0.3994 | 11.8062 | 25.4291 |
| d14 | 14.0462 | 5.7627 | 1.4326 |
| d16 | 2.5685 | 3.0755 | 3.6755 |
| d21 | 5.3954 | 1.9456 | 1.1682 |

TABLE 17

(zoom lens unit data)

| Unit | Initial surface No. | Focal length |
|---|---|---|
| 1 | 1 | 68.92235 |
| 2 | 7 | −9.77303 |
| 3 | 15 | 24.72151 |

TABLE 17-continued (zoom lens unit data)

| Unit | Initial surface No. | Focal length |
|---|---|---|
| 4 | 17 | −148.93870 |
| 5 | 22 | 26.64608 |

Numerical Example 5

Figure 17:
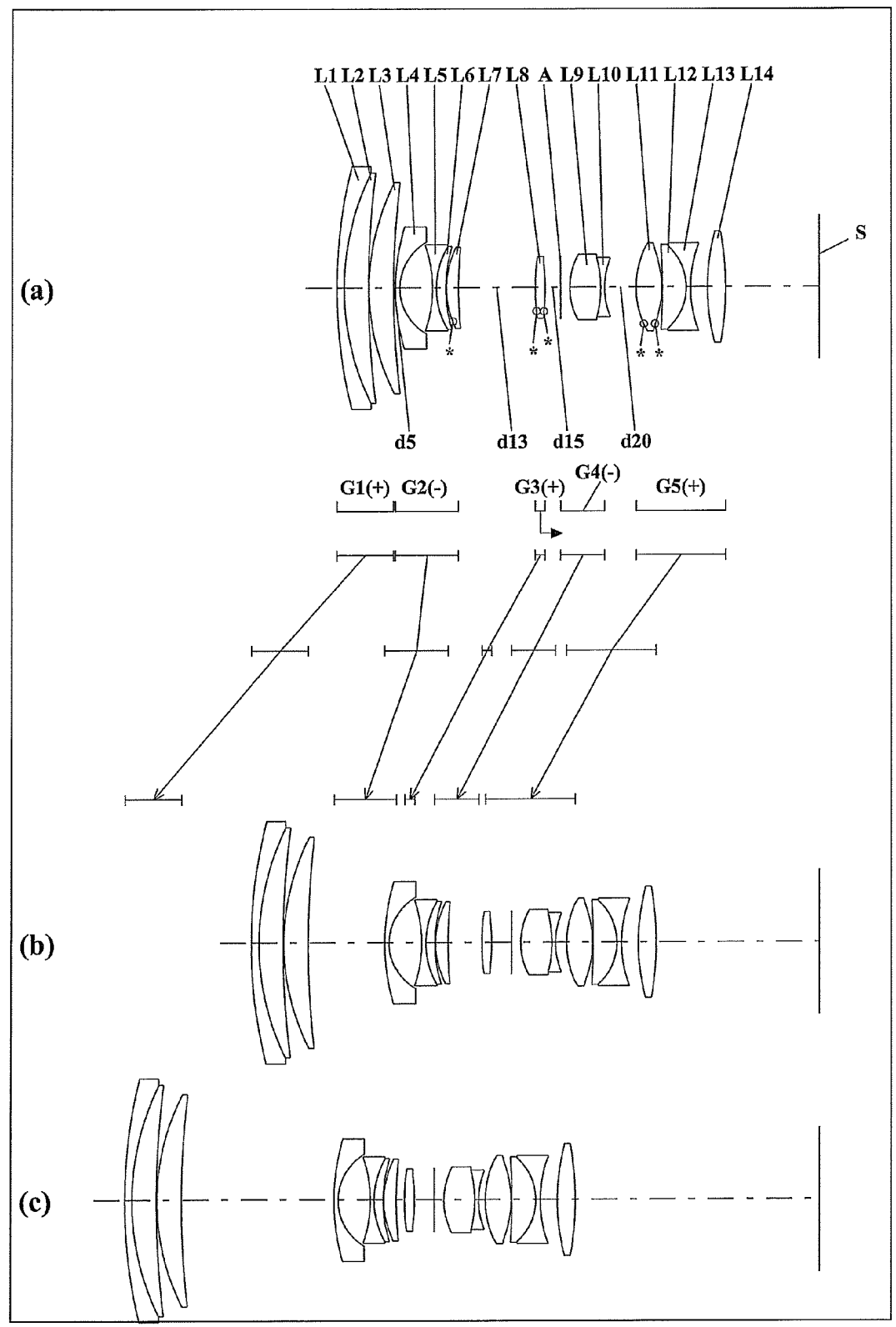
FIG. 17 is a lens arrangement diagram showing an infinity in-focus condition of a zoom lens system according to Embodiment 5 (Example 5)
Figure 18:
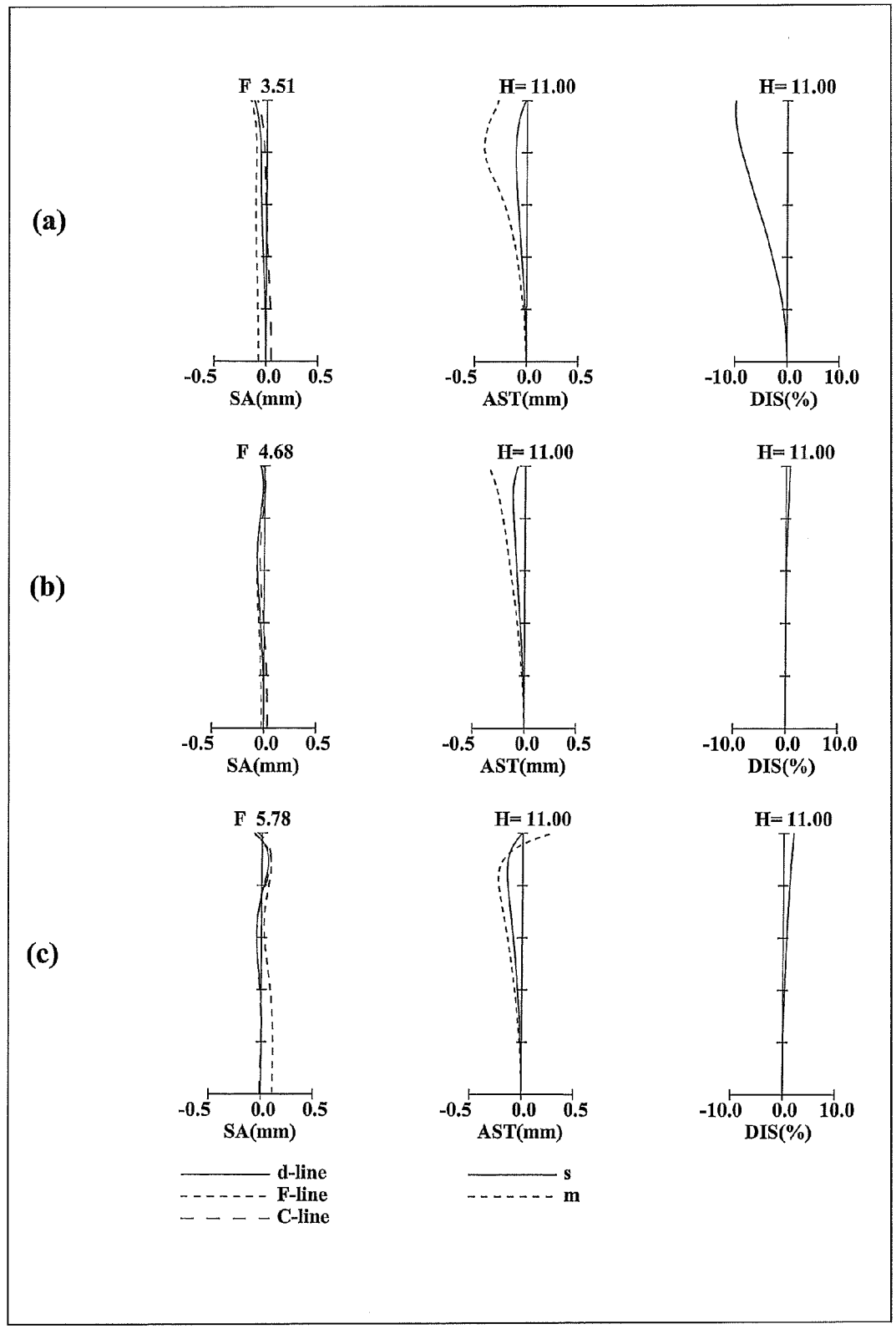
FIG. 18 is a longitudinal aberration diagram showing an infinity in-focus condition of a zoom lens system according to Example 5.
Figure 19:
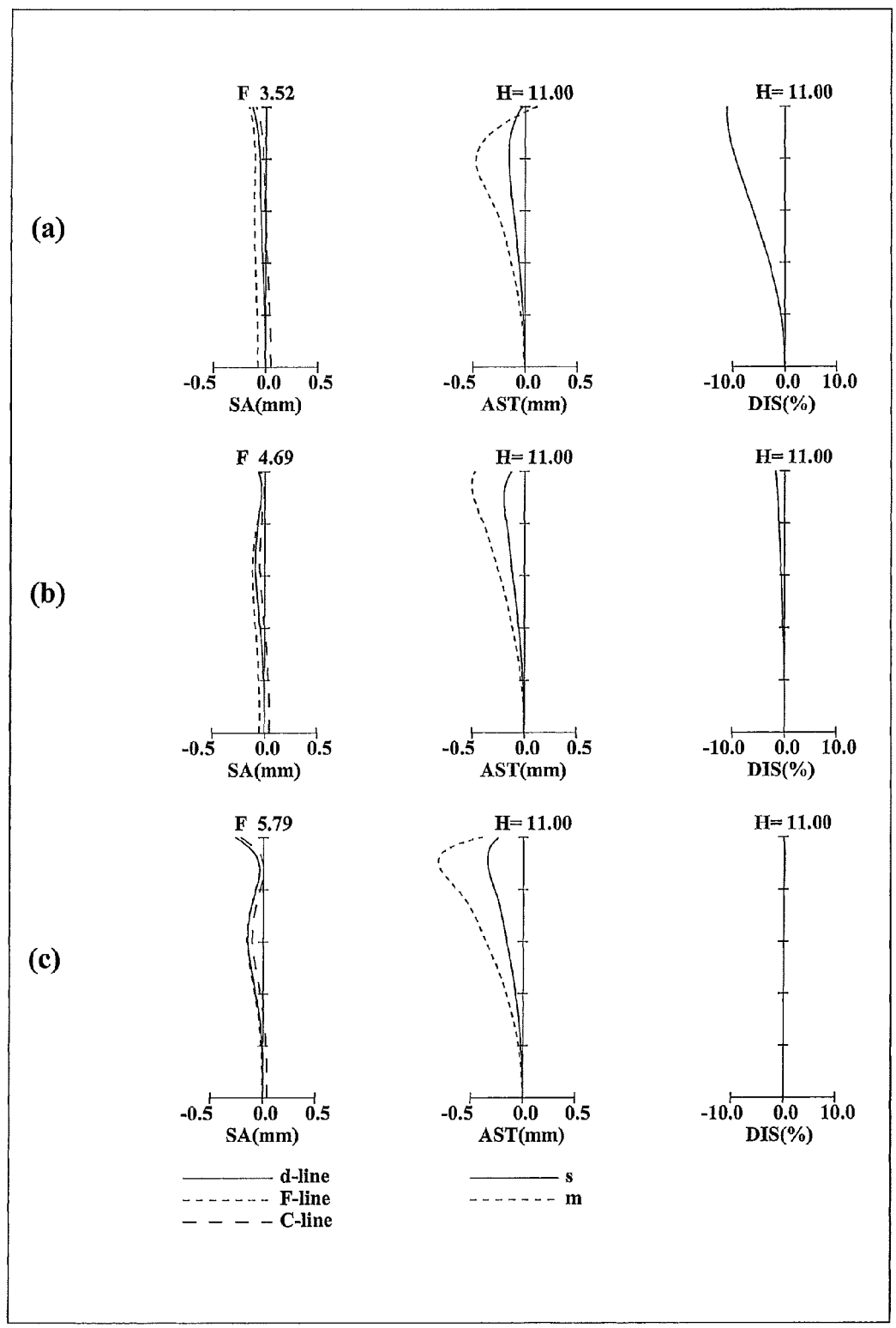
FIG. 19 is a longitudinal aberration diagram showing a close-point in-focus condition of a zoom lens system according to Example 5.
Figure 20:
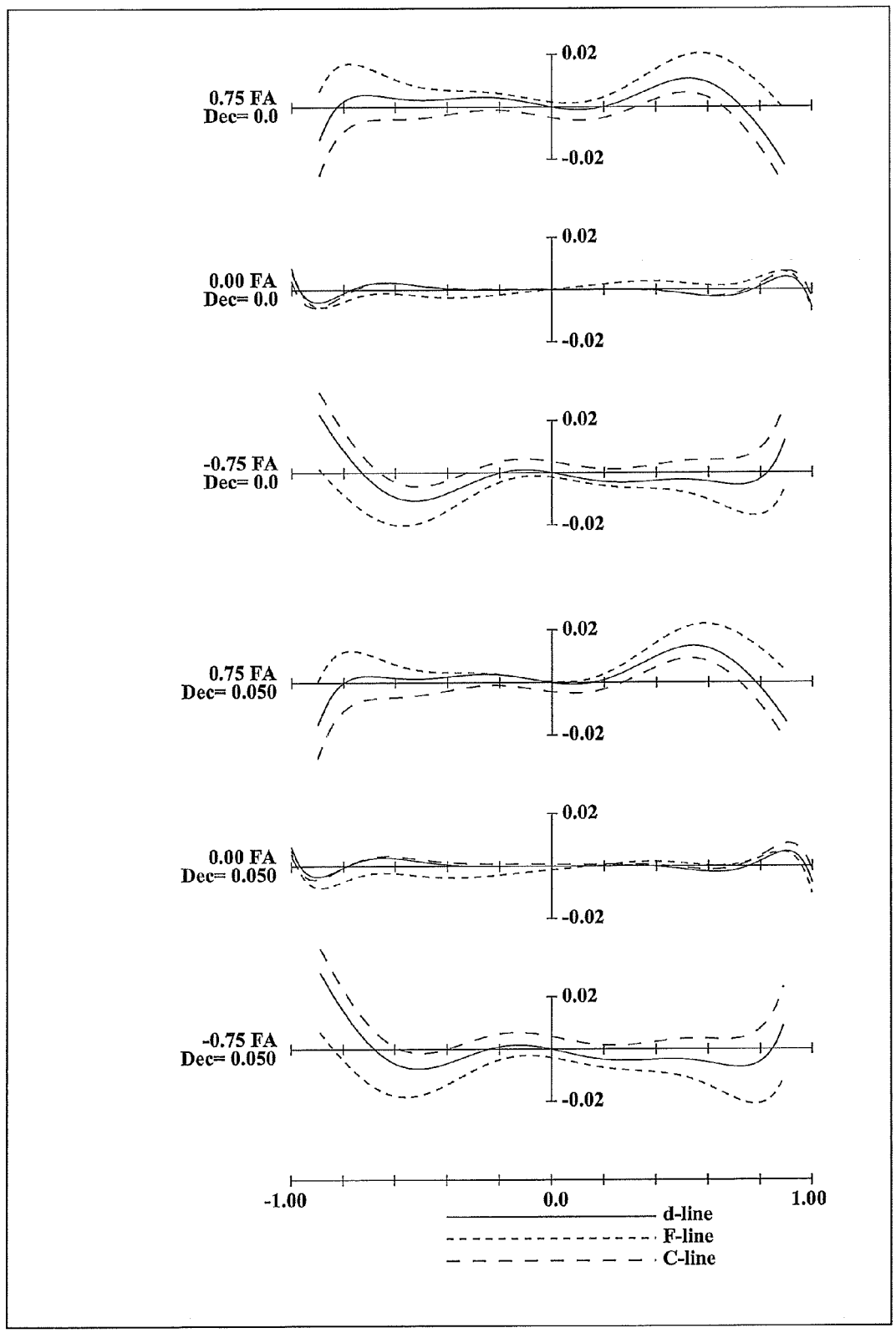
FIG. 20 is a lateral aberration diagram in a basic state where image blur compensation is not performed and in an image blur compensation state at a telephoto limit of a zoom lens system according to Example 5.

The zoom lens system of Numerical Example 5 corresponds to Embodiment 5 shown in FIG. 17. Table 18 shows the surface data of the zoom lens system of Numerical Example 5. Table 19 shows the aspherical data. Table 20 shows various data. Table 21 shows the zoom lens unit data.

TABLE 18

(surface data)

| Surface number | r | d | nd | vd |
|---|---|---|---|---|
| Object surface | ∞ | | | |
| 1 | 80.00000 | 1.20000 | 1.84666 | 23.8 |
| 2 | 41.58340 | 3.90830 | 1.62299 | 58.1 |
| 3 | 144.84920 | 0.10000 | | |
| 4 | 37.06610 | 3.92650 | 1.72916 | 54.7 |
| 5 | 141.90650 | Variable | | |
| 6 | 33.75870 | 0.70000 | 1.88300 | 40.8 |
| 7 | 8.46830 | 5.19850 | | |
| 8 | −20.55630 | 0.60000 | 1.72916 | 54.7 |
| 9 | 13.22520 | 0.01000 | 1.56732 | 42.8 |
| 10 | 13.22520 | 1.47020 | 1.94595 | 18.0 |
| 11 | 21.73160 | 0.10000 | | |
| 12* | 13.49080 | 1.94590 | 1.68400 | 31.3 |
| 13 | 60.48790 | Variable | | |
| 14* | 46.43790 | 1.57530 | 1.68863 | 52.8 |
| 15* | −30.28080 | Variable | | |
| 16 (Aperture) | ∞ | 1.50000 | | |
| 17 | 11.07990 | 4.93530 | 1.61730 | 50.7 |
| 18 | −19.35760 | 0.01000 | 1.56732 | 42.8 |
| 19 | −19.35760 | 0.60000 | 1.80610 | 33.3 |
| 20 | 12.27420 | Variable | | |
| 21* | 15.17120 | 4.11750 | 1.60820 | 57.8 |
| 22* | −15.68910 | 0.10000 | | |
| 23 | −101.99330 | 3.81360 | 1.48749 | 70.4 |
| 24 | −8.95160 | 0.01000 | 1.56732 | 42.8 |
| 25 | −8.95160 | 0.70000 | 1.80610 | 33.3 |
| 26 | 19.61820 | 2.72370 | | |
| 27 | 34.10000 | 2.87450 | 1.84666 | 23.8 |
| 28 | −50.88280 | BF | | |
| Image surface | ∞ | | | |

TABLE 19

(aspherical data)

| Surface No. | Parameters |
|---|---|
| 12 | K = −2.91122E−01, A4 = −4.87111E−05, A6 = 3.58272E−07, A8 = −3.98970E−08, A10 = 8.17183E−10, A12 = −7.54821E−12 |
| 14 | K = 0.00000E+00, A4 = 1.14498E−04, A6 = −5.87437E−06, A8 = 5.18078E−07, A10 = −5.23207E−09, A12 = 0.00000E+00 |
| 15 | K = 0.00000E+00, A4 = 1.17386E−04, A6 = −4.48009E−06, A8 = 4.23034E−07, A10 = −2.80694E−09, A12 = 0.00000E+00 |
| 21 | K = −1.26649E−01, A4 = −4.33738E−05, A6 = 2.51212E−06, A8 = −1.02847E−07, A10 = 2.39403E−09, A12 = −1.16446E−11 |

TABLE 19-continued (aspherical data)

| Surface No. | Parameters |
|---|---|
| 22 | K = −4.78064E−01, A4 = 4.82511E−06, A6 = 2.51419E−06, A8 = −9.22663E−08, A10 = 1.63502E−09, A12 = 0.00000E+00 |

TABLE 20

(various data)

| Zooming ratio | | 4.69375 | |
|---|---|---|---|
| | Wide | Middle | Telephoto |
| Focal length | 12.3606 | 26.7881 | 58.0176 |
| F-number | 3.51495 | 4.68243 | 5.78475 |
| View angle | 44.6324 | 22.1606 | 10.5327 |
| Image height | 11.0000 | 11.0000 | 11.0000 |
| Overall length of lens system | 77.2128 | 90.9389 | 111.1817 |
| BF | 14.96805 | 26.13646 | 39.06839 |
| d5 | 0.2654 | 12.3490 | 24.4182 |
| d13 | 12.2765 | 5.4088 | 1.3371 |
| d15 | 2.4720 | 3.1413 | 3.1493 |
| d20 | 5.1115 | 1.7840 | 1.0894 |

TABLE 21

(zoom lens unit data)

| Unit | Initial surface No. | Focal length |
|---|---|---|
| 1 | 1 | 64.47440 |
| 2 | 6 | −9.11719 |
| 3 | 14 | 26.84137 |
| 4 | 16 | −171.73160 |
| 5 | 21 | 23.31583 |

Numerical Example 6

Figure 21:
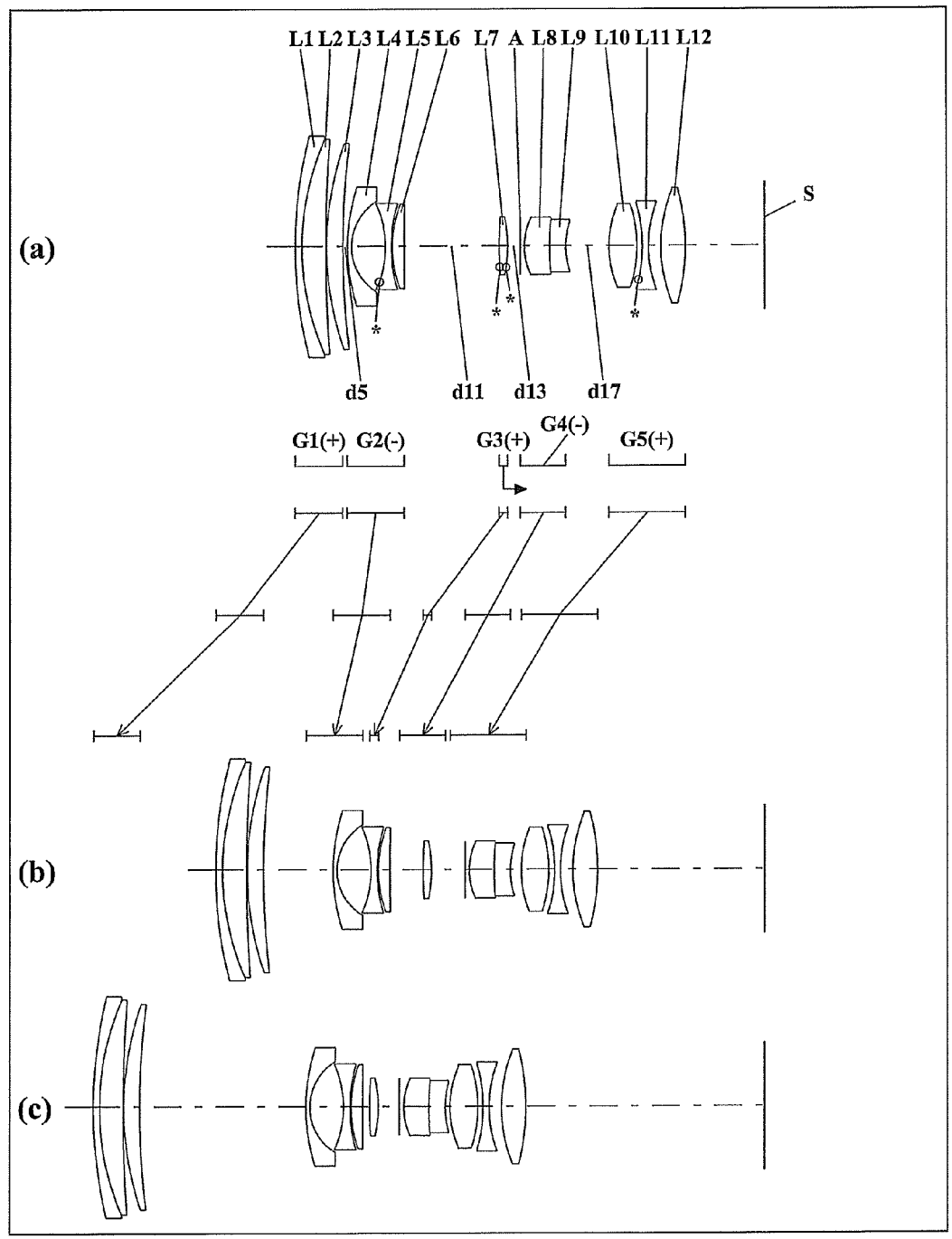
FIG. 21 is a lens arrangement diagram showing an infinity in-focus condition of a zoom lens system according to Embodiment 6 (Example 6)
Figure 22:
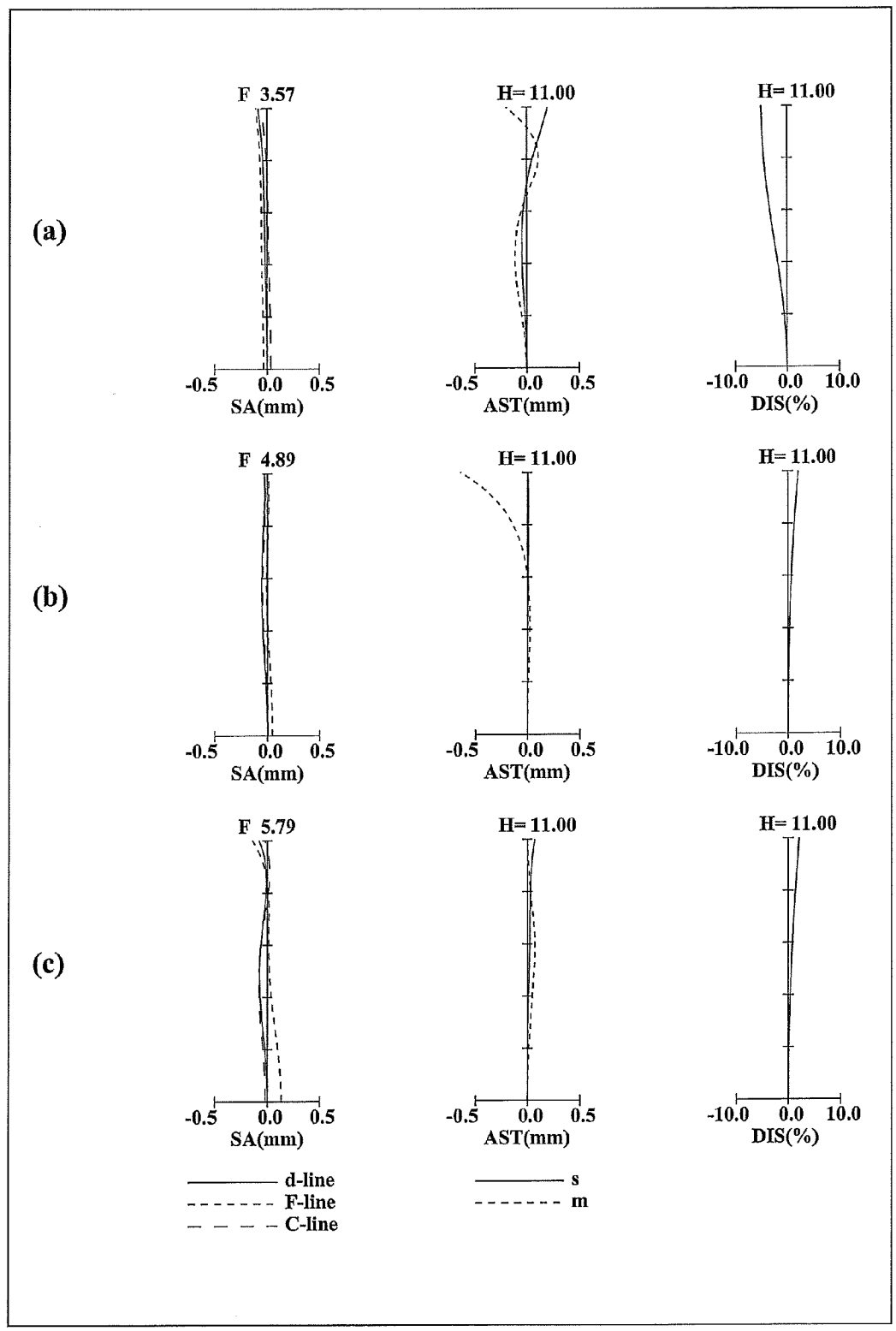
FIG. 22 is a longitudinal aberration diagram showing an infinity in-focus condition of a zoom lens system according to Example 6.
Figure 23:
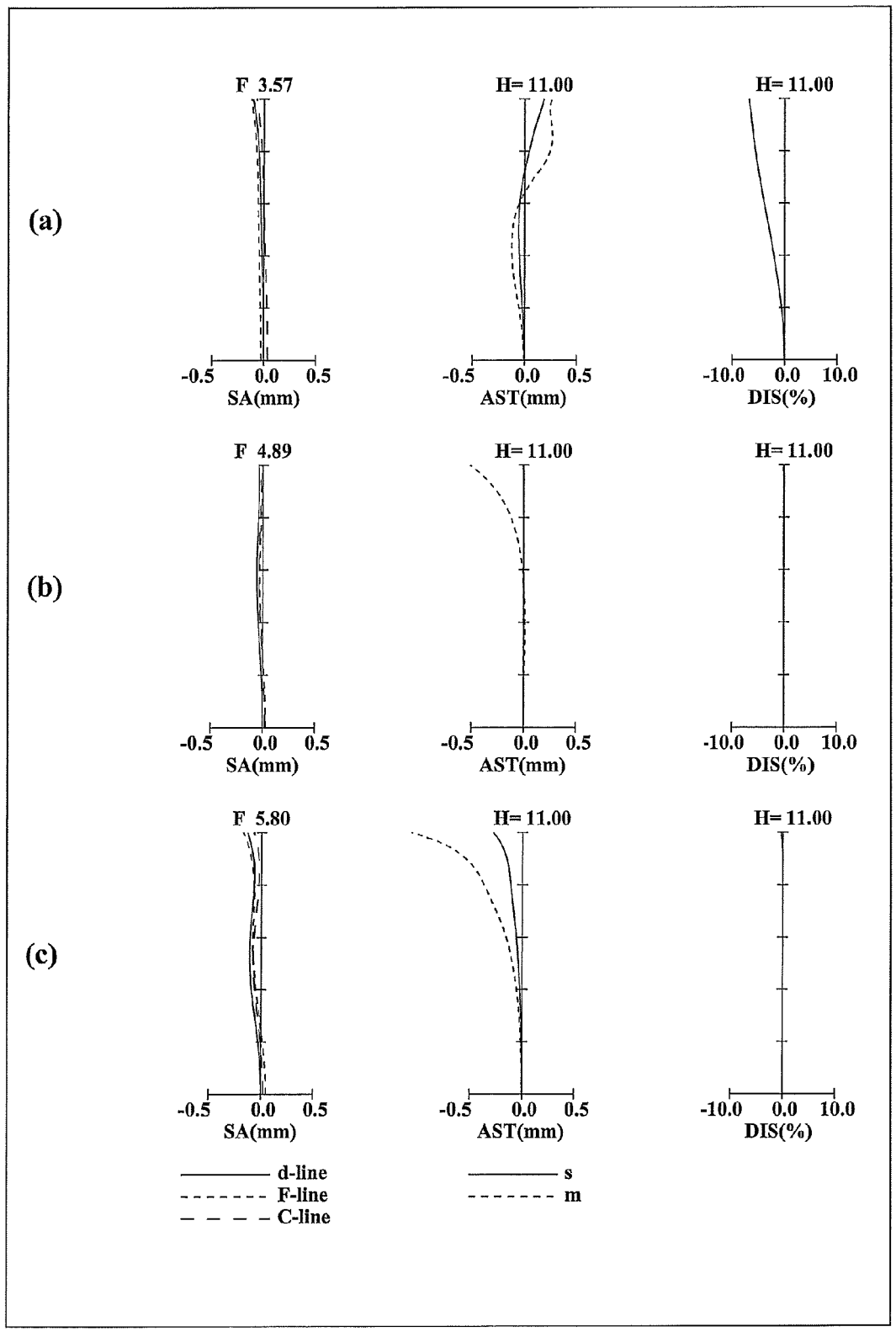
FIG. 23 is a longitudinal aberration diagram showing a close-point in-focus condition of a zoom lens system according to Example 6.

The zoom lens system of Numerical Example 6 corresponds to Embodiment 6 shown in FIG. 21. Table 22 shows the surface data of the zoom lens system of Numerical Example 6. Table 23 shows the aspherical data. Table 24 shows various data. Table 25 shows the zoom lens unit data.

TABLE 22

(surface data)

| Surface number | r | d | nd | vd |
|---|---|---|---|---|
| Object surface | ∞ | | | |
| 1 | 81.18370 | 1.20000 | 1.84666 | 23.8 |
| 2 | 47.92900 | 4.31140 | 1.62299 | 58.1 |
| 3 | 270.76510 | 0.10000 | | |
| 4 | 55.46980 | 2.96000 | 1.80420 | 46.5 |
| 5 | 152.01960 | Variable | | |
| 6 | 35.00000 | 0.70000 | 1.90366 | 31.3 |
| 7 | 9.59050 | 6.10680 | | |
| 8* | −18.76050 | 1.10000 | 1.68966 | 53.0 |
| 9 | 27.20680 | 0.20450 | | |
| 10 | 21.95800 | 2.10350 | 1.94595 | 18.0 |
| 11 | 518.28290 | Variable | | |
| 12* | 57.66300 | 1.55880 | 1.66547 | 55.2 |
| 13* | −25.83970 | Variable | | |
| 14 (Aperture) | ∞ | 0.80000 | | |
| 15 | 12.32080 | 4.50000 | 1.48749 | 70.4 |

TABLE 22-continued (surface data)

| Surface number | r | d | nd | vd |
|---|---|---|---|---|
| 16 | 53.34470 | 2.94110 | 1.84666 | 23.8 |
| 17 | 14.90930 | Variable | | |
| 18 | 19.51170 | 5.00000 | 1.48749 | 70.4 |
| 19 | −23.84230 | 0.96840 | | |
| 20* | −34.70410 | 1.10000 | 1.84666 | 23.8 |
| 21 | 23.21970 | 2.19410 | | |
| 22 | 27.08650 | 4.43980 | 1.75520 | 27.5 |
| 23 | −40.27110 | BF | | |
| Image surface | ∞ | | | |

TABLE 23

(aspherical data)

| Surface No. | Parameters |
|---|---|
| 8 | K = 0.00000E+00, A4 = 1.14451E−05, A6 = −9.67896E−08, A8 = −3.12143E−09, A10 = 0.00000E+00, A12 = 0.00000E+00 |
| 12 | K = 0.00000E+00, A4 = −8.09473E−05, A6 = 2.35817E−06, A8 = −5.50379E−08, A10 = 0.00000E+00, A12 = 0.00000E+00 |
| 13 | K = 0.00000E+00, A4 = −5.63697E−05, A6 = 2.26951E−06, A8 = −5.35582E−08, A10 = 0.00000E+00, A12 = 0.00000E+00 |
| 20 | K = 0.00000E+00, A4 = −6.16776E−05, A6 = −5.26771E−07, A8 = −8.63502E−09, A10 = 3.94452E−10, A12 = −3.94169E−12 |

TABLE 24

(various data)

Zooming ratio 4.70495

| | Wide | Middle | Telephoto |
|---|---|---|---|
| Focal length | 12.3700 | 26.8312 | 58.2002 |
| F-number | 3.56995 | 4.89113 | 5.78961 |
| View angle | 43.1080 | 21.9037 | 10.4919 |
| Image height | 11.0000 | 11.0000 | 11.0000 |
| Overall length of lens system | 84.5038 | 98.6937 | 120.9891 |
| BF | 14.24935 | 30.01939 | 42.80595 |
| d5 | 0.8000 | 12.4979 | 29.9184 |
| d11 | 17.1604 | 5.9161 | 1.2471 |
| d13 | 2.2642 | 6.0270 | 3.8046 |
| d17 | 7.7415 | 1.9449 | 0.9247 |

TABLE 25

(zoom lens unit data)

| Unit | Initial surface No. | Focal length |
|---|---|---|
| 1 | 1 | 78.75066 |
| 2 | 6 | −10.59398 |
| 3 | 12 | 27.01514 |
| 4 | 14 | −2616.77566 |
| 5 | 18 | 31.91944 |

Numerical Example 7

Figure 24:
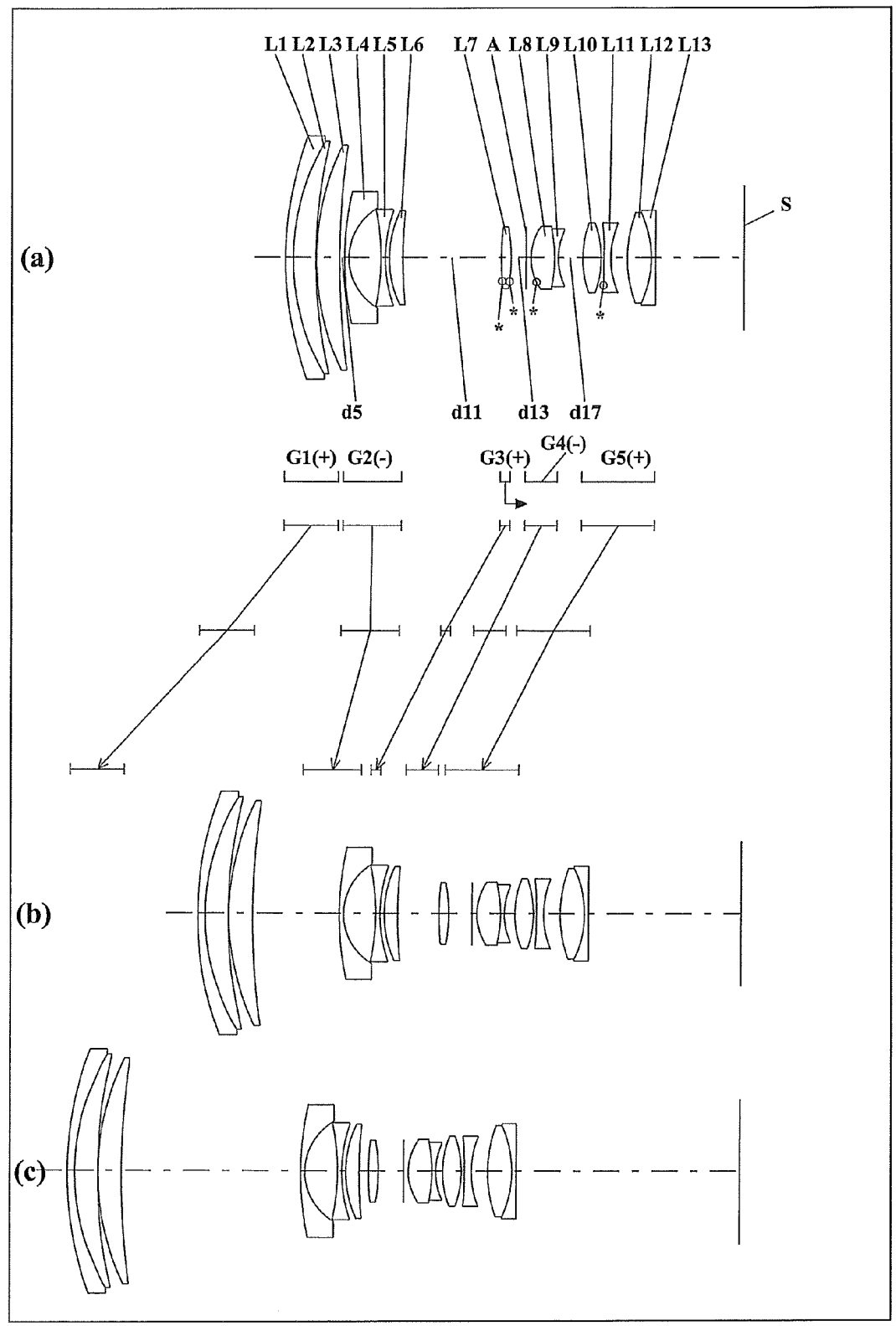
FIG. 24 is a lens arrangement diagram showing an infinity in-focus condition of a zoom lens system according to Embodiment 7 (Example 7)
Figure 25:
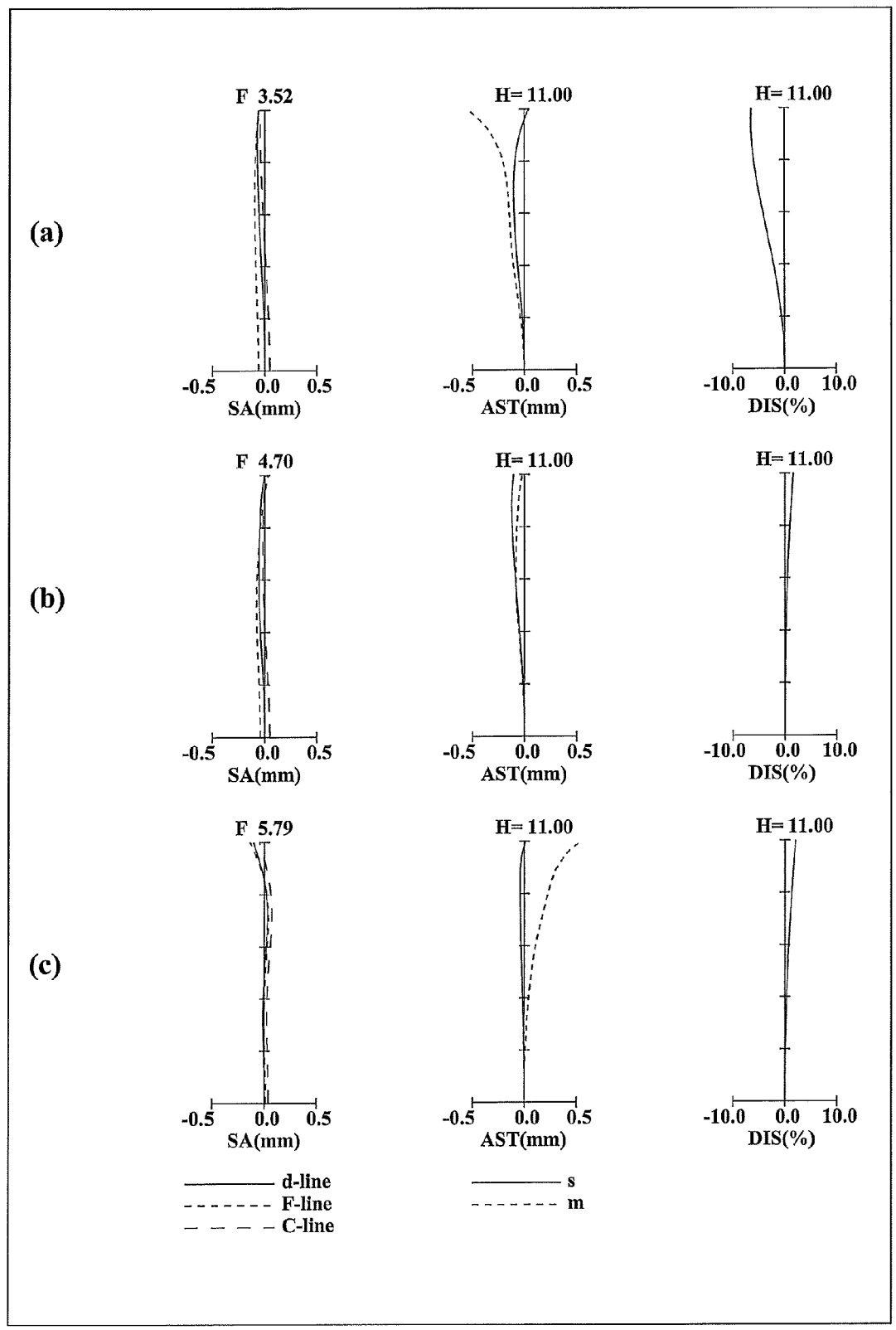
FIG. 25 is a longitudinal aberration diagram showing an infinity in-focus condition of a zoom lens system according to Example 7.
Figure 26:
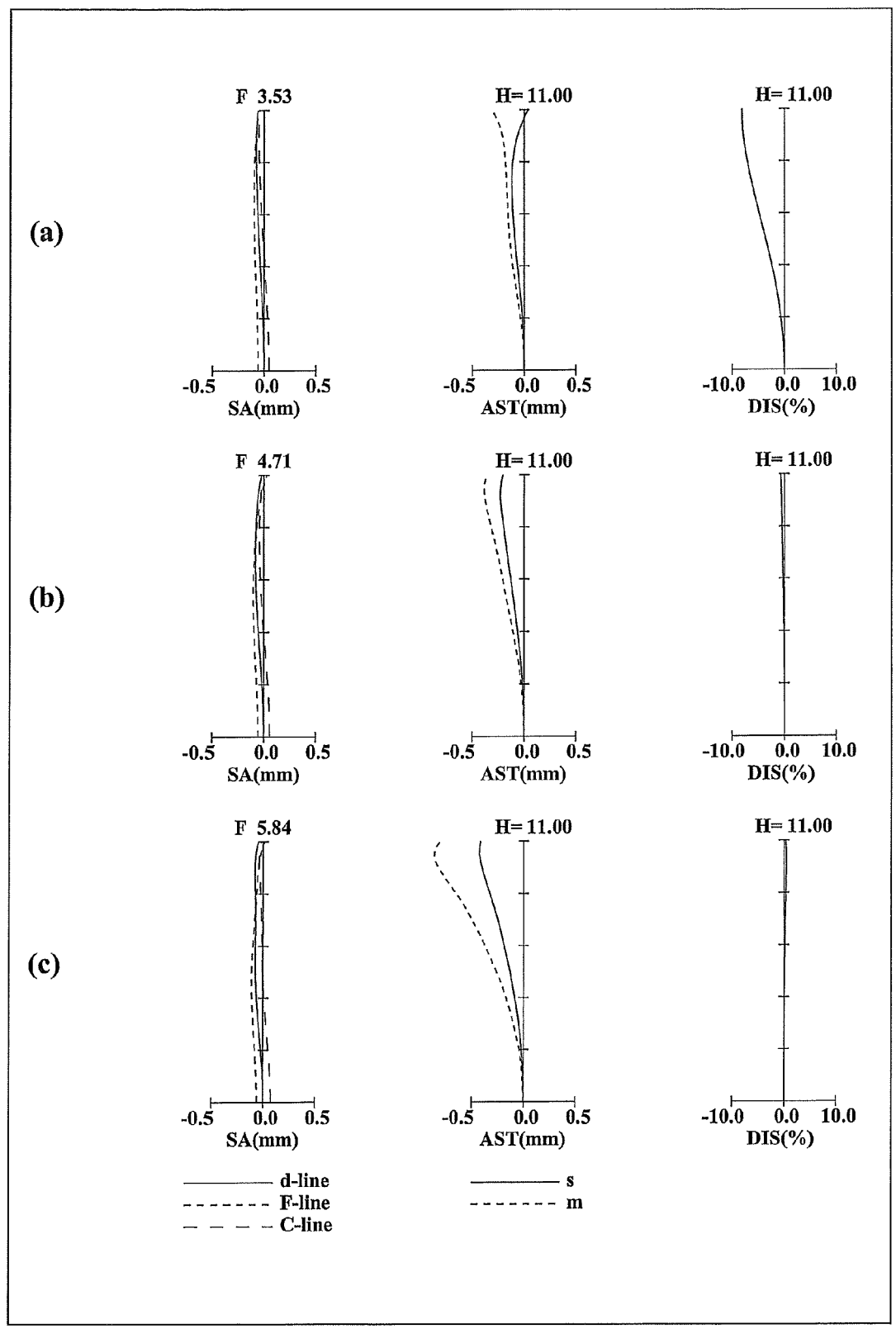
FIG. 26 is a longitudinal aberration diagram showing a close-point in-focus condition of a zoom lens system according to Example 7.

The zoom lens system of Numerical Example 7 corresponds to Embodiment 7 shown in FIG. 24. Table 26 shows the surface data of the zoom lens system of Numerical Example 7. Table 27 shows the aspherical data. Table 28 shows various data. Table 29 shows the zoom lens unit data.

TABLE 26

(surface data)

| Surface number | r | d | nd | vd |
|---|---|---|---|---|
| Object surface | ∞ | | | |
| 1 | 55.84490 | 1.20000 | 1.84666 | 23.8 |
| 2 | 36.51990 | 3.64760 | 1.62299 | 58.1 |
| 3 | 79.00430 | 0.10000 | | |
| 4 | 41.52110 | 3.72750 | 1.72916 | 54.7 |
| 5 | 127.00060 | Variable | | |
| 6 | 47.48680 | 0.70000 | 1.88300 | 40.8 |
| 7 | 9.21290 | 5.19790 | | |
| 8 | −36.31510 | 0.70000 | 1.71300 | 53.9 |
| 9 | 22.54950 | 0.66020 | | |
| 10 | 17.65370 | 2.13660 | 1.92286 | 20.9 |
| 11 | 70.50910 | Variable | | |
| 12* | 49.20190 | 1.57590 | 1.62299 | 58.1 |
| 13* | −25.66170 | Variable | | |
| 14 | ∞ | 0.80000 | | |
| (Aperture) | | | | |
| 15* | 8.98950 | 3.73580 | 1.60602 | 57.4 |
| 16 | −23.04640 | 0.60110 | 1.80611 | 40.7 |
| 17 | 10.79680 | Variable | | |
| 18 | 15.23920 | 2.95980 | 1.51680 | 64.2 |
| 19 | −16.53070 | 0.47450 | | |
| 20* | −319.44100 | 1.10000 | 1.84666 | 23.8 |
| 21 | 14.29310 | 2.63530 | | |
| 22 | 20.46790 | 3.82610 | 1.67270 | 32.2 |
| 23 | −17.44610 | 0.70000 | 1.80420 | 46.5 |
| 24 | ∞ | BF | | |
| Image surface | ∞ | | | |

TABLE 27

(aspherical data)

| Surface No. | Parameters |
|---|---|
| 12 | K = 0.00000E+00, A4 = 4.08440E−05, A6 = 1.16725E−06, A8 = 1.00452E−08, A10 = 0.00000E+00, A12 = 0.00000E+00 |
| 13 | K = 0.00000E+00, A4 = 6.23327E−05, A6 = 8.72583E−07, A8 = 1.27905E−08, A10 = 0.00000E+00, A12 = 0.00000E+00 |
| 15 | K = 7.49904E−03, A4 = 2.87864E−07, A6 = −7.57882E−07, A8 = 1.85991E−08, A10 = −5.34654E−10, A12 = 0.00000E+00 |
| 20 | K = 0.00000E+00, A4 = −1.32368E−04, A6 = −1.96725E−06, A8 = 1.78704E−08, A10 = −3.79119E−12, A12 = −1.04689E−11 |

TABLE 28

(various data)

Zooming ratio 4.77533

| | Wide | Middle | Telephoto |
|---|---|---|---|
| Focal length | 12.2497 | 26.7697 | 58.4965 |
| F-number | 3.52073 | 4.69668 | 5.78910 |
| View angle | 43.8136 | 22.0230 | 10.4393 |
| Image height | 11.0000 | 11.0000 | 11.0000 |
| Overall length of lens system | 73.5030 | 86.8070 | 107.4608 |
| BF | 14.25155 | 24.41954 | 35.64772 |
| d5 | 0.8000 | 13.8560 | 28.6100 |
| d11 | 15.7500 | 6.6380 | 1.5347 |
| d13 | 2.3871 | 3.7055 | 4.0618 |
| d17 | 3.8361 | 1.7097 | 1.1283 |

TABLE 29

(zoom lens unit data)

| Unit | Initial surface No. | Focal length |
|---|---|---|
| 1 | 1 | 76.11081 |
| 2 | 6 | −11.08700 |
| 3 | 12 | 27.29203 |
| 4 | 14 | −731.80378 |
| 5 | 18 | 31.94297 |

Numerical Example 8

Figure 27:
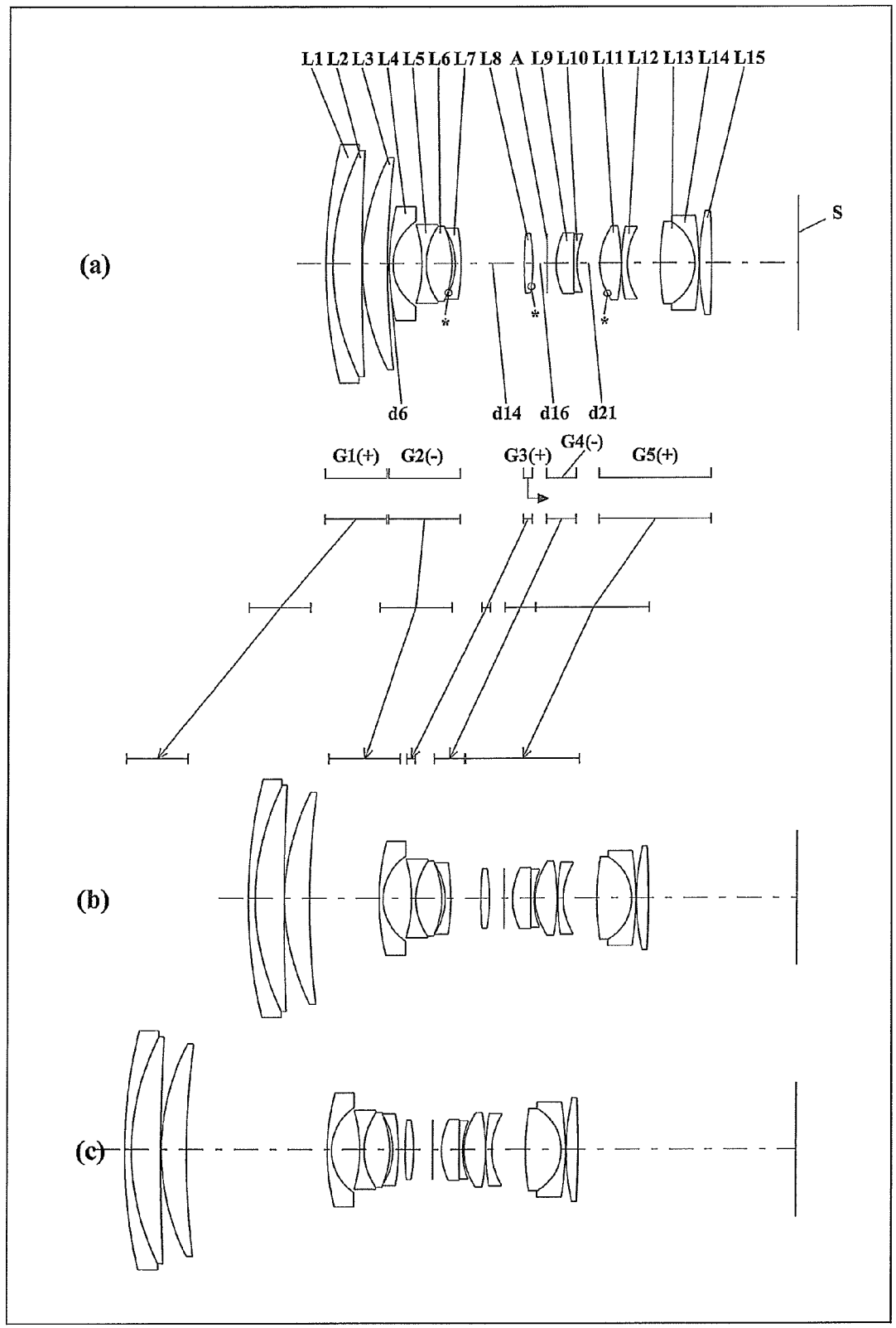
FIG. 27 is a lens arrangement diagram showing an infinity in-focus condition of a zoom lens system according to Embodiment 8 (Example 8)
Figure 28:
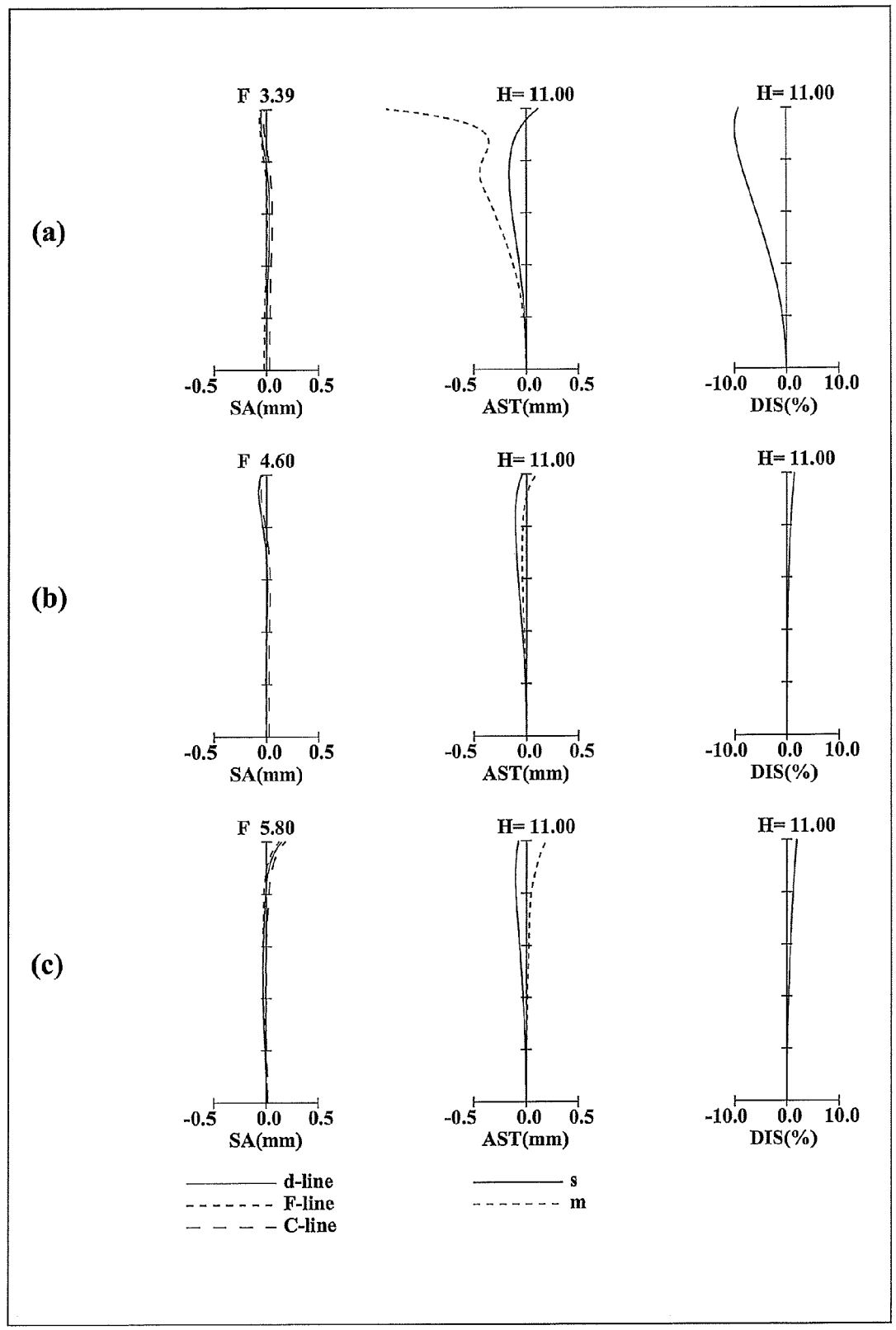
FIG. 28 is a longitudinal aberration diagram showing an infinity in-focus condition of a zoom lens system according to Example 8.
Figure 29:
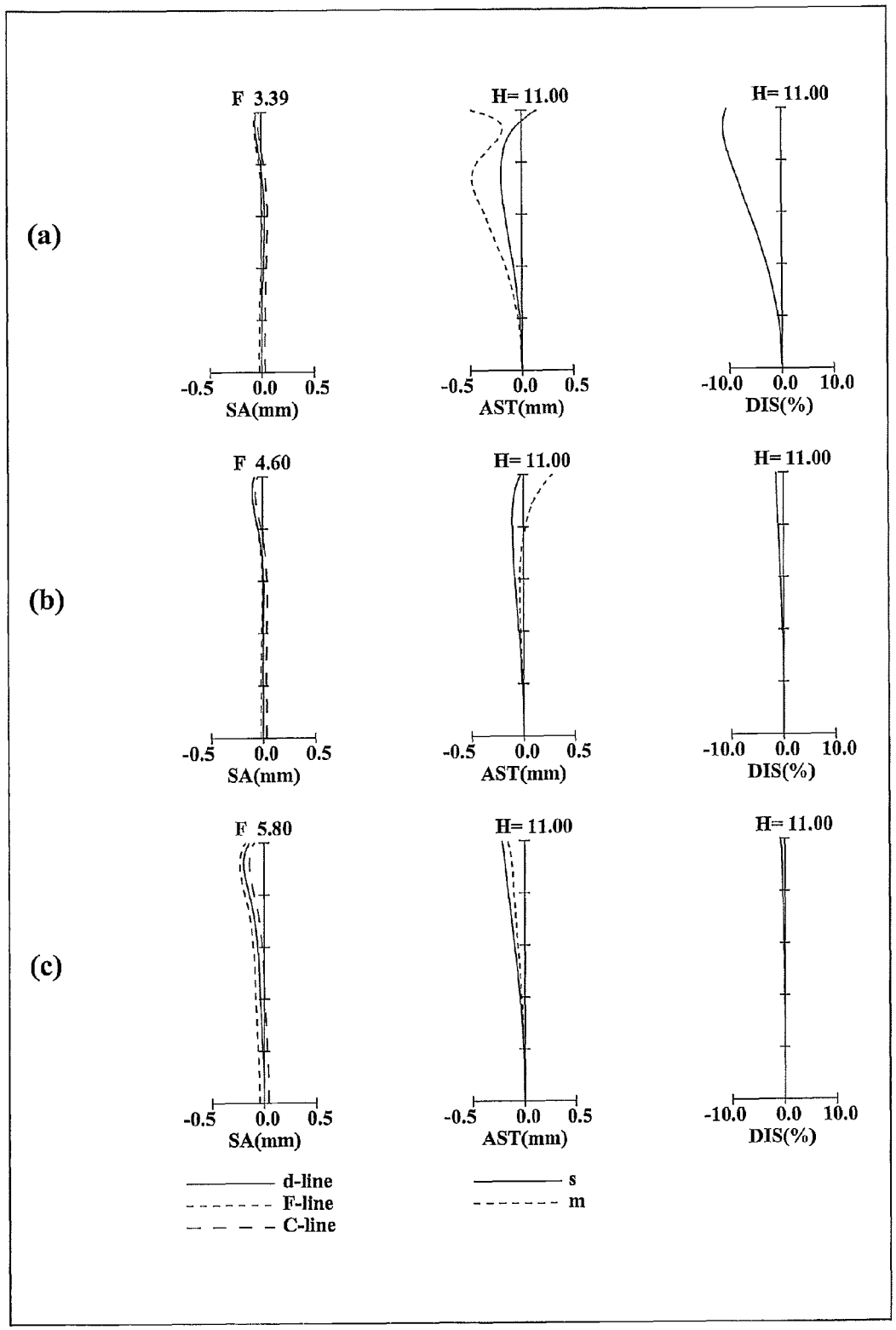
FIG. 29 is a longitudinal aberration diagram showing a close-point in-focus condition of a zoom lens system according to Example 8.

The zoom lens system of Numerical Example 8 corresponds to Embodiment 8 shown in FIG. 27. Table 30 shows the surface data of the zoom lens system of Numerical Example 8. Table 31 shows the aspherical data. Table 32 shows various data. Table 33 shows the zoom lens unit data.

TABLE 30

(surface data)

| Surface number | r | d | nd | vd |
|---|---|---|---|---|
| Object surface | ∞ | | | |
| 1 | 88.26400 | 1.20000 | 1.84666 | 23.8 |
| 2 | 43.50280 | 0.01000 | 1.56732 | 42.8 |
| 3 | 43.50280 | 4.99460 | 1.62299 | 58.1 |
| 4 | 413.57560 | 0.10000 | | |
| 5 | 39.72230 | 4.30830 | 1.72916 | 54.7 |
| 6 | 147.58050 | Variable | | |
| 7 | 38.98200 | 0.70000 | 1.88300 | 40.8 |
| 8 | 8.80120 | 4.94460 | | |
| 9 | −23.63000 | 0.70000 | 1.83481 | 42.7 |
| 10 | 11.23190 | 0.01000 | 1.56732 | 42.8 |
| 11 | 11.23190 | 4.41630 | 1.86818 | 26.1 |
| 12 | −15.50650 | 0.55940 | | |
| 13* | −10.59640 | 1.00000 | 1.80470 | 41.0 |
| 14 | −37.03350 | Variable | | |
| 15 | 48.84520 | 1.50000 | 1.66547 | 55.2 |
| 16* | −28.64240 | Variable | | |
| 17 (Aperture) | ∞ | 1.50000 | | |
| 18 | 12.11450 | 3.01020 | 1.48749 | 70.4 |
| 19 | 206.82520 | 0.01000 | 1.56732 | 42.8 |
| 20 | 206.82520 | 0.60000 | 1.80610 | 33.3 |
| 21 | 13.73900 | Variable | | |
| 22* | 10.25290 | 3.64690 | 1.60602 | 57.4 |
| 23 | −35.72650 | 0.10000 | | |
| 24 | 35.21880 | 0.99980 | 1.83046 | 28.8 |
| 25 | 11.73240 | 5.70560 | | |
| 26 | 42.34090 | 6.03880 | 1.48749 | 70.4 |
| 27 | −8.14660 | 0.01000 | 1.56732 | 42.8 |
| 28 | −8.14660 | 0.70000 | 1.80420 | 46.5 |
| 29 | −51.32470 | 0.10000 | | |
| 30 | 38.67420 | 2.06170 | 1.84666 | 23.8 |
| 31 | −187.37810 | BF | | |
| Image surface | ∞ | | | |

TABLE 31

(aspherical data)

| Surface No. | Parameters |
|---|---|
| 13 | K = 0.00000E+00, A4 = 7.39867E−05, A6 = 6.02754E−07, A8 = −2.24402E−08, A10 = 5.25424E−10 |
| 16 | K = 0.00000E+00, A4 = 1.84273E−05, A6 = 3.35332E−07, A8 = −2.88430E−08, A10 = 6.97520E−10 |

TABLE 31-continued (aspherical data)

| Surface No. | Parameters |
|---|---|
| 22 | K = −1.12797E+00, A4 = 2.54429E−05, A6 = −9.39921E−08, A8 = 1.65281E−09, A10 = 0.00000E+00 |

TABLE 32

(various data)

| Zooming ratio | | 4.67743 | |
|---|---|---|---|
| | Wide | Middle | Telephoto |
| Focal length | 12.4002 | 26.8121 | 58.0013 |
| F-number | 3.38665 | 4.60269 | 5.80130 |
| View angle | 44.3351 | 22.0102 | 10.5448 |
| Image height | 11.0000 | 11.0000 | 11.0000 |
| Overall length of lens system | 81.1993 | 94.2455 | 115.1998 |
| BF | 14.94738 | 25.62181 | 37.54806 |
| d6 | 0.3000 | 11.9797 | 24.2009 |
| d14 | 10.7089 | 5.0772 | 1.1000 |
| d16 | 2.4246 | 2.4406 | 3.2246 |
| d21 | 3.8922 | 0.2000 | 0.2000 |

TABLE 33

(zoom lens unit data)

| Unit | Initial surface No. | Focal length |
|---|---|---|
| 1 | 1 | 60.94651 |
| 2 | 7 | −8.55429 |
| 3 | 15 | 27.34279 |
| 4 | 17 | −87.62354 |
| 5 | 22 | 22.54271 |

Numerical Example 9

Figure 30:
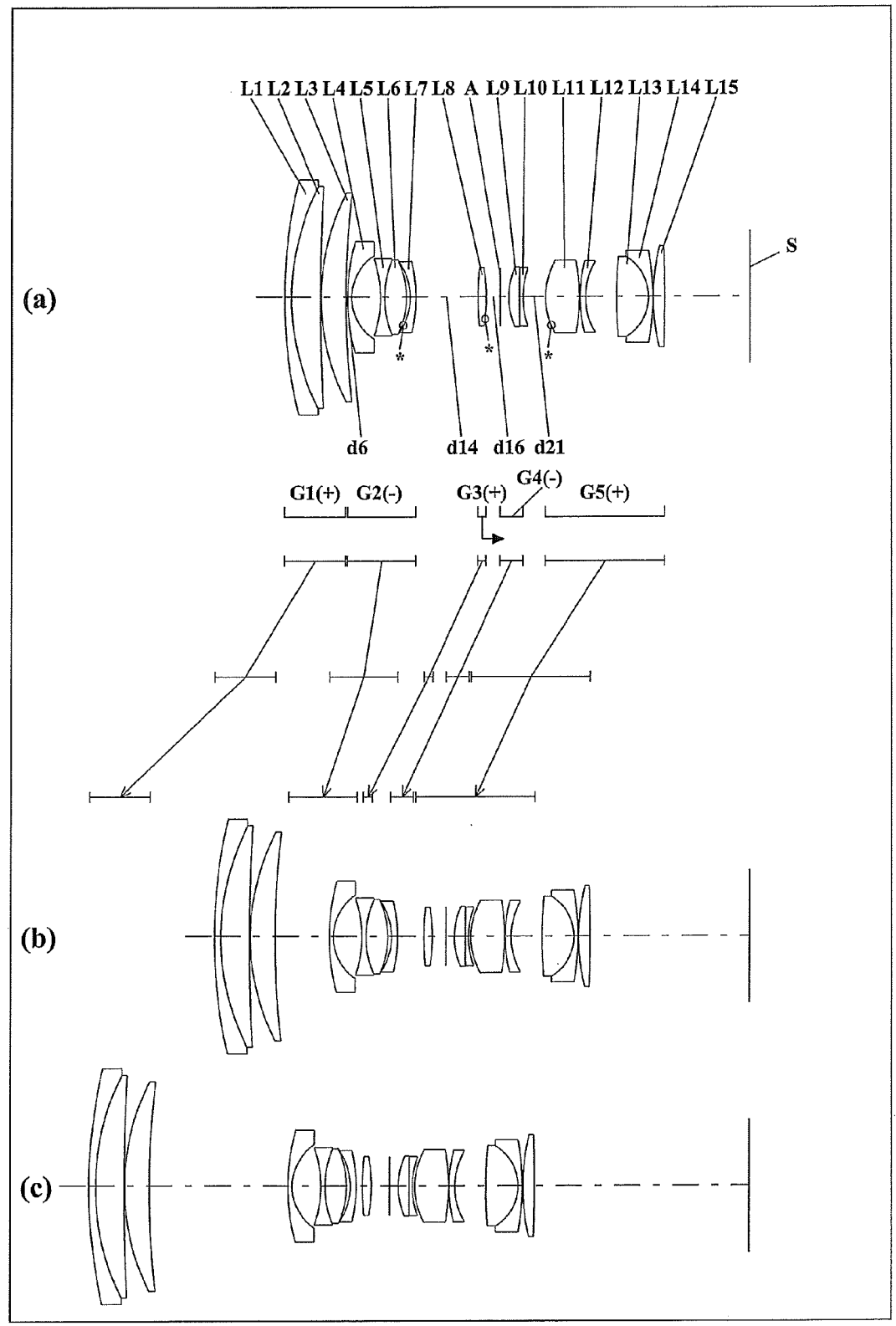
FIG. 30 is a lens arrangement diagram showing an infinity in-focus condition of a zoom lens system according to Embodiment 9 (Example 9)
Figure 31:
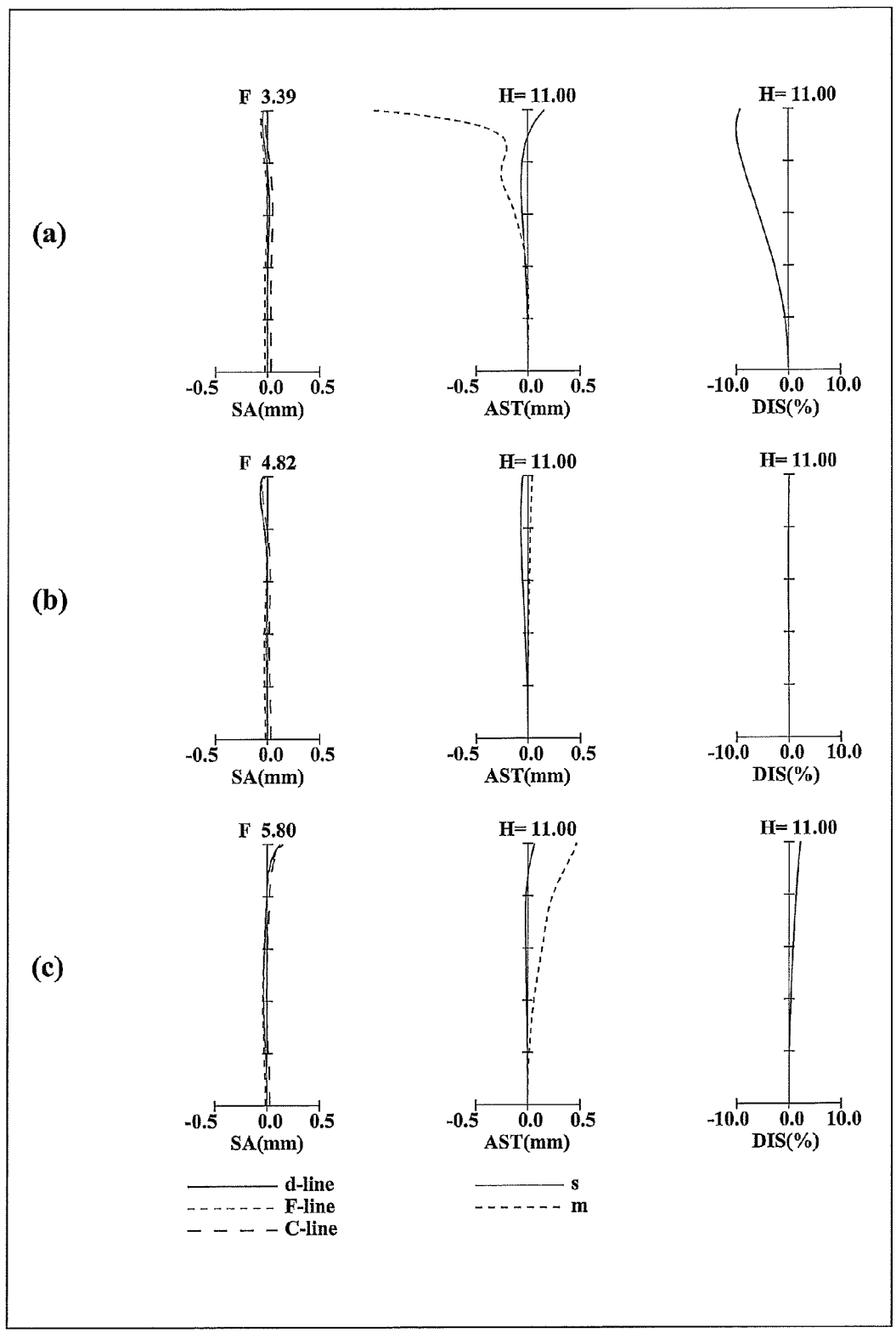
FIG. 31 is a longitudinal aberration diagram showing an infinity in-focus condition of a zoom lens system according to Example 9.
Figure 32:
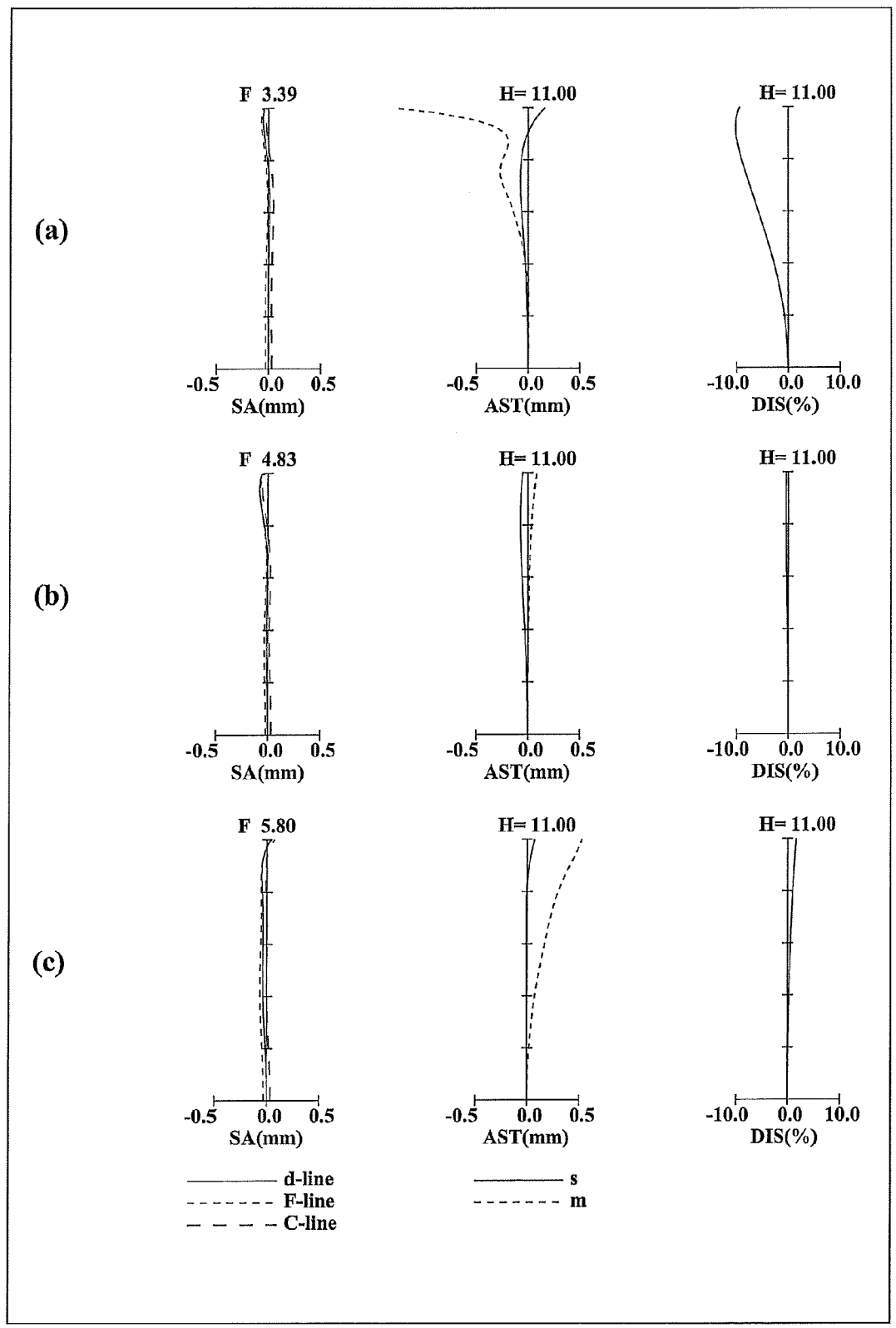
FIG. 32 is a longitudinal aberration diagram showing a close-point in-focus condition of a zoom lens system according to Example 9.

The zoom lens system of Numerical Example 9 corresponds to Embodiment 9 shown in FIG. 30. Table 34 shows the surface data of the zoom lens system of Numerical Example 9. Table 35 shows the aspherical data. Table 36 shows various data. Table 37 shows the zoom lens unit data.

TABLE 34

(surface data)

| Surface number | r | d | nd | vd |
|---|---|---|---|---|
| Object surface | ∞ | | | |
| 1 | 87.71220 | 1.20000 | 1.84666 | 23.8 |
| 2 | 42.95510 | 0.01000 | 1.56732 | 42.8 |
| 3 | 42.95510 | 5.00420 | 1.62299 | 58.1 |
| 4 | 369.62990 | 0.10000 | | |
| 5 | 39.91070 | 4.34270 | 1.72916 | 54.7 |
| 6 | 155.58550 | Variable | | |
| 7 | 37.02080 | 0.70000 | 1.88300 | 40.8 |
| 8 | 8.83250 | 5.00250 | | |
| 9 | −20.42380 | 0.70000 | 1.83481 | 42.7 |
| 10 | 16.57920 | 0.01000 | 1.56732 | 42.8 |
| 11 | 16.57920 | 3.78010 | 1.84666 | 23.8 |
| 12 | −15.28030 | 0.68100 | | |
| 13* | −10.23960 | 1.00000 | 1.80470 | 41.0 |
| 14 | −26.55310 | Variable | | |

TABLE 34-continued (surface data)

| Surface number | r | d | nd | vd |
|---|---|---|---|---|
| 15 | 45.43970 | 1.50000 | 1.66547 | 55.2 |
| 16* | −30.07070 | Variable | | |
| 17 (Aperture) | ∞ | 1.50000 | | |
| 18 | 12.92420 | 1.86330 | 1.48749 | 70.4 |
| 19 | 346.37330 | 0.01000 | 1.56732 | 42.8 |
| 20 | 346.37330 | 0.60000 | 1.80610 | 33.3 |
| 21 | 15.30680 | Variable | | |
| 22* | 12.36500 | 5.90880 | 1.60602 | 57.4 |
| 23 | −35.29670 | 0.10000 | | |
| 24 | 25.32620 | 1.00000 | 1.84666 | 23.8 |
| 25 | 12.40490 | 5.39410 | | |
| 26 | 77.10300 | 5.58810 | 1.48749 | 70.4 |
| 27 | −8.12600 | 0.01000 | 1.56732 | 42.8 |
| 28 | −8.12600 | 0.70000 | 1.80420 | 46.5 |
| 29 | −46.73290 | 0.10000 | | |
| 30 | 36.85660 | 1.98410 | 1.84666 | 23.8 |
| 31 | −341.26400 | BF | | |
| Image surface | ∞ | | | |

TABLE 35

(aspherical data)

| Surface No. | Parameters |
|---|---|
| 13 | K = 0.00000E+00, A4 = 7.28351E−05, A6 = 7.45521E−07, A8 = −1.74222E−08, A10 = 3.98208E−10 |
| 16 | K = 0.00000E+00, A4 = 1.57549E−05, A6 = 8.54823E−07, A8 = −4.95846E−08, A10 = 9.77720E−10 |
| 22 | K = −4.14123E+00, A4 = 2.08375E−04, A6 = −1.78708E−06, A8 = 1.16736E−08, A10 = 0.00000E+00 |

TABLE 36

(various data)

Zooming ratio 4.67751

| | Wide | Middle | Telephoto |
|---|---|---|---|
| Focal length | 12.4001 | 26.8181 | 58.0015 |
| F-number | 3.39366 | 4.82419 | 5.80135 |
| View angle | 44.3286 | 22.2858 | 10.5142 |
| Image height | 11.0000 | 11.0000 | 11.0000 |
| Overall length of lens system | 81.1832 | 93.3093 | 115.1803 |
| BF | 14.93352 | 27.81486 | 37.47430 |
| d6 | 0.3000 | 9.4198 | 24.2385 |
| d14 | 10.8135 | 4.5720 | 1.1000 |
| d16 | 2.4012 | 2.3411 | 3.2012 |
| d21 | 3.9461 | 0.3726 | 0.3774 |

TABLE 37

(zoom lens unit data)

| Unit | Initial surface No. | Focal length |
|---|---|---|
| 1 | 1 | 61.06108 |
| 2 | 7 | −8.58914 |
| 3 | 15 | 27.40972 |
| 4 | 17 | −91.81665 |
| 5 | 22 | 23.53555 |

Numerical Example 10

Figure 33:
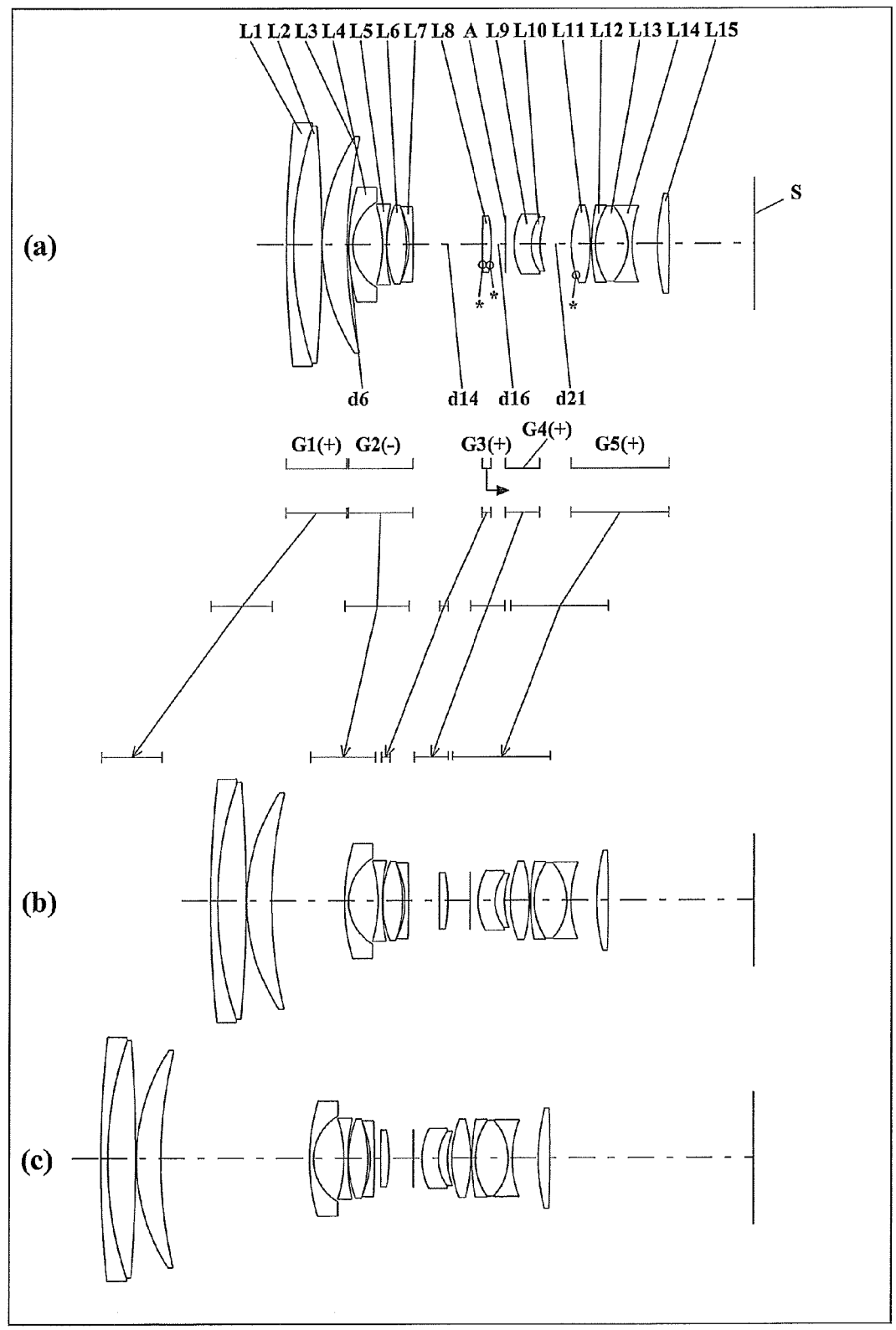
FIG. 33 is a lens arrangement diagram showing an infinity in-focus condition of a zoom lens system according to Embodiment 10 (Example 10)
Figure 34:
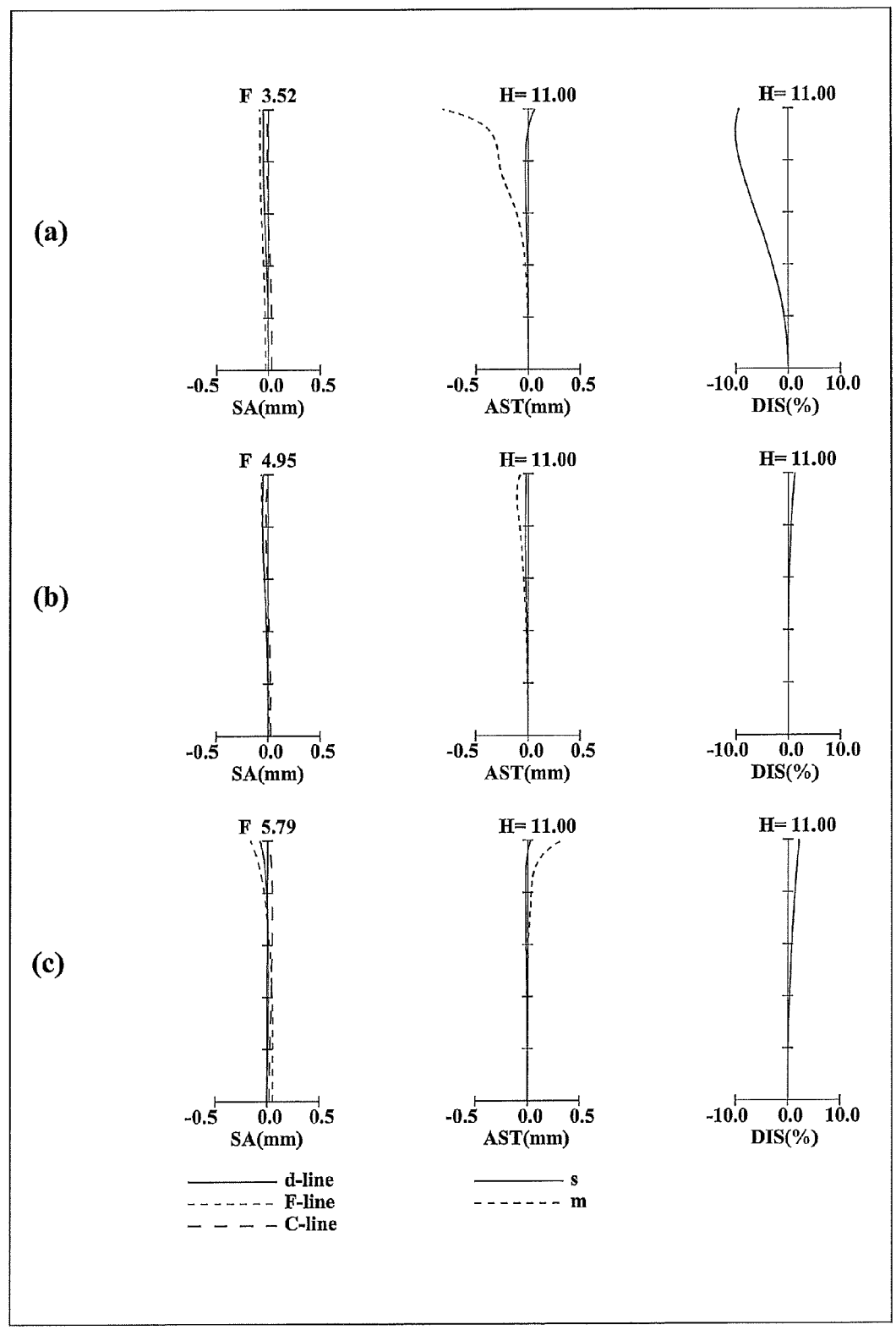
FIG. 34 is a longitudinal aberration diagram showing an infinity in-focus condition of a zoom lens system according to Example 10.
Figure 35:
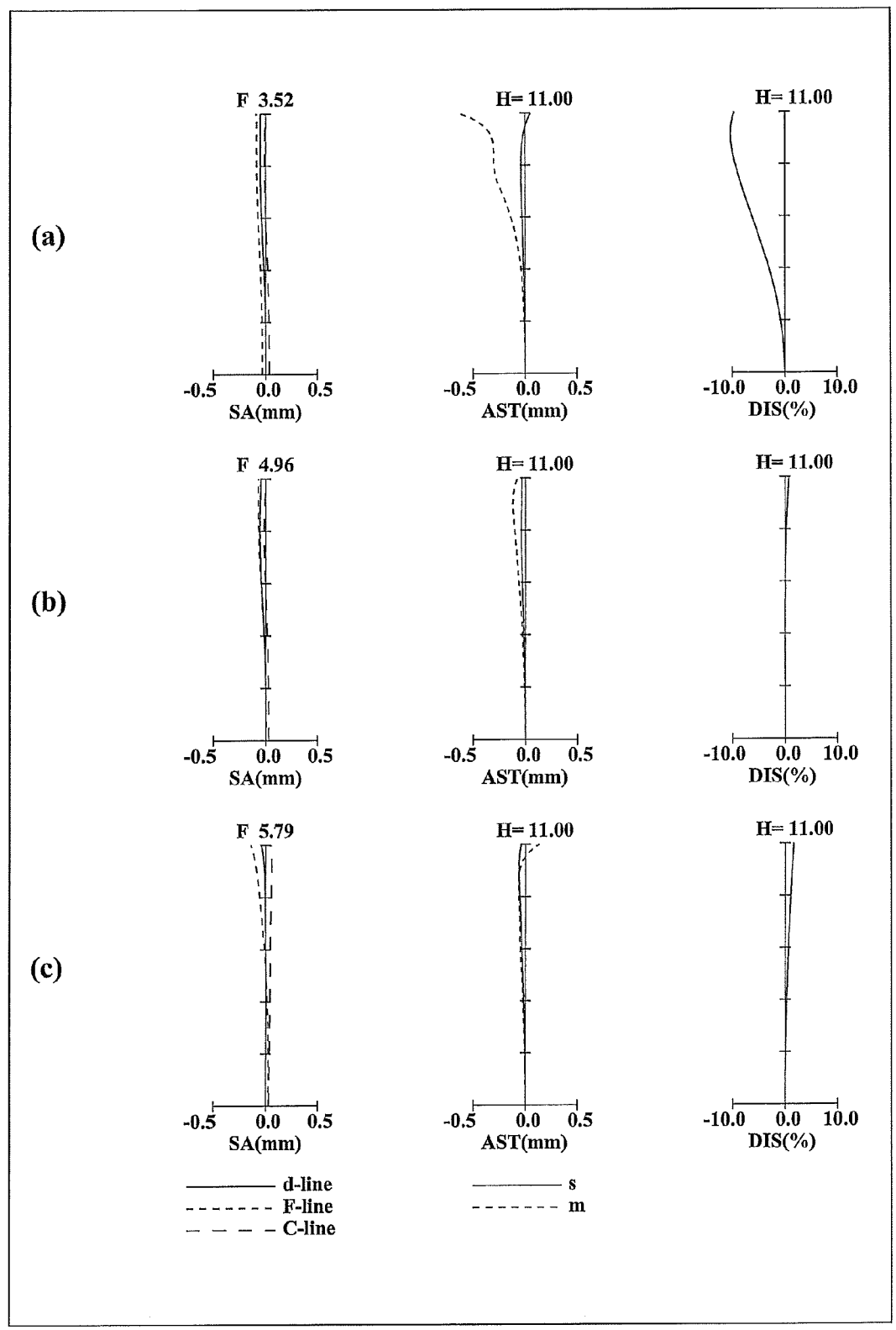
FIG. 35 is a longitudinal aberration diagram showing a close-point in-focus condition of a zoom lens system according to Example 10.

The zoom lens system of Numerical Example 10 corresponds to Embodiment 10 shown in FIG. 33. Table 38 shows the surface data of the zoom lens system of Numerical Example 10. Table 39 shows the aspherical data. Table 40 shows various data. Table 41 shows the zoom lens unit data.

TABLE 38

(surface data)

| Surface number | r | d | nd | vd |
|---|---|---|---|---|
| Object surface | ∞ | | | |
| 1 | 201.83550 | 1.20000 | 1.84666 | 23.8 |
| 2 | 66.61460 | 0.01000 | 1.56732 | 42.8 |
| 3 | 66.61460 | 4.93160 | 1.62299 | 58.1 |
| 4 | −249.78590 | 0.10000 | | |
| 5 | 34.41100 | 4.28390 | 1.72916 | 54.7 |
| 6 | 80.13850 | Variable | | |
| 7 | 35.00000 | 0.70000 | 1.88300 | 40.8 |
| 8 | 8.70330 | 5.25180 | | |
| 9 | −23.48370 | 0.70000 | 1.88300 | 40.8 |
| 10 | 33.38190 | 0.10000 | | |
| 11 | 18.81810 | 3.47930 | 1.84666 | 23.8 |
| 12 | −19.44510 | 0.39820 | | |
| 13 | −14.82460 | 0.70000 | 1.80610 | 40.7 |
| 14 | −147.35880 | Variable | | |
| 15* | 111.29190 | 1.50000 | 1.66547 | 55.2 |
| 16* | −31.23180 | Variable | | |
| 17 (Aperture) | ∞ | 1.50000 | | |
| 18 | 11.71290 | 2.90370 | 1.84666 | 23.8 |
| 19 | 8.08670 | 0.01000 | 1.56732 | 42.8 |
| 20 | 8.08670 | 1.57140 | 1.51805 | 55.3 |
| 21 | 13.49630 | Variable | | |
| 22* | 16.95600 | 3.26770 | 1.60602 | 57.4 |
| 23 | −26.94340 | 0.20000 | | |
| 24 | 32.29380 | 0.70000 | 1.84666 | 23.8 |
| 25 | 11.91580 | 0.01000 | 1.56732 | 42.8 |
| 26 | 11.91580 | 5.64970 | 1.60328 | 61.3 |
| 27 | −9.89430 | 0.01000 | 1.56732 | 42.8 |
| 28 | −9.89430 | 0.70000 | 1.77250 | 49.6 |
| 29 | 19.10340 | 4.48000 | | |
| 30 | 35.06040 | 2.02760 | 1.84666 | 23.8 |
| 31 | −284.69790 | BF | | |
| Image surface | ∞ | | | |

TABLE 39

(aspherical data)

| Surface No. | Parameters |
|---|---|
| 15 | K = 0.00000E+00, A4 = −8.51215E−05, A6 = 0.00000E+00, A8 = 0.00000E+00, A10 = 0.00000E+00 |
| 16 | K = 0.00000E+00, A4 = −6.08697E−05, A6 = −1.29115E−07, A8 = 1.22762E−08, A10 = −2.78378E−10 |
| 22 | K = 1.81114E+00, A4 = −8.25524E−05, A6 = −2.20802E−07, A8 = −3.61059E−09, A10 = 0.00000E+00 |

TABLE 40

(various data)

Zooming ratio 4.67735

| | Wide | Middle | Telephoto |
|---|---|---|---|
| Focal length | 12.3998 | 26.8163 | 57.9982 |
| F-number | 3.51704 | 4.95475 | 5.78611 |
| View angle | 44.3687 | 22.0462 | 10.5177 |

TABLE 40-continued (various data)

| Image height | 11.0000 | 11.0000 | 11.0000 |
|---|---|---|---|
| Overall length of lens system | 81.7158 | 94.5908 | 113.6458 |
| BF | 14.96629 | 25.42375 | 35.49561 |
| d6 | 0.3052 | 12.6295 | 25.7437 |
| d14 | 12.1104 | 5.3002 | 1.1000 |
| d16 | 2.4896 | 3.8216 | 4.2216 |
| d21 | 5.4594 | 1.0309 | 0.7000 |

TABLE 41

(zoom lens unit data)

| Unit | Initial surface No. | Focal length |
|---|---|---|
| 1 | 1 | 62.89272 |
| 2 | 7 | −9.16020 |
| 3 | 15 | 36.80232 |
| 4 | 17 | 270.40987 |
| 5 | 22 | 25.37175 |

Numerical Example 11

Figure 36:
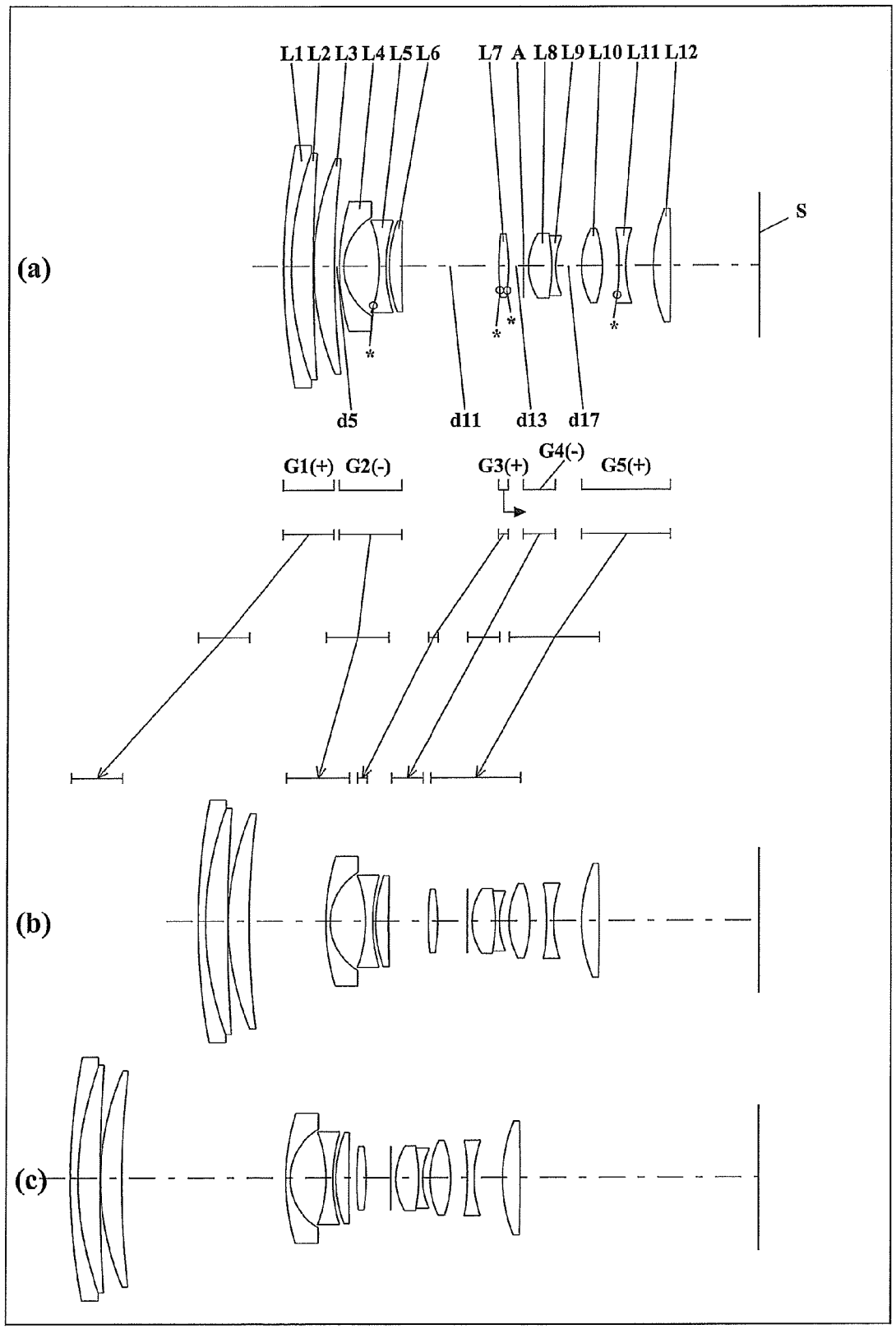
FIG. 36 is a lens arrangement diagram showing an infinity in-focus condition of a zoom lens system according to Embodiment 11 (Example 11)
Figure 37:
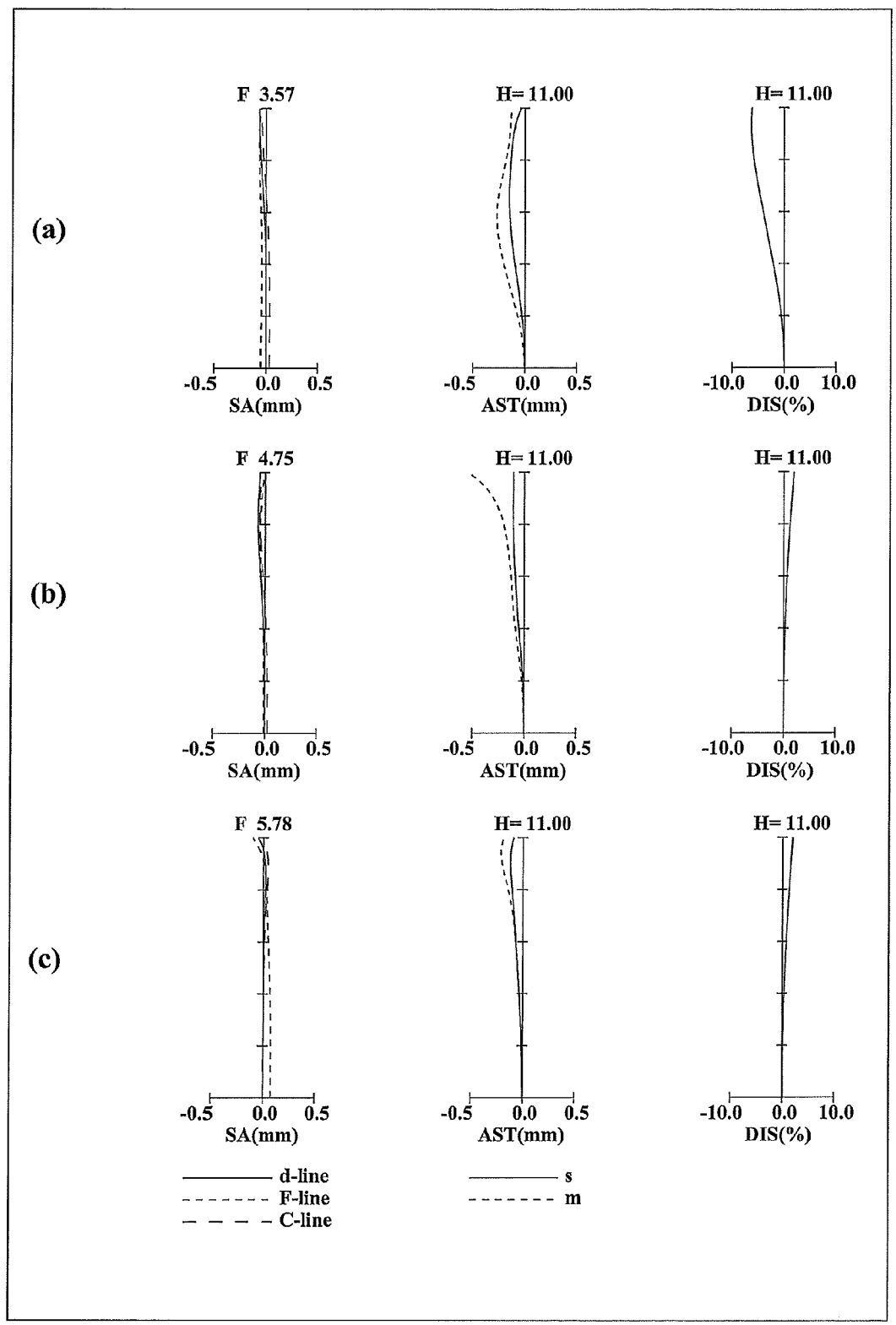
FIG. 37 is a longitudinal aberration diagram showing an infinity in-focus condition of a zoom lens system according to Example 11.
Figure 38:
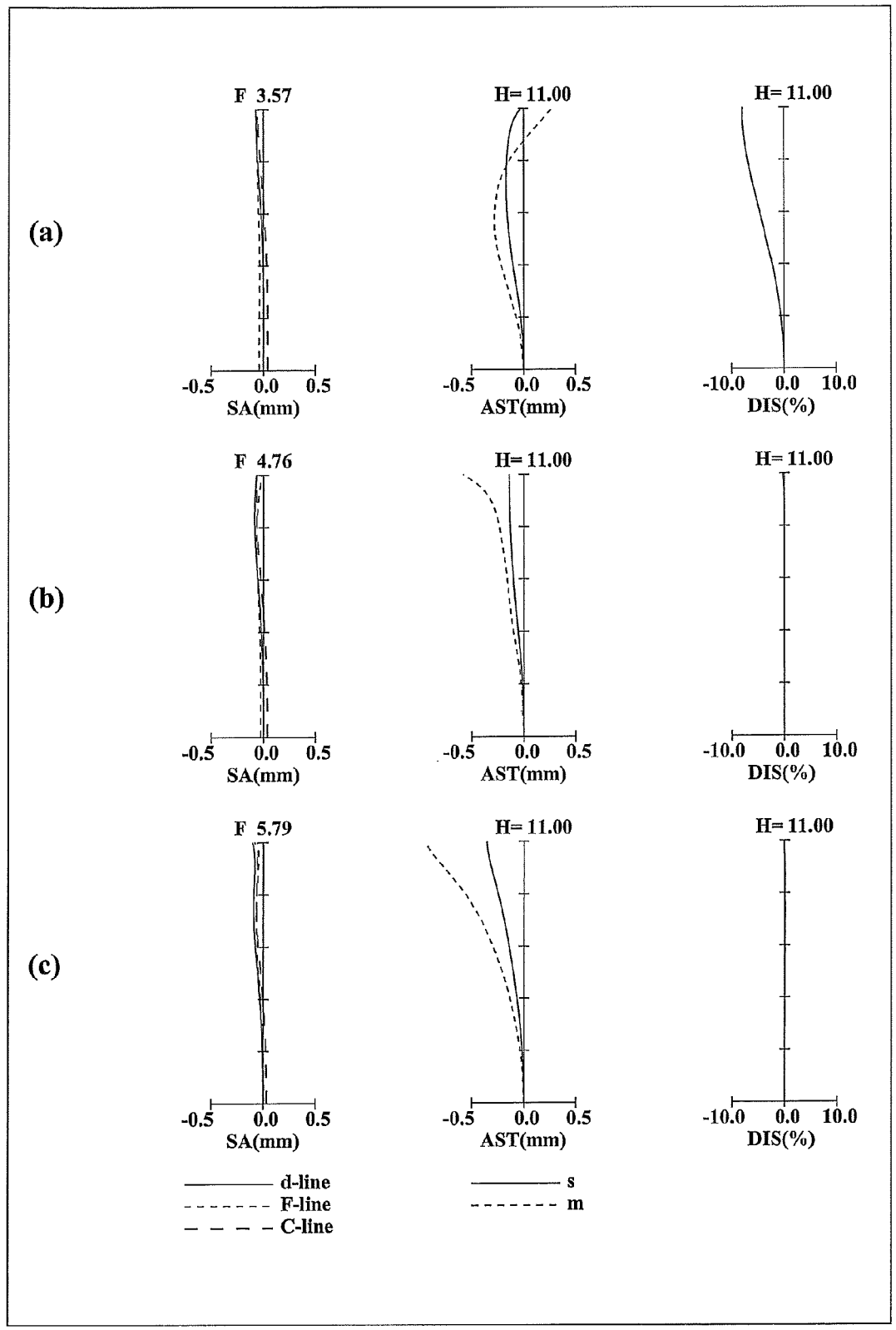
FIG. 38 is a longitudinal aberration diagram showing a close-point in-focus condition of a zoom lens system according to Example 11.

The zoom lens system of Numerical Example 11 corresponds to Embodiment 11 shown in FIG. 36. Table 42 shows the surface data of the zoom lens system of Numerical Example 11. Table 43 shows the aspherical data. Table 44 shows various data. Table 45 shows the zoom lens unit data.

TABLE 42

(surface data)

| Surface number | r | d | nd | vd |
|---|---|---|---|---|
| Object surface | ∞ | | | |
| 1 | 103.95510 | 1.20000 | 1.84666 | 23.8 |
| 2 | 52.03290 | 3.50590 | 1.72916 | 54.7 |
| 3 | 259.37390 | 0.10000 | | |
| 4 | 44.12290 | 3.31660 | 1.72916 | 54.7 |
| 5 | 138.91860 | Variable | | |
| 6 | 35.00000 | 0.70000 | 1.90366 | 31.3 |
| 7 | 9.09080 | 5.72300 | | |
| 8* | −20.87040 | 1.10000 | 1.68966 | 53.0 |
| 9 | 25.47610 | 0.48520 | | |
| 10 | 20.61470 | 2.05620 | 1.94595 | 18.0 |
| 11 | 222.90760 | Variable | | |
| 12* | 43.00460 | 1.59480 | 1.66547 | 55.2 |
| 13* | −28.28110 | Variable | | |
| 14 (Aperture) | ∞ | 0.80000 | | |
| 15 | 9.54420 | 3.66900 | 1.51680 | 64.2 |
| 16 | −28.87700 | 0.60600 | 1.80611 | 40.7 |
| 17 | 11.90270 | Variable | | |
| 18 | 12.92730 | 3.29950 | 1.48749 | 70.4 |
| 19 | −19.14670 | 2.62610 | | |
| 20* | −63.90600 | 1.10000 | 1.84666 | 23.8 |
| 21 | 19.01980 | 4.45410 | | |
| 22 | 23.66820 | 2.78760 | 1.71736 | 29.5 |
| 23 | −500.00000 | BF | | |
| Image surface | ∞ | | | |

TABLE 43

(aspherical data)

| Surface No. | Parameters |
|---|---|
| 8 | K = 0.00000E+00, A4 = 6.10086E−06, A6 = −2.02053E−07, A8 = −2.99368E−09, A10 = 0.00000E+00, A12 = 0.00000E+00 |

TABLE 43-continued (aspherical data)

| Surface No. | Parameters |
|---|---|
| 12 | K = 0.00000E+00, A4 = −1.33328E−05, A6 = 5.11687E−07, A8 = 4.90565E−08, A10 = 0.00000E+00, A12 = 0.00000E+00 |
| 13 | K = 0.00000E+00, A4 = 1.10487E−05, A6 = 9.31836E−08, A8 = 5.77089E−08, A10 = 0.00000E+00, A12 = 0.00000E+00 |
| 20 | K = 0.00000E+00, A4 = −1.39315E−04, A6 = −2.38804E−06, A8 = 4.02673E−08, A10 = −1.43563E−09, A12 = 1.91908E−11 |

TABLE 44

(various data)

| Zooming ratio | | 4.70507 | |
|---|---|---|---|
| | Wide | Middle | Telephoto |
| Focal length | 12.3694 | 26.8235 | 58.1992 |
| F-number | 3.56734 | 4.75407 | 5.78285 |
| View angle | 43.4525 | 21.9127 | 10.5030 |
| Image height | 11.0000 | 11.0000 | 11.0000 |
| Overall length of lens system | 76.0039 | 89.4503 | 109.6387 |
| BF | 14.25166 | 25.64873 | 38.09690 |
| d5 | 0.8000 | 12.2022 | 26.0988 |
| d11 | 15.3235 | 6.3161 | 1.2987 |
| d13 | 2.3385 | 4.5843 | 3.8822 |
| d17 | 4.1662 | 1.5750 | 1.1381 |

TABLE 45

(zoom lens unit data)

| Unit | Initial surface No. | Focal length |
|---|---|---|
| 1 | 1 | 69.39989 |
| 2 | 6 | −10.56381 |
| 3 | 12 | 25.86902 |
| 4 | 14 | −80.77582 |
| 5 | 18 | 25.62722 |

The following Tables 46 to 48 show values corresponding to the individual conditions in the zoom lens systems of the numerical examples.

TABLE 46

(values corresponding to individual conditions: Numerical Examples 1 to 4)

| | Numerical Example | | | |
|---|---|---|---|---|
| Conditions | 1 | 2 | 3 | 4 |
| (1) $|f_F/f_W|$ | 1.88798 | 1.66143 | 1.81774 | 2.00011 |
| (2) $|f_F/f_T|$ | 0.39539 | 0.35396 | 0.38602 | 0.42614 |
| (3) $|f_F/f_{NW}|$ | 2.87284 | 2.03660 | 2.29831 | 2.52957 |
| (4) $\beta_{NT}/\beta_{NW}$ | 1.89887 | 1.93201 | 1.98256 | 1.90850 |
| (5) $D_F/\Sigma D$ | 0.07906 | 0.04868 | 0.04368 | 0.04252 |
| (6) $|f_1/f_{NW}|$ | 6.94116 | 6.92872 | 6.70152 | 7.05231 |
| (14) $D_{FWA}/f_W$ | 0.16784 | 0.25970 | 0.24129 | 0.20781 |
| (15) $(D_F/f_W) * (f_T/f_W)$ | 1.21716 | 0.73102 | 0.72949 | 0.61902 |
| (16) $|D_F/f_F|$ | 0.13501 | 0.09374 | 0.08522 | 0.06594 |
| (17) $|f_1/f_2|$ | 6.94116 | 6.92872 | 6.70152 | 7.05231 |
| (18) $|f_2/f_F|$ | 0.34809 | 0.49102 | 0.43510 | 0.39532 |
| (19) $|f_1/f_F|$ | 2.41614 | 3.40211 | 2.91585 | 2.78795 |

TABLE 47

(values corresponding to individual conditions:
Numerical Examples 5 to 8)

| | Numerical Example | | | |
|---|---|---|---|---|
| Conditions | 5 | 6 | 7 | 8 |
| (1) $|f_F/f_W|$ | 2.17154 | 2.18393 | 2.22792 | 2.20506 |
| (2) $|f_F/f_T|$ | 0.46265 | 0.46418 | 0.46653 | 0.47143 |
| (3) $|f_F/f_{NW}|$ | 1.45339 | 2.55005 | 2.46164 | 3.19642 |
| (4) $\beta_{NT}/\beta_{NW}$ | 2.00911 | 1.89400 | 1.92207 | 2.08539 |
| (5) $D_F/\Sigma D$ | 0.04073 | 0.03757 | 0.04376 | 0.03163 |
| (6) $|f_1/f_{NW}|$ | 3.49113 | 7.43351 | 6.86494 | 7.12476 |
| (14) $D_{FWA}/f_W$ | 0.19999 | 0.18305 | 0.19487 | 0.19553 |
| (15) $(D_F/f_W)*(f_T/f_W)$ | 0.59819 | 0.59289 | 0.61434 | 0.56582 |
| (16) $|D_F/f_F|$ | 0.05869 | 0.05770 | 0.05774 | 0.05486 |
| (17) $|f_1/f_2|$ | 3.49113 | 7.43351 | 6.86494 | 7.12476 |
| (18) $|f_2/f_F|$ | 0.68805 | 0.39215 | 0.40623 | 0.31285 |
| (19) $|f_1/f_F|$ | 2.40206 | 2.91505 | 2.78876 | 2.22898 |

TABLE 48

(values corresponding to individual conditions:
Numerical Examples 9 to 11)

| | Numerical Example | | |
|---|---|---|---|
| Conditions | 9 | 10 | 11 |
| (1) $|f_F/f_W|$ | 2.21046 | 2.96793 | 2.09137 |
| (2) $|f_F/f_T|$ | 0.47258 | 0.63452 | 0.44449 |
| (3) $|f_F/f_{NW}|$ | 3.19118 | 4.01763 | 2.44886 |
| (4) $\beta_{NT}/\beta_{NW}$ | 2.08253 | 2.15197 | 1.91320 |
| (5) $D_F/\Sigma D$ | 0.03172 | 0.03342 | 0.04151 |
| (6) $|f_1/f_{NW}|$ | 7.10904 | 6.86587 | 6.56965 |
| (14) $D_{FWA}/f_W$ | 0.19365 | 0.20077 | 0.18906 |
| (15) $(D_F/f_W)*(f_T/f_W)$ | 0.56582 | 0.56582 | 0.60664 |
| (16) $|D_F/f_F|$ | 0.05473 | 0.04076 | 0.06165 |
| (17) $|f_1/f_2|$ | 7.10904 | 6.86587 | 6.56965 |
| (18) $|f_2/f_F|$ | 0.31336 | 0.24890 | 0.40835 |
| (19) $|f_1/f_F|$ | 2.22772 | 1.70893 | 2.68274 |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for an imaging device in a digital still camera, a digital video camera or the like that requires high image quality.

Details of the present invention have been described above. However, the above-mentioned description is completely illustrative from every point of view, and does not limit the scope of the present invention. Obviously, various improvements and modifications can be performed without departing from the scope of the present invention.

What is claimed is:

1. A zoom lens system, in order from an object side to an image side, comprising:
a first lens unit having positive optical power;
a second lens unit having negative optical power;
a third lens unit having positive optical power; and
an aperture diaphragm, wherein
at the time of zooming, the first lens unit, the second lens unit and the third lens unit move so that intervals between these lens units vary, wherein at the time of focusing from an infinity in-focus condition to a close-point object in-focus condition, the third lens unit moves to the image side, and wherein the zoom lens system satisfies the following condition:

$$0.15 < D_{FWA}/f_W < 0.30 \quad (14)$$

$f_T/f_W > 3.0$ where,
$D_{FWA}$ is an axial interval from the vertex of a surface on the most image side of the focusing lens unit to the aperture diaphragm,
$f_T$ is a focal length of the entire system at a telephoto limit, and
$f_W$ is focal length of the entire system at a wide-angle limit.

2. The zoom lens system as claimed in claim 1, satisfying the following condition:

$$0.50 < (D_F/f_W)*(f_T/f_W) < 1.50 \quad (15)$$

$f_T/f_W > 3.0$ where,
$D_F$ is an axial thickness of the focusing lens unit,
$f_T$ is a focal length of the entire system at a telephoto limit, and
$f_W$ is focal length of the entire system at a wide-angle limit.

3. The zoom lens system as claimed in claim 1, satisfying the following condition:

$$0.02 < |D_F/f_F| < 0.15 \quad (16)$$

$f_T/f_W > 3.0$ where,
$D_F$ is an axial thickness of the focusing lens unit,
$f_F$ is a focal length of the focusing lens unit,
$f_T$ is a focal length of the entire system at a telephoto limit, and
$f_W$ is focal length of the entire system at a wide-angle limit.

4. The zoom lens system as claimed in claim 1, satisfying the following condition:

$$3.00 < |f_1/f_2| < 8.00 \quad (17)$$

where,
$f_1$ is a focal length of the positive lens unit, and
$f_2$ is a focal length of the negative lens unit.

5. The zoom lens system as claimed in claim 1, satisfying the following condition:

$$0.20 < |f_2/f_F| < 0.80 \quad (18)$$

where,
$f_2$ is a focal length of the negative lens unit, and
$f_F$ is a focal length of the focusing lens unit.

6. The zoom lens system as claimed in claim 1, satisfying the following condition:

$$1.50 < |f_1/f_F| < 4.00 \quad (19)$$

where,
$f_1$ is a focal length of the lens unit having positive optical power, and
$f_F$ is a focal length of the focusing lens unit.

7. An interchangeable lens apparatus comprising:
a zoom lens system; and
a camera mount section connected to a camera body provided with an image sensor for receiving an optical image formed by the zoom lens system and then converting the optical image into an electric image signal, wherein
the zoom lens system, in order from an object side to an image side, comprises:
a first lens unit having positive optical power;
a second lens unit having negative optical power;

a third lens unit having positive optical power; and
an aperture diaphragm,
at the time of zooming, the first lens unit, the second lens unit and the third lens unit move so that intervals between these lens units vary, and
at the time of focusing from an infinity in-focus condition to a close-point object in-focus condition, the third lens unit moves to the image side, and
the following conditions are satisfied:

$$0.15 < D_{FWA}/f_W < 0.30 \tag{14}$$

$f_T/f_W > 3.0$ where, $D_{FWA}$ is an axial interval from the vertex of a surface on the most image side of the focusing lens unit to the aperture diaphragm, $f_T$ is a focal length of the entire system at a telephoto limit, and $f_W$ is focal length of the entire system at a wide-angle limit.

8. A camera system comprising:
an interchangeable lens apparatus that includes a zoom lens system; and
a camera body that is connected to the interchangeable lens apparatus via a camera mount section in an attachable and detachable manner and that includes an image sensor for receiving an optical image formed by the zoom lens system and then converting the optical image into an electric image signal, wherein
the zoom lens system, in order from an object side to an image side, comprises:
a first lens unit having positive optical power;
a second lens unit having negative optical power;
a third lens unit having positive optical power; and
an aperture diaphragm,
at the time of zooming, the first lens unit, the second lens unit and the third lens unit move so that intervals between these lens units vary, and
at the time of focusing from an infinity in-focus condition to a close-point object in-focus condition, the third lens unit moves to the image side, and
the following conditions are satisfied:

$$0.15 < D_{FWA}/f_W < 0.30 \tag{14}$$

$f_T/f_W > 3.0$ where, $D_{FWA}$ is an axial interval from the vertex of a surface on the most image side of the focusing lens unit to the aperture diaphragm, $f_T$ is a focal length of the entire system at a telephoto limit, and $f_W$ is focal length of the entire system at a wide-angle limit.

* * * * *